(12) United States Patent
Nakamura et al.

(10) Patent No.: US 12,321,132 B2
(45) Date of Patent: Jun. 3, 2025

(54) RESIN COMPOSITION, TONER FOR DEVELOPING ELECTROSTATIC CHARGE IMAGE, IMAGE FORMING METHOD, PHOTOSENSITIVE ADHESIVE, AND OPTICAL SWITCHING MATERIAL

(71) Applicant: Konica Minolta, Inc., Tokyo (JP)

(72) Inventors: Kazuaki Nakamura, Hino (JP); Yukiko Nakai, Toyohashi (JP); Haruo Horiguchi, Koganei (JP); Toyoko Shibata, Tokyo (JP); Kouji Sugama, Musashino (JP)

(73) Assignee: KONICA MINOLTA, INC., Tokyo (JP)

( * ) Notice: Subject to any disclaimer, the term of this patent is extended or adjusted under 35 U.S.C. 154(b) by 651 days.

(21) Appl. No.: 17/492,141

(22) Filed: Oct. 1, 2021

(65) Prior Publication Data

US 2022/0107576 A1 Apr. 7, 2022

(30) Foreign Application Priority Data

Oct. 6, 2020 (JP) .................................. 2020-169237

(51) Int. Cl.
*G03G 15/04* (2006.01)
*C08F 220/14* (2006.01)
(Continued)

(52) U.S. Cl.
CPC ....... *G03G 9/09775* (2013.01); *C08F 220/14* (2013.01); *C08F 220/34* (2013.01);
(Continued)

(58) Field of Classification Search
None
See application file for complete search history.

(56) References Cited

U.S. PATENT DOCUMENTS 4,367,275 A * 1/1983 Aoki .................. G03G 9/09791
430/108.4
5,186,865 A * 2/1993 Wu ...................... C07D 277/82
548/146

(Continued)

FOREIGN PATENT DOCUMENTS

JP 2014-191077 A 10/2014
JP 2014-191078 A 10/2014
(Continued)

OTHER PUBLICATIONS

Idage, S, Synthesis and Characterization of Polyimides and Polyamide-imides containing Azomethine Linkages, 1992, Polymer International 28, 105-113 (Year: 1992).*
(Continued)

*Primary Examiner* — Peter L Vajda
*Assistant Examiner* — Charles Collins Sullivan, IV
(74) *Attorney, Agent, or Firm* — LUCAS & MERCANTI, LLP

(57) ABSTRACT

A resin composition includes: a resin having a first group capable of forming at least two hydrogen bonds; and a photoisomerization compound having a second group capable of forming at least two hydrogen bonds complementarily with the first group and having a moiety that is reversibly isomerized by light.

18 Claims, 3 Drawing Sheets

(51) Int. Cl.
  *C08F 220/34* (2006.01)
  *C08G 63/664* (2006.01)
  *C08G 63/685* (2006.01)
  *G03G 9/097* (2006.01)

(52) U.S. Cl.
  CPC ....... *C08G 63/664* (2013.01); *C08G 63/6854* (2013.01); *G03G 15/04* (2013.01)

(56) References Cited

U.S. PATENT DOCUMENTS

| | | | |
|---|---|---|---|
| 6,413,680 B1 * | 7/2002 | Watanabe | G11B 7/245 |
| 2016/0011537 A1 * | 1/2016 | Higuchi | G03G 15/2007 |
| | | | 399/177 |

FOREIGN PATENT DOCUMENTS

| | | |
|---|---|---|
| JP | 2018-070836 A | 5/2018 |
| JP | 2019-003009 A | 1/2019 |

OTHER PUBLICATIONS

Japanese Patent Office, Notice of Reasons for Refusal, mailed on Mar. 19, 2024 for corresponding Japanese Patent Application No. 2020-169237, together with English translation, 6 pages.

Office Action issued on Mar. 28, 2025 for the corresponding Chinese Patent Application No. 202111158953.7, with an English translation.

* cited by examiner

RESIN COMPOSITION, TONER FOR DEVELOPING ELECTROSTATIC CHARGE IMAGE, IMAGE FORMING METHOD, PHOTOSENSITIVE ADHESIVE, AND OPTICAL SWITCHING MATERIAL

The entire disclosure of Japanese patent Application No. 2020-169237, filed on Oct. 6, 2020, is incorporated herein by reference in its entirety.

BACKGROUND

Technological Field

The present invention relates to a resin composition, a toner for developing an electrostatic charge image, an image forming method, a photosensitive adhesive, and an optical switching material.

Description of the Related Art

An azobenzene compound is known as a compound that is reversibly fluidized and non-fluidized due to a photoisomerization reaction. For example, JP 2014-191078 A and JP 2014-191077 A disclose toner particles containing an azobenzene compound. JP 2014-191078 A and JP 2014-191077 A disclose a technique in which an azobenzene compound is subjected to cis-trans isomerization by light irradiation to induce a reversible crystal phase-isotropic phase change, thereby fluidizing/non-fluidizing the azobenzene compound to melt/fix toner particles.

However, the technique described in JP 2014-191078 A and JP 2014-191077 A is insufficient for causing the entire toner particles to undergo a phase change (fluidization/non-fluidization) by cis-trans isomerization of the azobenzene compound, and there is a problem that it is necessary to apply a large amount of energy such as an irradiation amount and a temperature at the time of irradiation in order to achieve the phase change of the entire toner particles having the configuration.

SUMMARY

Therefore, an object of the present invention is to provide a resin composition capable of more efficiently inducing fluidization and subsequent non-fluidization by light irradiation. Another object of the present invention is to provide a toner having excellent fixability and thin line reproducibility in a toner containing a resin composition capable of more efficiently inducing fluidization and subsequent non-fluidization by light irradiation.

To achieve the abovementioned object, according to an aspect of the present invention, a resin composition reflecting one aspect of the present invention comprises: a resin having a first group capable of forming at least two hydrogen bonds; and a photoisomerization compound having a second group capable of forming at least two hydrogen bonds complementarily with the first group and having a moiety that is reversibly isomerized by light.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
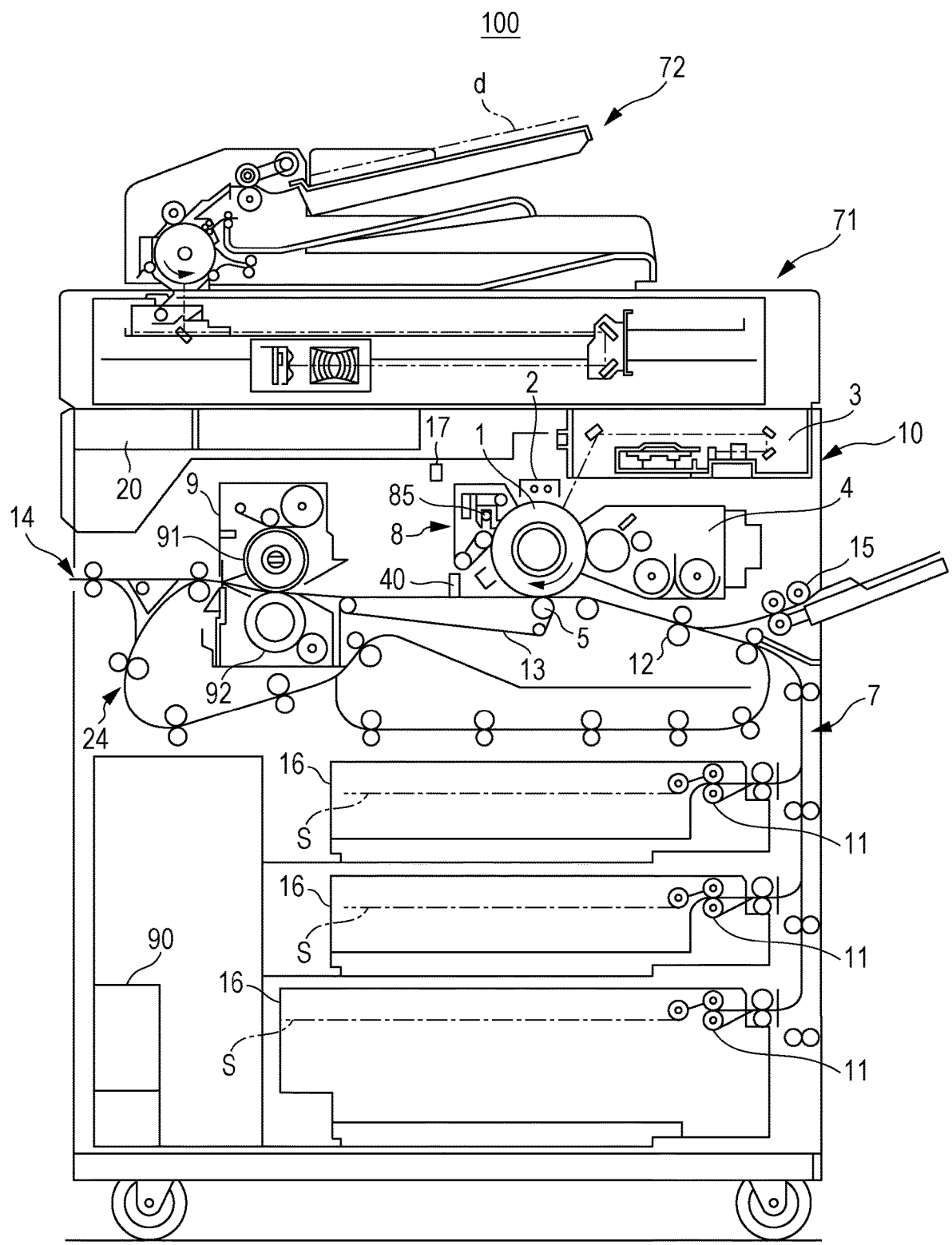
FIG. 1 is a schematic configuration diagram illustrating an image forming apparatus used in an image forming method according to an embodiment of the present invention.

Hereinafter, one or more embodiments of the present invention will be described with reference to the drawings. However, the scope of the invention is not limited to the disclosed embodiments.

The resin composition according to an embodiment of the present invention contains: a resin having a first group capable of forming at least two hydrogen bonds; and a photoisomerization compound having a second group capable of forming at least two hydrogen bonds complementarily with the first group and having a moiety that is reversibly isomerized by light.

Here, the first group and the second group will be described. The first group and the second group are groups capable of forming at least two hydrogen bonds between the two groups. Specifically, the first group and the second group are groups that form a complementary multiple hydrogen bond described later, have a plurality of hydrogen bond acceptors and hydrogen bond donors in the structures thereof, and can form two or more hydrogen bonds complementarily between molecules. Hereinafter, such a group that forms two or more hydrogen bonds complementarily between two groups is also referred to as a "complementary multiple hydrogen bonding group".

In the present invention, a complementary multiple hydrogen bonding group is introduced into each of the resin and the photoisomerization compound contained in the resin composition. As a result, in the resin composition, two or more hydrogen bonds are formed between the complementary multiple hydrogen bonding group of the resin and the complementary multiple hydrogen bonding group of the photoisomerization compound. That is, in the resin composition, since the resin and the photoisomerization compound are bonded to each other via the complementary multiple hydrogen bonding groups included in the resin and the photoisomerization compound, a larger molecule is formed as compared with the resin blended in the resin composition. In this case, the resin composition has a higher viscosity than the blended resin.

As for fluidization by a photoisomerization compound having a liquid crystal property, it is considered that when a non-flowable trans form (E) is irradiated with light and isomerized to a cis form (Z), an ordered structure of a crystal collapses and a phase transition change occurs, thereby inducing fluidization. A mechanism thereof is considered as follows. When a photoisomerization compound (trans form) is irradiated with light, first, the photoisomerization compound on a crystal surface is isomerized from the trans form to a cis form. As a result, the crystal structure of the photoisomerization compound is broken, and the photoisomerization compound is fluidized. A dissolved crystal surface layer undergoes phase transition from a crystalline state to a liquid state. As a result, light transmittance is improved, and light can reach the inside of the crystal. As the crystal layer inside is gradually broken from an outermost layer of the crystal, the entire layer is fluidized. However, when the photoisomerization compound is mixed with a resin (so-called binder resin) such as a styrene acrylic resin or a polyester resin to form a resin composition, there is a concern that fluidization of the entire resin composition is not sufficiently performed only by fluidizing the photoisomerization compound. That is, in order to induce fluidization and non-fluidization in the resin composition, it is necessary to increase the content of the photoisomerization compound in the resin composition. However, when the addition amount of the photoisomerization compound having a molecular weight smaller than that of the resin is increased, a function like a plasticizer is exhibited, the entire composition is low elastic, and it is difficult to obtain desired physical properties. Therefore, the present inventors have reached the following idea.

It is known that when polymers are covalently bonded (that is, crosslinked) to each other, the elastic modulus of the obtained crosslinked polymer is improved, and the elastic modulus is improved even in a region where the degree of crosslinking is low. Here, in the current toner fixing by electrophotography, a principle is used in which the elastic modulus of the entire toner is lowered by heat, the toner is melted, the melted toner is attached to an object to be fixed, then the toner is cooled, the elastic modulus is improved, and the toner is fixed. Therefore, the present inventors have considered that if high elasticity can be achieved by crosslinking a low elastic resin (for example, a styrene acrylic resin or a polyester resin) and a photoisomerization compound with a non-covalent bond such as a hydrogen bond (complementary multiple hydrogen bond) like a supramolecular, a desired elastic modulus at the time of melting and fixing can be achieved. In addition, although crosslinking is usually a covalent bond and is not reversible, since the above-described hydrogen bond (complementary multiple hydrogen bond) can be cleaved by application of external energy, the present inventors have considered that reversibility can be imparted to a bond between the resin and the photoisomerization compound, and have completed the present invention. It is known that each hydrogen bond has small bonding energy, but a large number of hydrogen bonds can exhibit bonding energy comparable to a covalent bond. Therefore, improvement of physical properties such as elastic modulus can be expected. The present invention has been designed such that a resin and a photoisomerization compound having a photoisomerization moiety are hydrogen-bonded (complementary multiple hydrogen-bonded) and the hydrogen bond can be reversibly formed and cleaved by light. That is, in the present invention, it has been found that by introducing a complementary multiple hydrogen bonding moiety to form a multiple hydrogen bond into each of a resin and a photoisomerization compound having a photoisomerization moiety, elasticity can be reduced and increased by light irradiation.

It is considered that a photoisomerization compound having liquid crystal properties is accelerated to be crystallized after isomerization from a cis form to a trans form, and is thereby non-fluidized from a fluidized molten state. This crystallization hardly proceeds when impurities are present, and therefore when an isomerization ratio to a trans form is low, crystallization does not sufficiently proceed, and non-fluidization may be insufficient. In the resin composition according to an embodiment of the present invention, even when the isomerization ratio from a cis form to a trans form is low, complementary multiple hydrogen bonding groups of the resin and the photoisomerization compound form a hydrogen bond, and the elastic modulus can be thereby expected to be improved. Therefore, the resin composition according to an embodiment of the present invention can achieve quick and reliable non-fluidization.

From the above, it is considered that the resin composition according to an embodiment of the present invention can reversibly induce a fluidization/non-fluidization phenomenon due to isomerization by light, and furthermore can be quickly and reliably non-fluidized. By introducing the resin composition according to an embodiment of the present invention into a toner, a toner having high fixability and thin line reproducibility can be obtained.

The complementary multiple hydrogen bonding group is not particularly limited as long as it has a structure that forms two or more hydrogen bonds, and examples thereof include: residues of nucleic acid bases such as adenine and guanine, which are purine derivatives, and cytosine, thymine, and uracil, which are pyrimidine derivatives, and derivatives thereof; and residues of urea, thiourea, melamine, cyanuric acid, barbituric acid, a 2,6-diacylaminopyridine such as 2,6-diacetylaminopyridine or 2,6-dipropionylaminopyridine, 4,6-diamino-2 pyrimidinone, 2-amino-4,6-pyrimidinedinone, 2,4,6-triaminopyrimidine, phthalimide, 2,6-diamino-1,3,5-triazine, 2-ureido-4 amino-1,3,5-triazine, and 2-ureido-4 pyrimidinone, and derivatives thereof (a monovalent group and an n-valent group). Among these residues, as a complementary multiple hydrogen bonding group B, residues of adenine and thymine that form a pair of nucleic acid bases, a 2,6-diacylaminopyridine having a high symmetric structure, uracil, melamine, cyanuric acid, phthalimide, 2,6-diamino-1,3,5-triazine, and derivatives thereof are preferable.

Here, in the resin composition according to an embodiment of the present invention, the first group (more preferably $B_1$) of the resin, the second group (more preferably $B_2$ and G when n is 1) of the photoisomerization compound, and a third group (G when n is 2 to 10) which may be included in the photoisomerization compound correspond to complementary multiple hydrogen bonding groups. For example, $B_1$ and $B_2$ are monovalent groups. G when n is 1 is a monovalent group, and G when n is 2 to 10 is an n-valent group. Therefore, $B_1$ and $B_2$ are each a monovalent residue of a complementary multiple hydrogen bonding group, G when n is 1 is a monovalent residue of a complementary multiple hydrogen bonding group, and G when n is 2 to 10 is an n-valent residue of a complementary multiple hydrogen bonding group.

In the resin composition according to an embodiment of the present invention, for the complementary multiple hydrogen bonding group, the first group of the resin and the second group of the photoisomerization compound are essentially present. In a preferred embodiment, the first group and the second group are each independently a residue of any one compound selected from the group consisting of adenine, thymine, a 2,6-diacylaminopyridine, uracil, melamine, cyanuric acid, phthalimide, and 2,6-diamino 1,3,5-triazine.

In the complementary multiple hydrogen bonding group, the first group of the resin and the second group of the photoisomerization compound are paired to form a hydrogen bond between the first group and the second group. Examples of such a pair of complementary multiple hydrogen bonding groups (combination of the first group and the second group) include adenine/thymine, adenine/uracil, guanine/cytosine, melamine/barbituric acid, melamine/cyanuric acid, 2,6-diacylaminopyrimidine/uracil, 4,6-diamino-2 pyrimidinone/2-amino-4,6-pyrimidinedinone, 2,4,6-triaminopyrimidine/barbituric acid, 2,6-diamino-1,3,5-triazine/phthalimide, 2,4,6-triaminopyrimidine/phthalimide, and derivatives thereof, and urea, thiourea, 2,6-diamino-1,3,5-triazine, 2-ureido-4 amino-1,3,5-triazine, and 2-ureido-4-pyrimidinone that can be paired with the same structure, and derivatives thereof. Among these pairs, adenine/thymine forming a pair of nucleic acid bases, 2,6-diacylaminopyrimidine/uracil, melamine/cyanuric acid, and 2,6-diamino-1,3,5-triazine/phthalimide, each of which has a high symmetric structure and can form a stable hydrogen bond, are preferable.

Therefore, in a preferred embodiment, the first group and the second group form a pair of residues selected from adenine/thymine, 2,6-diacylaminopyridine/uracil, melamine/cyanuric acid, and 2,6-diamino-1,3,5-triazine/phthalimide.

Here, the multiple hydrogen bond in the present invention will be described by exemplifying guanine/cytosine and adenine/thymine each of which forms a hydrogen bond between nucleic acid bases. As described above, the first group (more preferably $B_1$) of the resin, the second group (more preferably $B_2$ and G when n is 1) of the photoisomerization compound, and the third group (G when n is 2 to 10) which may be included in the photoisomerization compound correspond to complementary multiple hydrogen bonding groups. The first group and the second group form two or more hydrogen bonds between two molecules as in the following pairs of guanine/cytosine and adenine/thymine.

[Chemical formula 1]

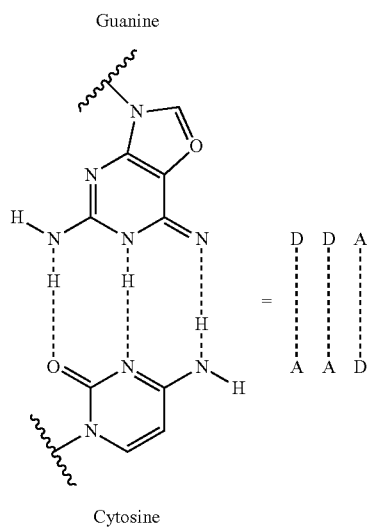

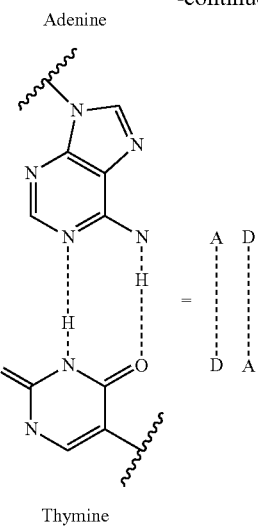

In guanine, a hydrogen atom of N—H and N—$H_2$ is an acceptor, and an unshared electron pair of an oxygen atom of a carbonyl group is a donor. In cytosine to be paired with guanine, a hydrogen atom of N—$H_2$ is an acceptor, and an unshared electron pair of a nitrogen atom and an unshared electron pair of an oxygen atom of a carbonyl group are donors. When the donor of guanine and the acceptor of cytosine are hydrogen-bonded, and the acceptor of guanine and the donor of cytosine are hydrogen-bonded, multiple hydrogen bonds are complementarily formed.

For example, in a compound having a guanine residue at one end and a cytosine residue at the other end in one molecule, the guanine residue and the cytosine residue form a complementary multiple hydrogen bond in a solution to form a supramolecular polymer. Although bonding energy of each hydrogen bond is small, physical properties as a polymer are exhibited by forming a plurality of multiple hydrogen bonds.

That is, in the resin composition according to an embodiment of the present invention, the first group of the resin and the second group of the photoisomerization compound form a complementary multiple hydrogen bond to form a supramolecular polymer. In addition, this hydrogen bond can be reversibly cleaved and formed when energy such as light irradiation is applied to the hydrogen bond. As a result, the effect of the present invention is exhibited.

For example, the resin composition is used in a state in which a supramolecular polymer is formed. When fluidization is required, a hydrogen bond between the resin and the photoisomerization compound formed in the resin composition is cleaved by light irradiation. As a result, the resin composition has a lower viscosity (lower elasticity). Thereafter, when non-fluidization is required, a complementary multiple hydrogen bonding group of the resin and a complementary multiple hydrogen bonding group of the photoisomerization compound form a hydrogen bond in the resin composition by light irradiation. As a result, the resin composition has a higher viscosity (higher elasticity). Therefore, the resin composition according to an embodiment of the present invention can be fluidized and then non-fluidized by light irradiation.

<Resin>

The resin contained in the resin composition according to an embodiment of the present invention has a complementary multiple hydrogen bonding group. The resin preferably has a structure represented by the following general formula (1).

[Chemical Formula 2]

$$-M-B_1 \qquad \text{General formula (1)}$$

In general formula (1), M represents a linking group, and $B_1$ represents a first group capable of forming at least two hydrogen bonds (complementary multiple hydrogen bonding first group). M is a linking group linking $B_1$ as the first group to a main chain portion, and hereinafter, the structure represented by general formula (1) is also referred to as a "side chain portion". Therefore, the resin contains a main chain portion and a side chain portion (-M-$B_1$). In a preferred embodiment, the resin preferably has a "unit(S) not having a complementary multiple hydrogen bonding group (first group)" (hereinafter, also simply referred to as a "unit S") and a "unit (T) having a complementary multiple hydrogen bonding group (first group)" (hereinafter, also simply referred to as a "unit T") in the main chain portion. In this case, the "unit (T) having a complementary multiple hydrogen bonding group" has a side chain portion represented by the general formula (1).

In general formula (1), the above-described complementary multiple hydrogen bonding group can be similarly applied to the complementary multiple hydrogen bonding group that can constitute $B_1$, and therefore description thereof is omitted here.

In general formula (1), the linking group capable of constituting M is, for example, a group selected from the group consisting of an alkylene group (for example, methylene, 1,2-ethylene, 1,3-propylene, 1,4-butylene, or cyclohexane-1,4-diyl), an alkenylene group (for example, ethene-1,2-diyl or butadiene-1,4-diyl), an alkynylene group (for example, ethyne-1,2-diyl or butane-1,3-diyne-1,4-diyl), a linking group derived from a compound containing at least one aromatic group (for example, a substituted or unsubstituted benzene, a condensed polycyclic hydrocarbon, an aromatic heterocyclic ring, an aromatic hydrocarbon ring assembly, or an aromatic heterocyclic ring assembly), and a linking group containing a heteroatom (an oxygen atom, a sulfur atom, a nitrogen atom, a silicon atom, or a phosphorus atom), or a group obtained by combining one or more selected from the group. Among these groups, the linking group capable of constituting M is preferably a group selected from the group consisting of an alkylene group having 1 to 10 carbon atoms (more preferably 1 to 5 carbon atoms), an arylene group having 6 to 10 carbon atoms, and a heteroatom-containing linking group (preferably, oxygen, sulfur, or nitrogen), or a group obtained by combining two or more selected from the group. These linking groups may each further have a substituent described later, or the linking groups may be combined to form a composite group.

Here, examples of the heteroatom-containing linking group include —NH—, —NHCO—, —CO—, —COO—, —OOC—, —NHCOO—, —O—, and —S—. Among these groups, —NH—, —S—, —CO—, and —COO— are preferable.

Here, the term "substitution" means that a functional group or a partial structure of interest is replaced with a substituent which may be optionally possessed. The substituent which may be optionally possessed is selected from a deuterium atom, a halogen group (a fluoro group, a chloro group, a bromo group, or an iodo group), a cyano group, an unsubstituted monovalent alkyl group having 1 to 20 carbon atoms, a halogen-substituted monovalent alkyl group, an unsubstituted monovalent aromatic hydrocarbon group having 6 to 30 carbon atoms, and an unsubstituted monovalent aromatic heterocyclic group having 5 to 30 ring-forming atoms. Here, the unsubstituted alkyl group having 1 to 20 carbon atoms, the unsubstituted aromatic hydrocarbon group having 6 to 30 carbon atoms, and the unsubstituted aromatic heterocyclic group having 5 to 30 ring-forming atoms are not particularly limited. Examples thereof include monovalent groups of compounds exemplified as an unsubstituted divalent aromatic hydrocarbon group having 6 to 30 carbon atoms, an unsubstituted divalent aromatic hydrocarbon group having 6 to 30 carbon atoms, and an unsubstituted divalent aromatic heterocyclic group having 5 to 30 ring-forming atoms, which can constitute each of $A_1$ and $A_2$ in general formula (2) described later.

The main chain portion of the resin constituting the resin composition is not particularly limited, and examples thereof include polyethylene, polypropylene, polyvinyl chloride, polyvinyl acetate, polyurethane, polytetrafluoroethylene, a styrene-butadiene-acrylonitrile resin (ABS resin), a styrene resin (polystyrene), an acrylonitrile-styrene resin (AS resin) an acrylic resin such as polymethyl methacrylate (PMMA), a styrene acrylic resin, polyamide, polyacetal, polycarbonate, modified polyphenylene ether, polyethylene terephthalate, glass fiber-reinforced polyethylene terephthalate, a polyester resin such as polybutylene terephthalate, cyclic polyolefin, polyphenylene sulfide, polytetrafluoroethylene, polysulfone, polyethersulfone, amorphous polyarylate, liquid crystal polymer, polyetheretherketone, polyimide, polyamideimide, polylactic acid, a silicone resin, an olefin resin, an amide resin, and an epoxy resin, and copolymers thereof. These resins can be used singly or in combination of two or more types thereof. Among these resins, the resin is preferably one or more selected from an acrylic resin, a styrene acrylic resin, and a polyester resin. In the present invention, the resin is more preferably a styrene acrylic resin or a polyester resin, and still more preferably a styrene acrylic resin.

Therefore, the main chain portion including the "unit(S) not having a complementary multiple hydrogen bonding group B" and the "unit (T) having a complementary multiple hydrogen bonding group B" is preferably selected from an acrylic resin, a styrene acrylic resin, and a polyester resin.

In all the units of the resin according to an embodiment of the present invention, a ratio (S/T) of the number of moles of the unit(S) not having a complementary multiple hydrogen bonding group B to the number of moles of the unit (T) having a complementary multiple hydrogen bonding group B is not particularly limited as long as it achieves desired physical properties, but is preferably 99/1 to 1/99, more preferably 97/3 to 50/50, and still more preferably 95/5 to 80/20.

(Acrylic Resin)

The acrylic resin referred to in the present invention is formed by performing polymerization using at least a (meth) acrylate monomer. The (meth)acrylate monomer has a functional group having an ester bond in a side chain. Specific examples thereof include, in addition to an acrylate monomer represented by $CH_2=CHCOOR$ (R is an alkyl group), a vinyl-based ester compound such as a methacrylate monomer represented by $CH_2=C(CH_3)COOR$ (R is an alkyl group).

Typical examples of the (meth)acrylate monomer include the following acrylate monomers and methacrylate monomers, but the (meth)acrylate monomer is not limited thereto. Examples of the acrylate monomer include methyl acrylate, ethyl acrylate, n-propyl acrylate, isopropyl acrylate, n-butyl acrylate, isobutyl acrylate, t-butyl acrylate, n-octyl acrylate, 2-ethylhexyl acrylate, stearyl acrylate, lauryl acrylate, and phenyl acrylate phenyl. Examples of the methacrylate monomer include methyl methacrylate, ethyl methacrylate, n-propyl methacrylate, isopropyl methacrylate, n-butyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

These acrylate monomers or methacrylate monomers can be used singly or in combination of two or more types thereof.

(Styrene Acrylic Resin)

The styrene acrylic resin referred to in the present invention is formed by performing polymerization using at least a styrene monomer and a (meth)acrylate monomer. Here, the styrene monomer includes, in addition to styrene represented by a structural formula of $CH_2=CH-C_6H_5$, a monomer having a known side chain or functional group in a styrene structure.

As the (meth)acrylate monomer, the compounds described for the acrylic resin are similarly used.

Specific examples of a styrene monomer capable of forming the styrene acrylic resin are illustrated below, but the styrene monomer is not limited to those illustrated below. Examples of the styrene monomer include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, and p-n-dodecylstyrene.

These styrene monomers, acrylate monomers, or methacrylate monomers can be used singly or in combination of two or more types thereof.

In addition to a copolymer formed of only the styrene monomer and the (meth)acrylate monomer described above, some styrene acrylic resins are formed by using a general vinyl monomer in combination with the styrene monomer and the (meth)acrylate monomer. Hereinafter, a vinyl monomer that can be used in combination when the styrene acrylic resin referred to in the present invention is formed will be illustrated, but the vinyl monomer that can be used in combination is not limited to those illustrated below.

(1) Olefin

Ethylene, propylene, isobutylene, and the like (2) Vinyl Ester

Vinyl propionate, vinyl acetate, vinyl benzoate, and the like (3) Vinyl Ether

Vinyl methyl ether, vinyl ethyl ether, and the like (4) Vinyl Ketone

Vinyl methyl ketone, vinyl ethyl ketone, vinyl hexyl ketone, and the like (5) N-Vinyl Compound N-vinylcarbazole, N-vinyl indole, N-vinyl pyrrolidone, and the like.

(6) Others

A vinyl compound such as vinyl naphthalene or vinyl pyridine, and an acrylic acid derivative or a methacrylic acid derivative such as acrylonitrile, methacrylonitrile, or acrylamide.

A resin having a crosslinked structure can also be prepared using a polyfunctional vinyl monomer. Furthermore, a vinyl monomer having an ionic dissociating group in a side chain can also be used. Specific examples of the ionic dissociating group include a carboxyl group, a sulfonic acid group, and a phosphoric acid group. Specific examples of vinyl monomers having these ionic dissociating groups are illustrated below.

Specific examples of the vinyl monomer having a carboxyl group include acrylic acid, methacrylic acid, maleic acid, itaconic acid, cinnamic acid, fumaric acid, a maleic acid monoalkyl ester, and an itaconic acid monoalkyl ester.

A method for forming the styrene acrylic resin is not particularly limited, and examples thereof include a method for polymerizing a monomer using a known oil-soluble or water-soluble polymerization initiator. A known chain transfer agent such as n-octyl-3-mercaptopropionate may be used as necessary.

When the styrene acrylic resin used in the present invention is formed, the contents of the styrene monomer and the acrylate monomer are not particularly limited, and can be appropriately adjusted from a viewpoint of controlling the softening temperature and the glass transition temperature of a binder resin. Specifically, the content of the styrene monomer is preferably 40 to 95% by mass, and more preferably 50 to 80% by mass with respect to the total amount of monomers. The content of the (meth)acrylate monomer is preferably 5 to 60% by mass, and more preferably 20 to 50% by mass with respect to the total amount of monomers.

A method for forming the styrene acrylic resin is not particularly limited, and examples thereof include a method for polymerizing a monomer using a known oil-soluble or water-soluble polymerization initiator. Specific examples of the oil-soluble polymerization initiator include the following azo-based or diazo-based polymerization initiator and peroxide-based polymerization initiator.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, and tris-(t-butylperoxy) triazine.

When styrene acrylic resin particles are formed by an emulsion polymerization method, a water-soluble radical polymerization initiator can be used. Example of the water-soluble radical polymerization initiator include a persulfate such as potassium persulfate or ammonium persulfate, azobisaminodipropane acetate, azobiscyanovaleric acid and a salt thereof, and hydrogen peroxide.

The addition amount of the polymerization initiator varies depending on a target molecular weight and molecular weight distribution, but can be specifically within a range of 0.1 to 5.0% by mass with respect to the addition amount of a polymerizable monomer.

Polymerization temperature varies depending on the types of monomer and polymerization initiator used, but is preferably 50 to 100° C., and more preferably 55 to 90° C. Polymerization time varies depending on the types of monomer and polymerization initiator used, but is preferably 2 to 12 hours, for example.

The styrene acrylic resin particles formed by an emulsion polymerization method can have two or more layers made of resins having different compositions. As a manufacturing method in this case, a multi-stage polymerization method for adding a polymerization initiator and a polymerizable monomer to a dispersion of resin particles prepared by an emulsion polymerization process (first stage polymerization) according to a conventional method, and subjecting this system to a polymerization process (second stage polymerization) can be adopted.

(Polyester Resin)

The polyester resin is a known polyester resin obtained by a polycondensation reaction between a di- or higher valent carboxylic acid (polyvalent carboxylic acid component) and a di- or higher hydric alcohol (polyhydric alcohol component). Note that the polyester resin may be amorphous or crystalline.

The valence of each of the polyvalent carboxylic acid component and the polyhydric alcohol component is preferably 2 to 3, and particularly preferably 2. Therefore, as a particularly preferred form, a case where the valence of each of the polyvalent carboxylic acid component and the polyhydric alcohol component is 2 (that is, a dicarboxylic acid component and a diol component) will be described.

Examples of the dicarboxylic acid component include: a saturated aliphatic dicarboxylic acid such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, or 1,18-octadecanedicarboxylic acid; an unsaturated aliphatic dicarboxylic acid such as methylene succinic acid, fumaric acid, maleic acid, 3-hexendiodic acid, 3-octenedioic acid, or dodecenyl succinic acid; an unsaturated aromatic dicarboxylic acid such as phthalic acid, terephthalic acid, isophthalic acid, t-butyl isophthalic acid, tetrachlorophthalic acid, chlorophthalic acid, nitrophthalic acid, p-phenylenediacetic acid, 2,6-naphthalene dicarboxylic acid, 4,4'-biphenyldicarboxylic acid, or anthracenedicarboxylic acid; lower alkyl esters thereof; and acid anhydrides thereof. The dicarboxylic acid component may be used singly or in mixture of two or more types thereof.

In addition, for example, a tri- or higher valent polyvalent carboxylic acid such as trimellitic acid or pyromellitic acid, anhydrides of the carboxylic acids, and alkyl esters thereof each having 1 to 3 carbon atoms can be used.

Examples of the diol component include: a saturated aliphatic diol such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosandiol, or neopentyl glycol; an unsaturated aliphatic diol such as 2-butene-1,4-diol, 3-butene-1,4-diol, 2-butyne-1,4-diol, 3-butyne-1,4-diol, or 9-octadecene-7,12-diol; and an aromatic diol such as a bisphenol including bisphenol A and bisphenol F, or an alkylene oxide adduct of a bisphenol including an ethylene oxide adduct thereof and a propylene oxide adduct thereof. Derivatives thereof can also be used. The diol component may be used singly or in mixture of two or more types thereof.

A method for manufacturing the polyester resin is not particularly limited, and the polyester resin can be manufactured by polycondensing (esterifying) the polyvalent carboxylic acid component and the polyhydric alcohol component using a known esterification catalyst.

Examples of a catalyst that can be used for manufacturing the polyester resin include: an alkali metal compound of sodium or lithium; a compound containing a group 2 element such as magnesium or calcium; a compound of a metal such as aluminum, zinc, manganese, antimony, titanium, tin, zirconium, or germanium; a phosphorous acid compound; a phosphoric acid compound, and an amine compound. Specific examples of the tin compound include dibutyltin oxide, tin octylate, tin dioctylate, and salts thereof. Examples of the titanium compound include: a titanium alkoxide such as tetranormal butyl titanate (Ti(O-n-Bu)$_4$), tetraisopropyl titanate, tetramethyl titanate, or tetrastearyl titanate; a titanium acylate such as polyhydroxytitanium stearate; and a titanium chelate such as titanium tetraacetylacetate, titanium lactate, or titanium triethanol aminate. Examples of the germanium compound include germanium dioxide. Examples of the aluminum compound include polyaluminum hydroxide, aluminum alkoxide, and tributylaluminate. These compounds may be used singly or in combination of two or more types thereof.

The polymerization temperature is not particularly limited, but is preferably 70 to 250° C. The polymerization time is not particularly limited, but is preferably 0.5 to 10 hours. During polymerization, the pressure inside the reaction system may be reduced as necessary.

Examples of the resin having a complementary multiple hydrogen bonding group include resins represented by the following structural formulas. In the following structural formulas, the "-M-B$_1$" portion is a side chain portion.

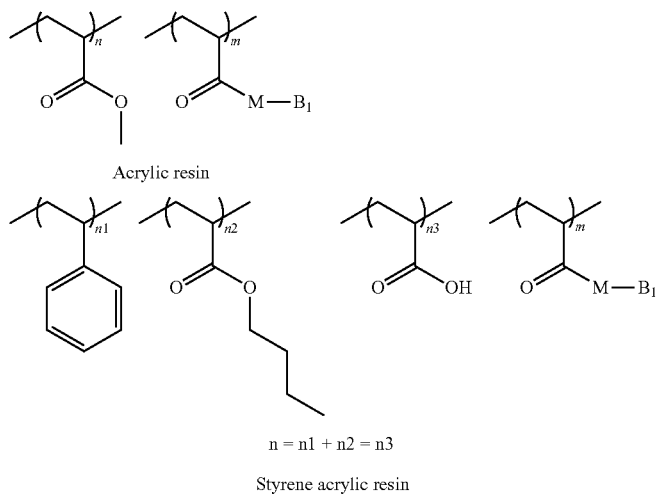

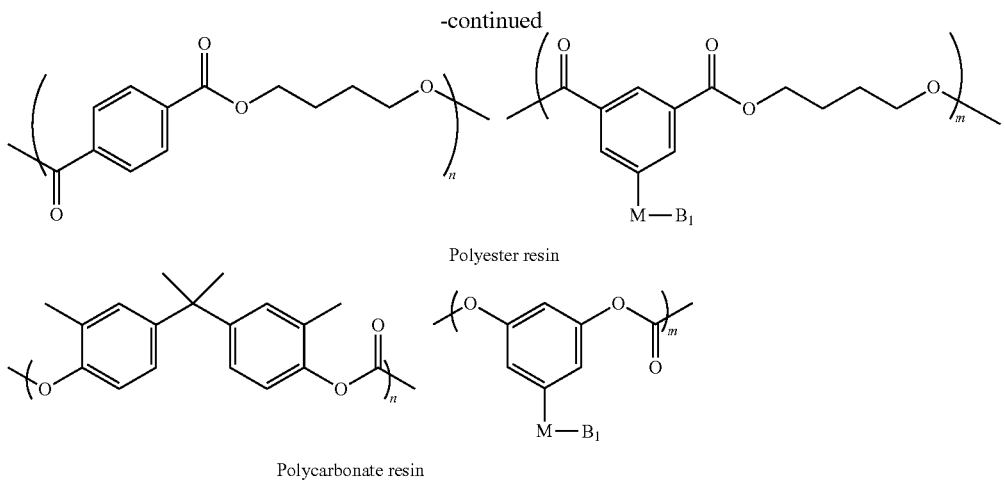

Polyester resin

Polycarbonate resin

In the structural formulas, M and $B_1$ are similar to those defined in general formula (1), and n and m represent the number of moles added. n and m correspond to a molar ratio between the "unit(S) not having a complementary multiple hydrogen bonding group B" and the "unit (T) having a complementary multiple hydrogen bonding group B" described above. Note that in the styrene acrylic resin, n=n1+n2+n3.

In the present invention, the number average molecular weight (Mn) of the resin is preferably 1000 to 500000, more preferably 2000 to 300000, and still more preferably 3000 to 100000 although it is not particularly limited as long as it exhibits desired physical properties such as fluidity/non-fluidity of the resin composition and fixing ratio and thin line reproducibility of a toner. In addition, it is known that melting of the resin composition has a sharper temperature range as a molecular weight distribution is narrower, and a ratio of a mass average molecular weight to a number average molecular weight (Mw/Mn) is preferably 1.05 to 5.0, more preferably 1.10 to 3.0, and still more preferably 1.20 to 2.5 although it is not particularly limited as long as desired physical properties are exhibited.

Note that Mn and Mw/Mn of the resin can be measured by a method described in Examples.

<Photoisomerization Compound>

Next, the photoisomerization compound having a complementary multiple hydrogen bonding group will be described. The photoisomerization compound only needs to have, in a molecule, a photoisomerization moiety that is isomerized from a trans structure to a cis structure and/or from a cis structure to a trans structure by light. For example, the photoisomerization compound only needs to have, in a molecule, a photoisomerization moiety such as a styryl structure (Ph—C=C—), an azo structure (—N=N—), an azomethine structure (—C=N—), or a propeneimine structure (—C=C—C=N—). In a preferred embodiment, the photoisomerization compound is a compound represented by the following general formula (2):

[Chemical formula 4]

General formula (2)

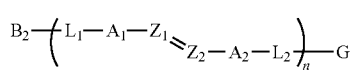

In general formula (2), $L_1$ and $L_2$ each independently represent a linking group, $A_1$ and $A_2$ each independently represent a substituted or unsubstituted aromatic hydrocarbon group or a substituted or unsubstituted aromatic heterocyclic group, $Z_1$ and $Z_2$ each independently represent N or CH, $B_2$ represents a second group capable of forming at least two hydrogen bonds complementarily with the first group, n is an integer of 1 to 10, and G represents a second group capable of forming at least two hydrogen bonds complementarily with the first group when n is 1, and represents an n-valent substituent or an n-valent third group capable of forming at least two hydrogen bonds complementarily with the first group when n is 2 to 10.

In general formula (2), the linking group capable of constituting $L_1$ and $L_2$ is, for example, a group selected from the group consisting of a single bond, an alkylene group (for example, methylene, 1,2-ethylene, 1,3-propylene, 1,4-butylene, or cyclohexane-1,4-diyl), an alkenylene group (for example, ethene-1,2-diyl or butadiene-1,4-diyl), an alkynylene group (for example, ethyne-1,2-diyl or butane-1,3-diyne-1,4-diyl), a linking group derived from a compound containing at least one aromatic group (for example, a substituted or unsubstituted benzene, a condensed polycyclic hydrocarbon, an aromatic heterocyclic ring, an aromatic hydrocarbon ring assembly, or an aromatic heterocyclic ring assembly), and a heteroatom-containing linking group (for example, a group containing an oxygen atom, a sulfur atom, a nitrogen atom, a silicon atom, or a phosphorus atom), or a group obtained by combining one or more selected from the group. Among these groups, $L_1$ and $L_2$ are each preferably a group selected from the group consisting of a single bond, an alkylene group (preferably an alkyl group having 1 to 12 carbon atoms), a linking group derived from a compound containing at least one aromatic group (preferably benzene), and a heteroatom-containing linking group (preferably, an oxygen atom or a nitrogen atom), or a group obtained by combining one or more selected from the group. These linking groups may each further have the above substituent, or the linking groups may be combined to form a composite group.

Here, examples of the heteroatom-containing linking group include —NH—, —NHCO—, —CO—, —COO—, —NHCOO—, —O—, and —S—. Among these groups, —NH—, —NHCO—, —CO—, and —COO— are preferable.

In a preferred embodiment, $L_1$ and $L_2$ each independently represent a group represented by (NHCO—R)$_n$— (in which R represents an alkyl group having 1 to 12 carbon atoms or an aryl group having 6 to 12 carbon atoms, and n is an integer of 1 to 6). R is preferably an alkyl group having 1 to 3 carbon atoms, a phenyl group, or a naphthyl group, and n is preferably an integer of 1 to 3. Specific examples of $L_1$ and $L_2$ include —NHCO—CH$_2$CH$_2$—, —NHCO—CH$_2$CH$_2$—NHCO—CH$_2$CH$_2$—, NHCO—(CH$_2$CH$_2$)$_2$—NHCO—CH$_2$CH$_2$—, —NHCO—CH(CH$_3$)CH$_2$—NHCO—CH$_2$CH$_2$—, and —NHCO-Ph-NHCO—CH$_2$CH$_2$— (in which Ph=C$_6$H$_4$).

In general formula (2), $A_1$ and $A_2$ each independently represent a substituted or unsubstituted aromatic hydrocarbon group or a substituted or unsubstituted aromatic heterocyclic group. The aromatic hydrocarbon group capable of constituting $A_1$ and $A_2$ in general formula (2) is not particularly limited, but is a divalent aromatic hydrocarbon group having 6 to 30 carbon atoms, and examples thereof include a group derived from a hydrocarbon (aromatic hydrocarbon) ring containing one or more aromatic rings each having 6 to 30 carbon atoms. When the aromatic hydrocarbon ring group contains two or more rings, the two or more rings may be bonded to each other by a single bond or condensed with each other. The aromatic hydrocarbon ring constituting the divalent aromatic hydrocarbon group having 6 to 30 carbon atoms is not particularly limited, but examples thereof include a benzene ring, a pentalene ring, an indene ring, a naphthalene ring, an anthracene ring, an azulene ring, a heptalene ring, an acenaphthalene ring, a phenalene ring, a fluorene ring, a phenanthrene ring, a biphenyl ring, a terphenyl ring, a triphenylene ring, a pyrene ring, a chrysene ring, a picene ring, a perylene ring, a pentaphene ring, a pentacene ring, a tetraphene ring, a hexaphene ring, a hexacene ring, a rubicene ring, a trinaphthylene ring, a heptaphene ring, and a pyranthrene ring. That is, examples of the divalent aromatic hydrocarbon group having 6 to 30 carbon atoms include groups derived from these rings and groups derived from combinations of these rings. Note that here, a "group derived from a ring" and a "group derived from a combination of rings" each represent a group obtained by removing hydrogen atoms directly bonded to a ring-forming element from a ring structure, the number of hydrogen atoms corresponding to a valence of the ring-forming element, such that the ring-forming element has a free valence.

The aromatic heterocyclic group capable of constituting $A_1$ and $A_2$ in general formula (2) is not particularly limited, but is a divalent aromatic heterocyclic group having 5 to 30 ring-forming atoms, and examples thereof include a group derived from a ring (aromatic heterocyclic ring) having 5 to 60 ring-forming atoms and containing one or more aromatic rings each having one or more heteroatoms (for example, a nitrogen atom (N), an oxygen atom (O), a phosphorus atom (P), or a sulfur atom (S)) and having carbon atoms (C) as the remaining ring-forming atoms. When the aromatic heterocyclic group contains two or more rings, the two or more rings may be bonded to each other by a single bond or condensed with each other. The aromatic heterocyclic ring constituting the divalent aromatic heterocyclic group is not particularly limited, but examples thereof include a π-electron deficient aromatic heterocyclic ring, a π-electron excess aromatic heterocyclic ring, and a π-electron deficient-π-electron excess mixed aromatic heterocyclic ring obtained by mixing a π-electron deficient aromatic heterocyclic ring and a π-electron excess aromatic heterocyclic ring. Specific examples of the π-electron deficient aromatic heterocyclic ring include a pyridine ring, a pyrazine ring, a pyridazine ring, a pyrimidine ring, a triazine ring, a quinoline ring, an isoquinoline ring, a quinoxaline ring, a quinazoline ring, a naphthyridine ring, an acridine ring, a phenazine ring, a benzoquinoline ring, a benzoisoquinoline ring, a phenanthridine ring, a phenanthroline ring, a benzoquinone ring, a coumarin ring, an anthraquinone ring, and a fluorenone ring. Specific examples of the π-electron excess aromatic heterocyclic ring include a furan ring, a thiophene ring, a benzofuran ring, a benzothiophene ring, a dibenzofuran ring, a dibenzothiophene ring, a pyrrole ring, an indole ring, a carbazole ring, and an indolocarbazole ring. Specific examples of the π-electron deficient-π-electron excess mixed aromatic heterocyclic ring include an imidazole ring, a benzimidazole ring, a pyrazole ring, an indazole ring, an oxazole ring, an isoxazole ring, a benzoxazole ring, a benzisoxazole ring, a thiazole ring, an isothiazole ring, a benzothiazole ring, a benzisothiazole ring, an imidazolinone ring, a benzimidazolinone ring, an imidazopyridine ring, an imidazopyrimidine ring, an imidazophenansuridine ring, a benzimidazophenansuridine ring, an azadibenzofuran ring, an azacarbazole ring, an azadibenzothiophene ring, a diazadibenzofuran ring, a diazacarbazole ring, a dibenzothiophene ring, a xanthone ring, and a thioxanthone ring. That is, examples of the divalent aromatic heterocyclic group having 5 to 30 ring-forming atoms include groups derived from these rings and groups derived from combinations of these rings.

In general formula (2), $Z_1$ and $Z_2$ each independently represent N or CH. In a preferred embodiment, $Z_1$ and $Z_2$ each independently represent N or CH and $Z_1 \neq Z_2$. $Z_1$ and $Z_2$ each represent a monovalent group similar to the aromatic heterocyclic group.

In general formula (2), $B_2$ represents the second group that is a complementary multiple hydrogen bonding group, and forms two or more hydrogen bonds complementarily with $B_1$ that is the first group. The complementary multiple hydrogen bonding group has been described above, and therefore description thereof is omitted.

In general formula (2), n is an integer of 1 to 10, preferably an integer of 1 to 8, more preferably an integer of 1 to 5, and still more preferably an integer of 1 to 4.

In general formula (2), G represents the second group that is a complementary multiple hydrogen bonding group when n is 1, and forms two or more hydrogen bonds complementarily with $B_1$ that is the first group. The complementary multiple hydrogen bonding group has been described above, and therefore description thereof is omitted.

In general formula (2), G represents an n-valent substituent or an n-valent third group capable of forming at least two hydrogen bonds complementarily with the first group when n is 2 to 10. Here, the n-valent third group has n bonds in the complementary multiple hydrogen bonding group capable of forming two or more hydrogen bonds with the first group. Therefore, the n-valent third group is an n-valent group derived from the compound described in the complementary multiple hydrogen bonding group.

Examples of the n-valent substituent capable of constituting G in general formula (2) include various groups, and are not particularly limited, but examples thereof include n-valent groups of a substituted or unsubstituted aliphatic hydrocarbon group, a substituted or unsubstituted aromatic hydrocarbon group, and a substituted or unsubstituted aromatic heterocyclic group. The n-valent substituent may be obtained by bonding two or more selected from an aliphatic hydrocarbon group, an aromatic hydrocarbon group, and an aromatic heterocyclic group to each other by a single bond to be combined. In addition, one or more groups selected from the group consisting of —O—, —NHCO—, —CO—, and —COO— may be incorporated in an aliphatic hydrocarbon group, an aromatic hydrocarbon group, or an aromatic heterocyclic group, which is an n-valent substituent capable of constituting G.

The aliphatic hydrocarbon group which is an n-valent substituent capable of constituting G is not particularly limited, but is an n-valent aliphatic hydrocarbon group having 1 to 30 carbon atoms, and examples thereof include an n-valent saturated aliphatic hydrocarbon group having 1 to 30 carbon atoms and an n-valent unsaturated aliphatic hydrocarbon group having 2 to 30 carbon atoms. Note that examples of the n-valent aliphatic hydrocarbon group include a linear or branched aliphatic hydrocarbon group and an alicyclic hydrocarbon group having 3 to 30 carbon atoms.

Note that examples of the n-valent aliphatic hydrocarbon group include an alkyl group having 1 to 20 carbon atoms when n=1, an alkylene group having 1 to 20 carbon atoms when n=2, an alkanetriyl group having 2 to 20 carbon atoms when n=3, and an alkanetetrayl group having 3 to 20 carbon atoms when n=4.

The aromatic hydrocarbon group which is an n-valent substituent capable of constituting G is not particularly limited, but is an n-valent aromatic hydrocarbon group having 6 to 30 carbon atoms, and for example, an n-valent group derived from an aromatic hydrocarbon ring constituting a divalent aromatic hydrocarbon group having 6 to 30 carbon atoms capable of constituting $A_1$ and $A_2$ can be similarly applied.

The aromatic heterocyclic group which is an n-valent substituent capable of constituting G is not particularly limited, but is an n-valent aromatic heterocyclic group having 5 to 30 ring-forming atoms, and for example, an n-valent group derived from an aromatic heterocyclic ring constituting a divalent aromatic heterocyclic group having 6 to 30 carbon atoms capable of constituting $A_1$ and $A_2$ can be similarly applied. Among these groups, the aromatic heterocyclic group which is an n-valent substituent capable of constituting G is preferably a group derived from a triazine ring.

Examples of the n-valent substituent capable of constituting G in general formula (2) include n-valent groups (residues) derived from a thiol compound obtained by esterifying a polyhydric alcohol such as pentaerythritol, dipentaerythritol, trimethylolpropane, ditrimethylolpropane, triazine, 1,3,5-benzenetricarboxylic acid, pentaerythritol, dipentaerythritol, trimethylolpropane, or ditrimethylolpropane with mercaptoacetic acid or 3-mercaptopropionic acid.

In a preferred embodiment, the n-valent substituent is represented by any one of the following structural formulas (x-1) to (x-13). In the following structures, the moiety represented by "*" represents a bond with $L_2$ in general formula (2). Note that in the following structural formulas (x-1) and (x-2), R represents an alkyl group having 1 to 10 carbon atoms.

[Chemical formula 5]

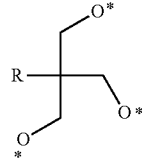

x-1

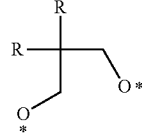

x-2

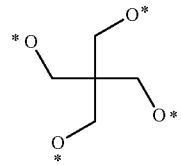

x-3

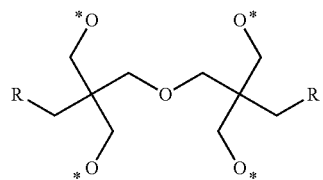

x-4

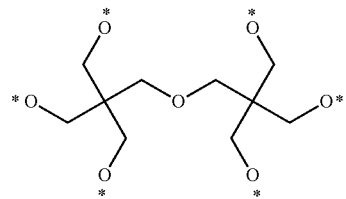

x-5

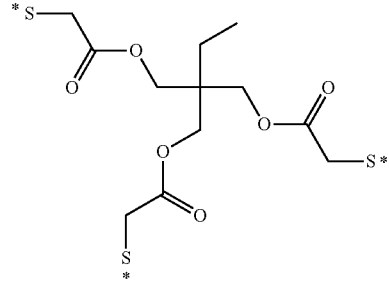

x-6

-continued
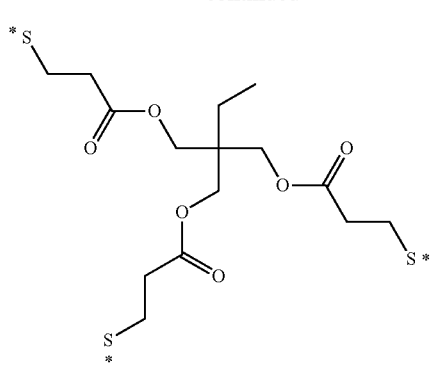
x-7
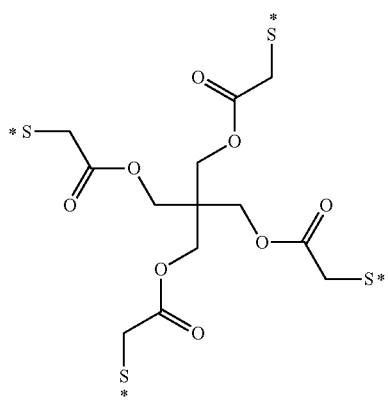
x-8
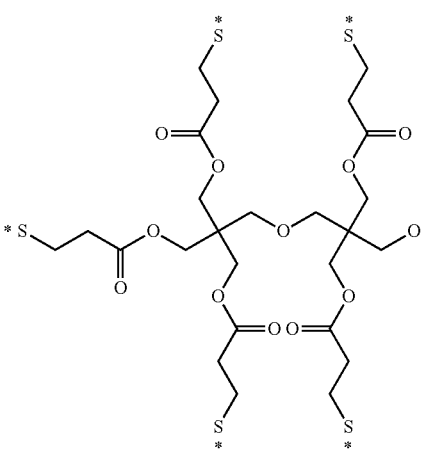
x-9
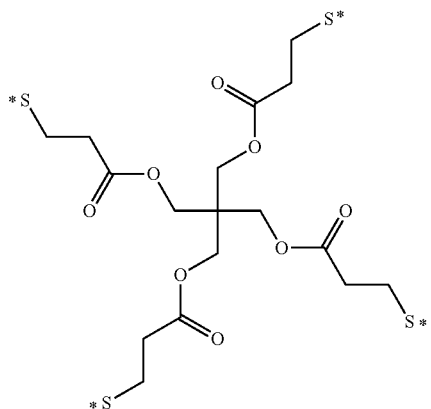
x-10
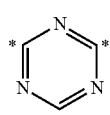
x-11
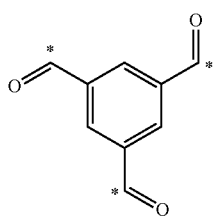
x-12
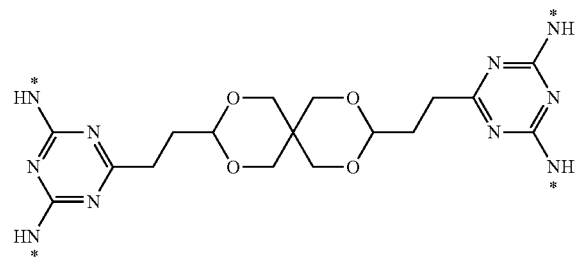
x-13
Examples of the photoisomerization compound represented by general formula (2) include compounds 1 to 154 illustrated below.
[Chemical formula 6]
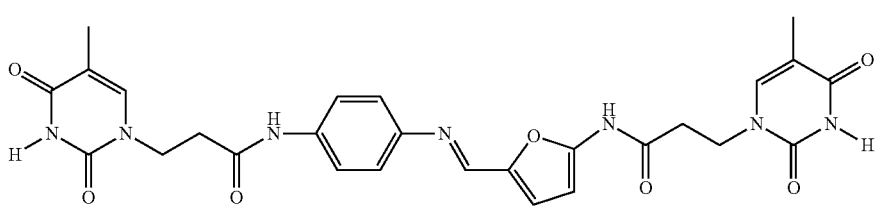
1

-continued
2
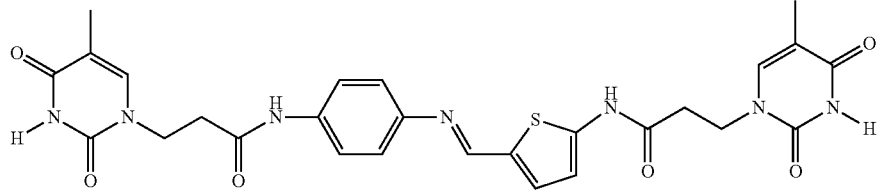
3
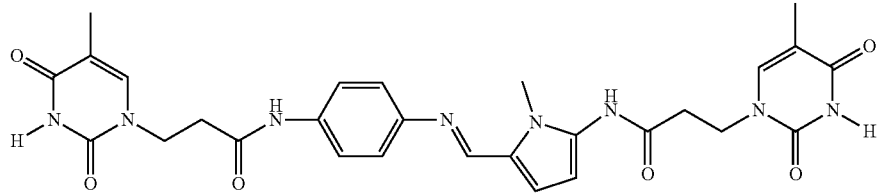
4
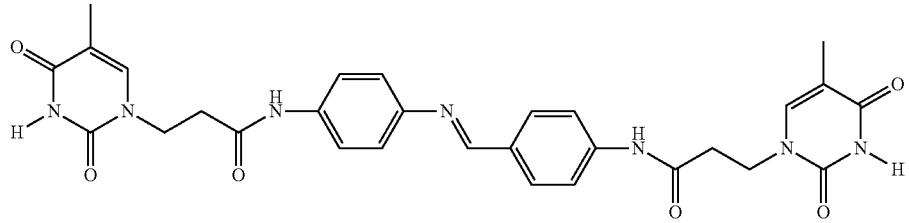
5
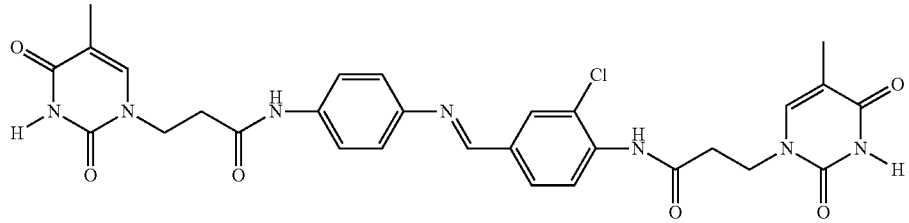
6
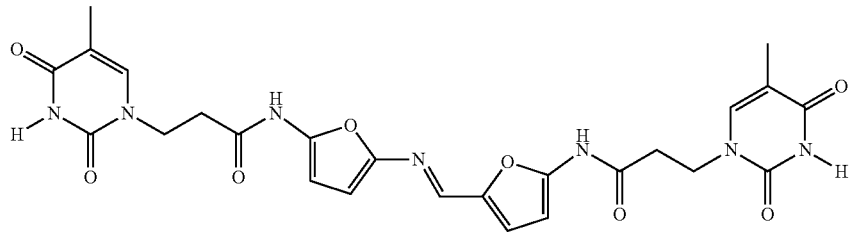
7
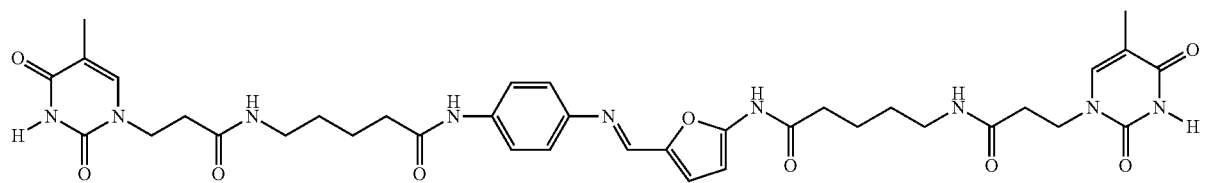
8
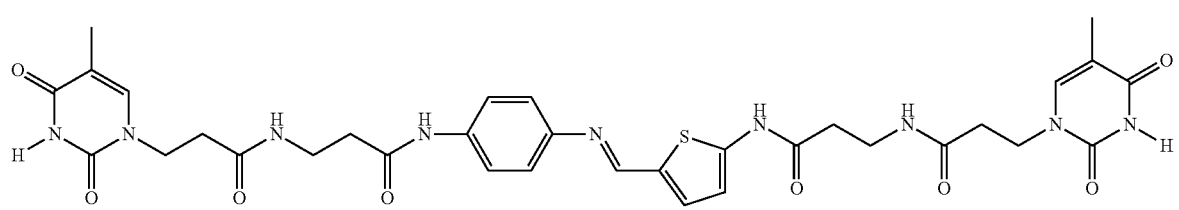

9
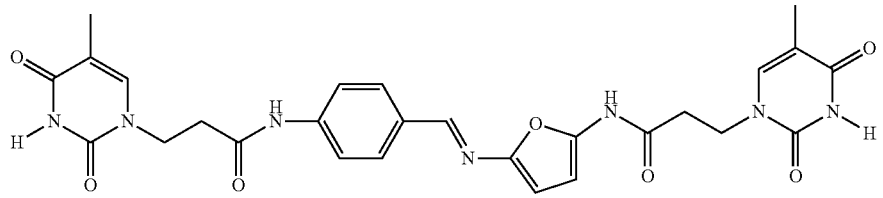
10
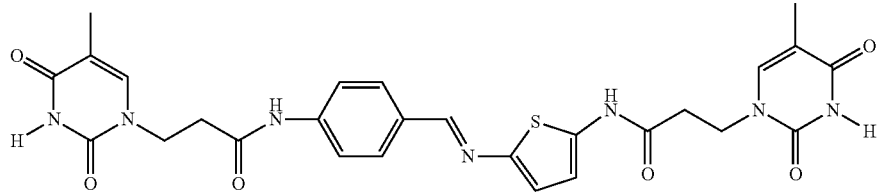
11
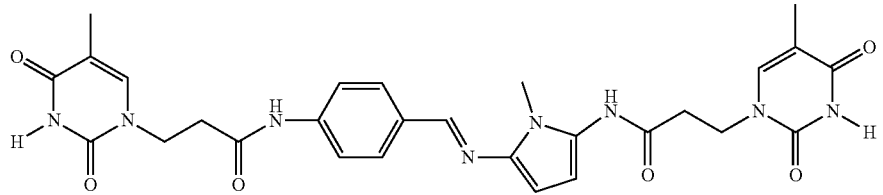
12
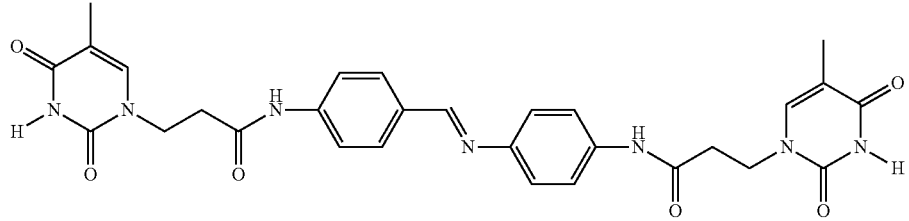
13
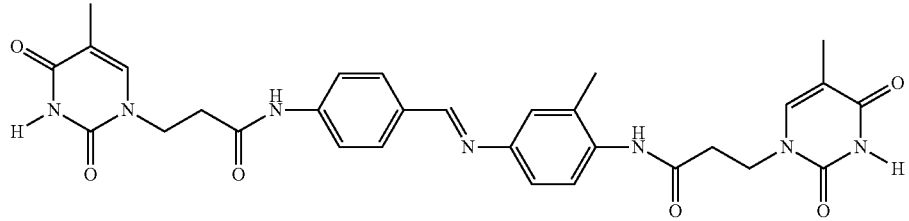
14
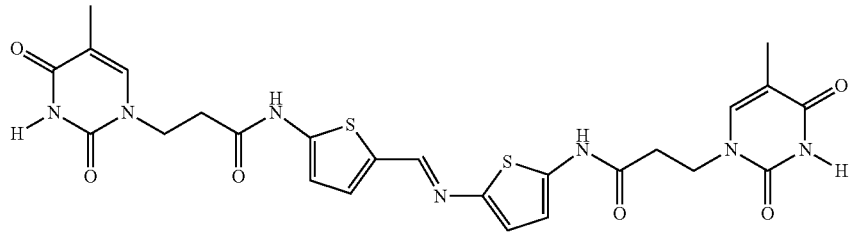
15
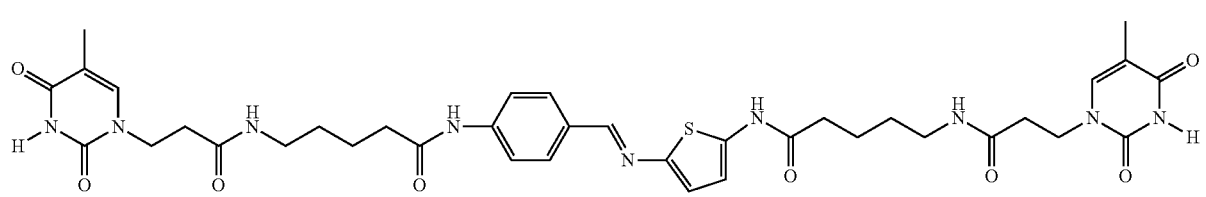

-continued
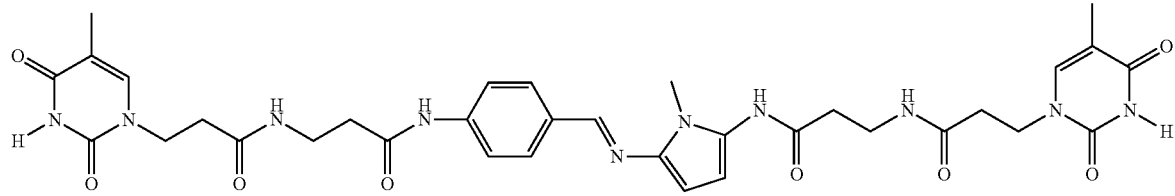
16
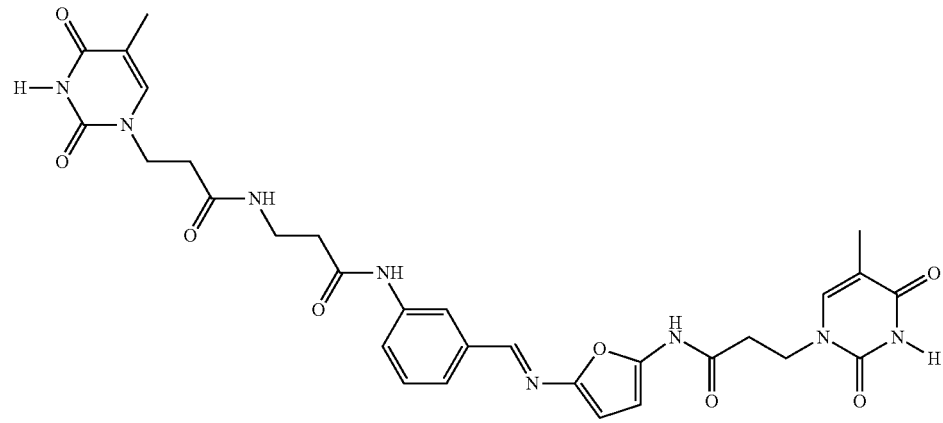
17
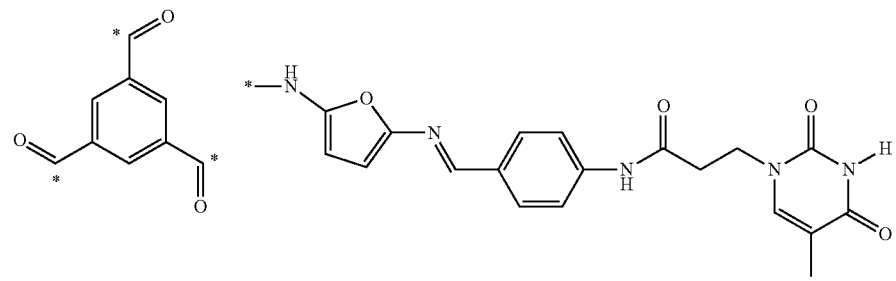
18
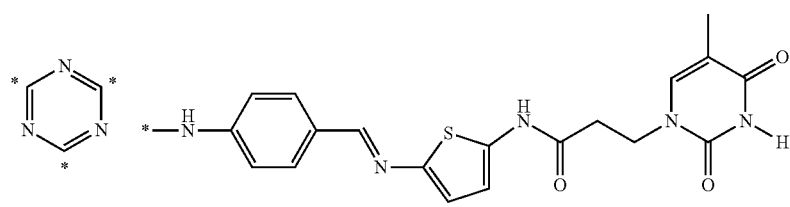
19
[Chemical formula 7]
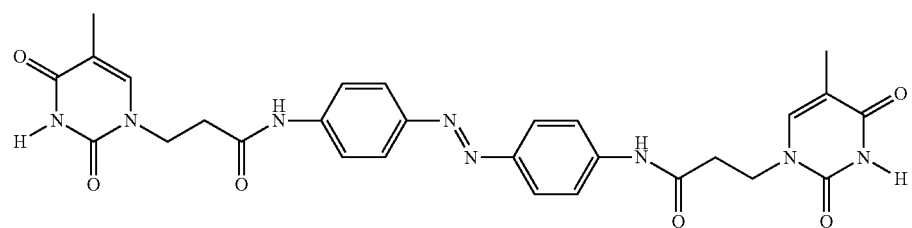
20

-continued
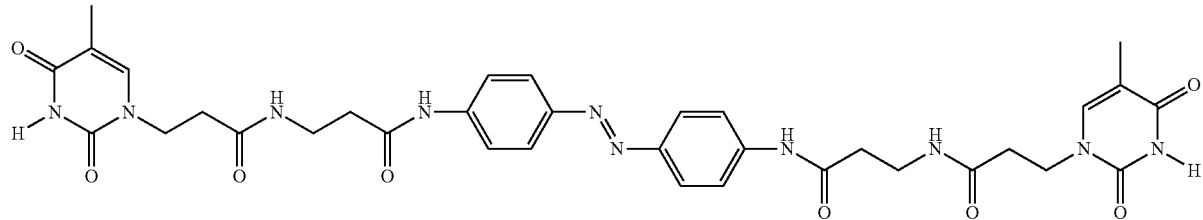
21
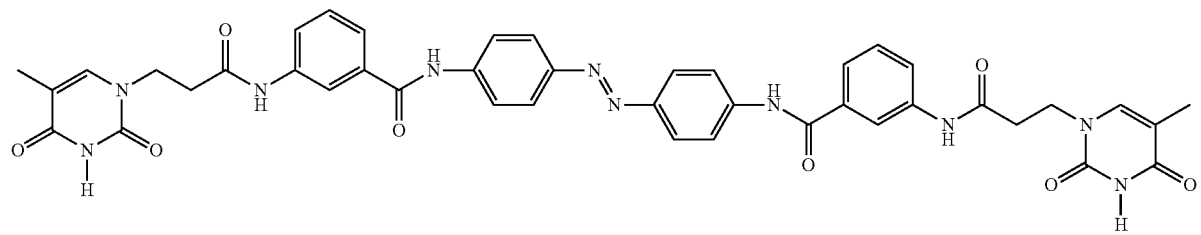
22
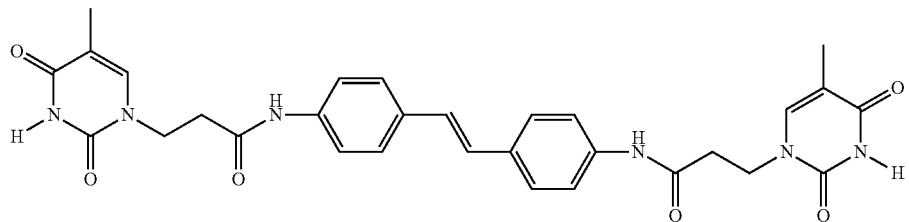
23
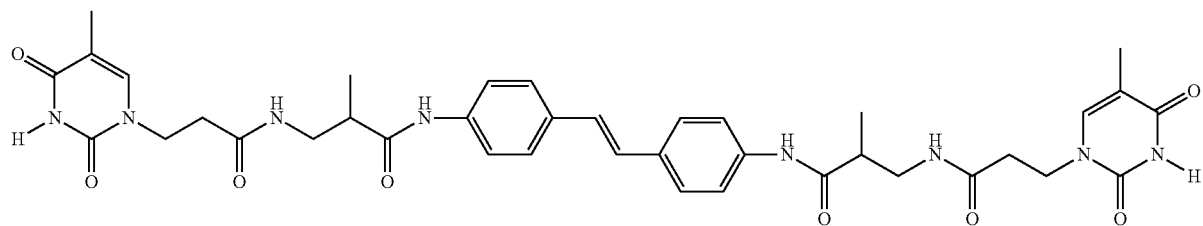
24
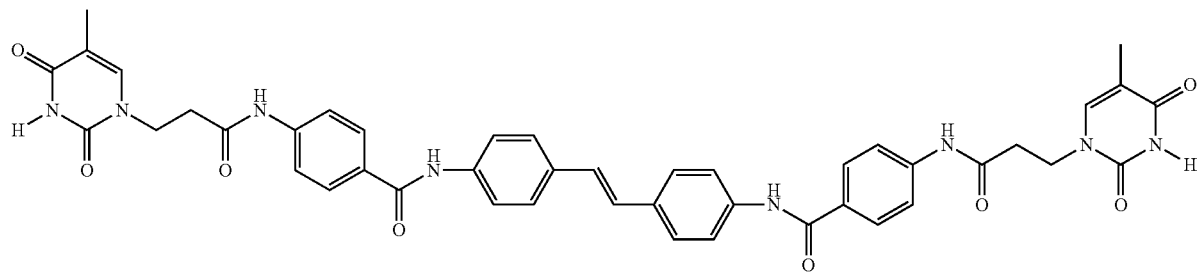
25
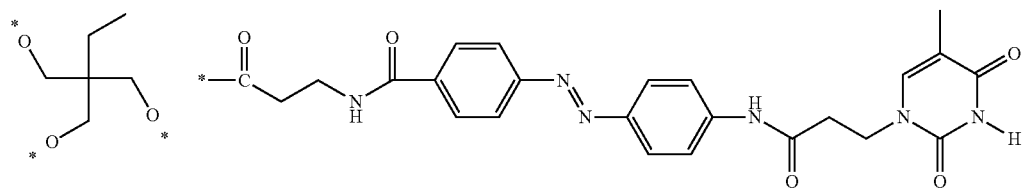
26

-continued
27
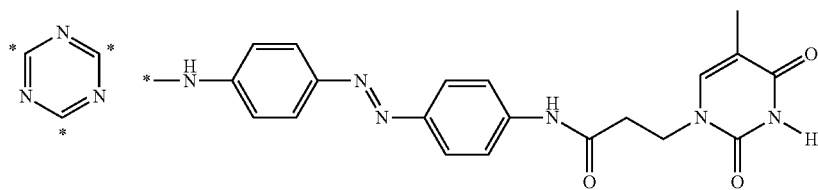
28
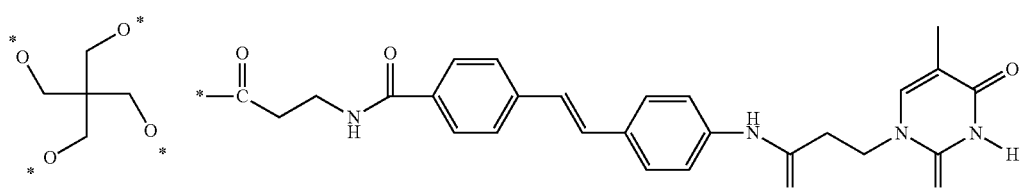
29
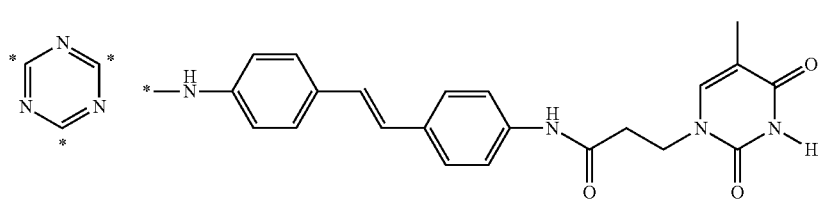
[Chemical formula 8]
30
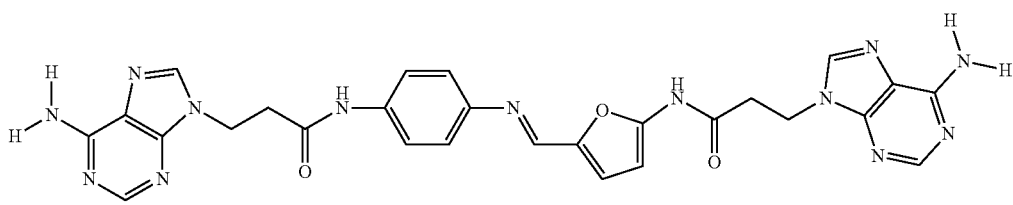
31
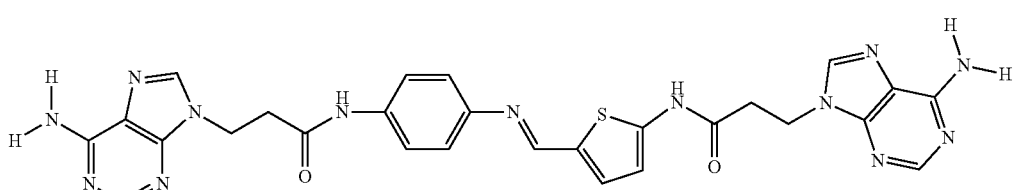
32
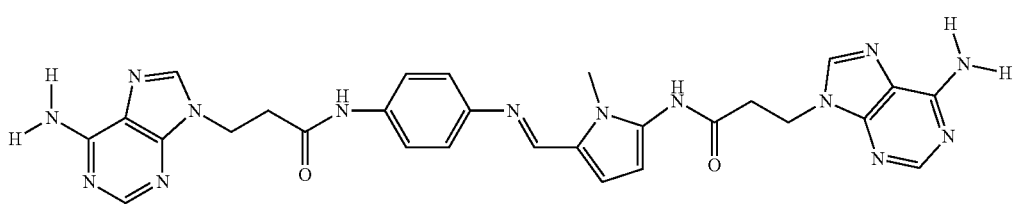
33
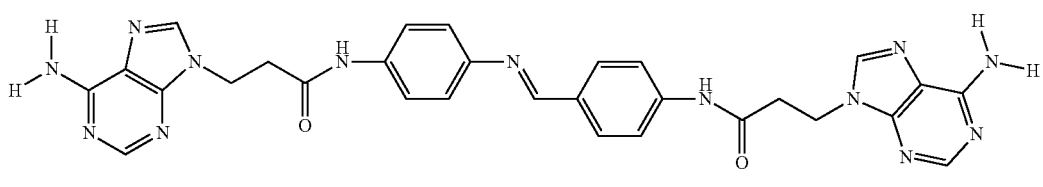
34
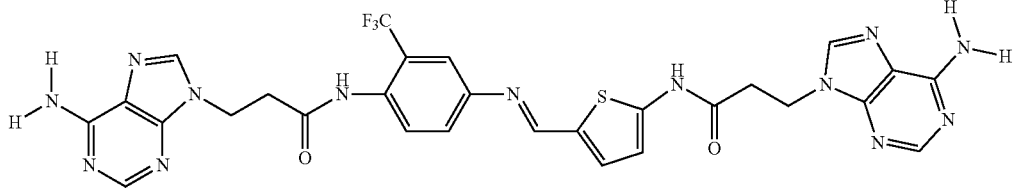

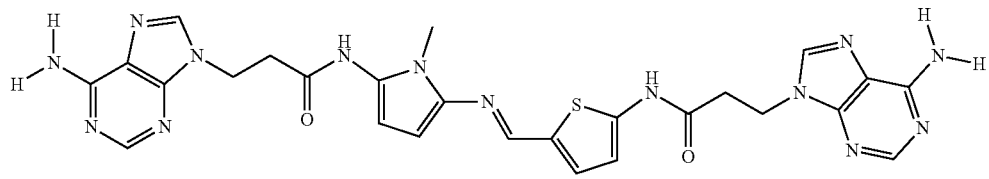
35
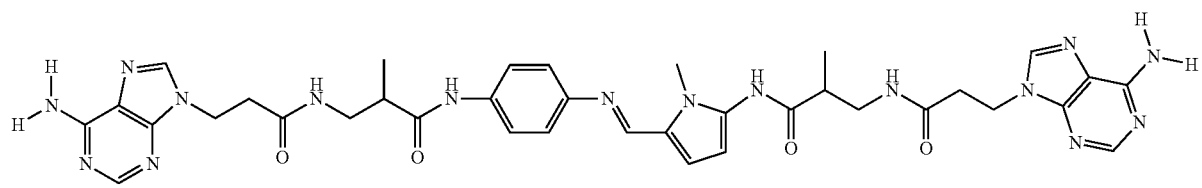
36
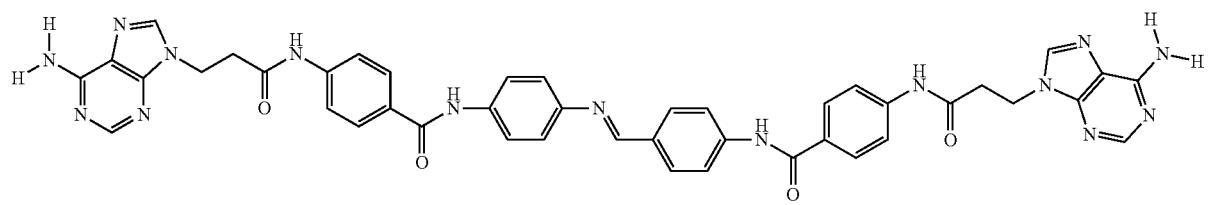
37
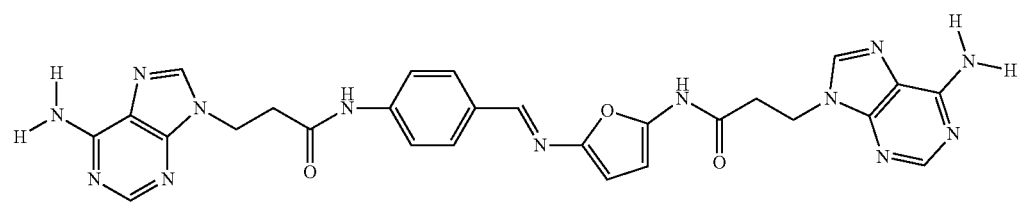
38
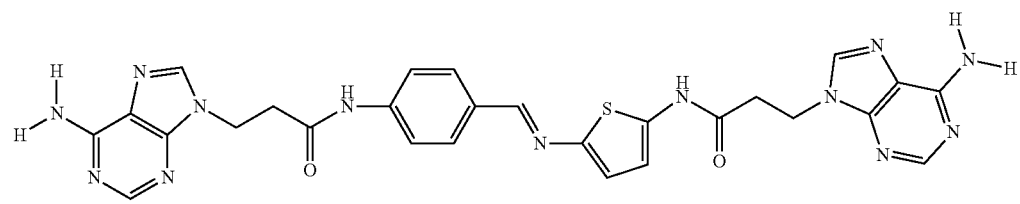
39
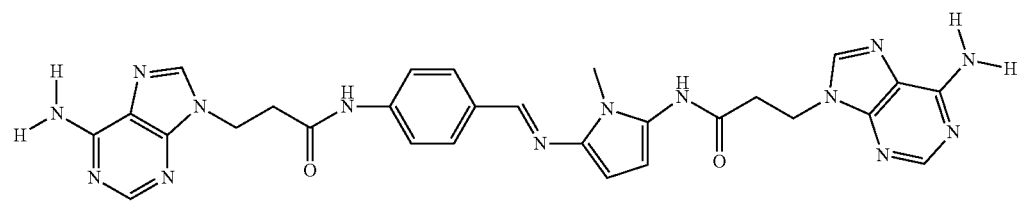
40
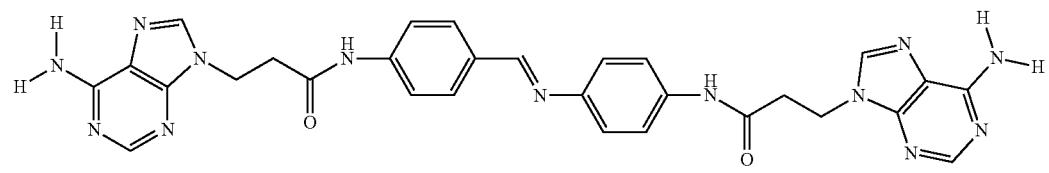
41
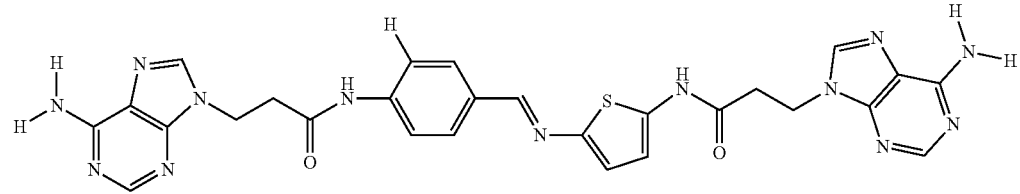
42

43
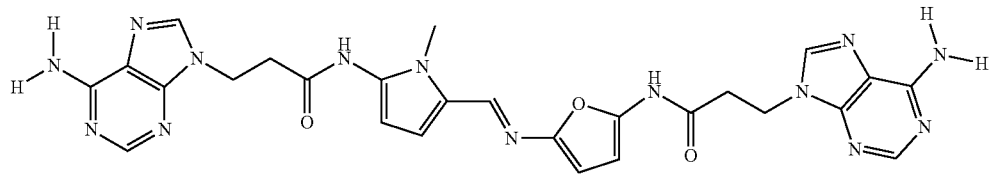
44
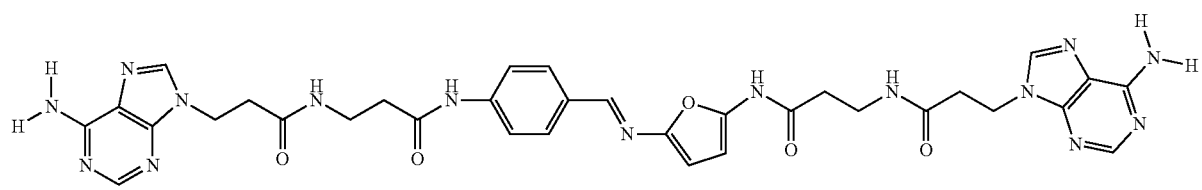
45
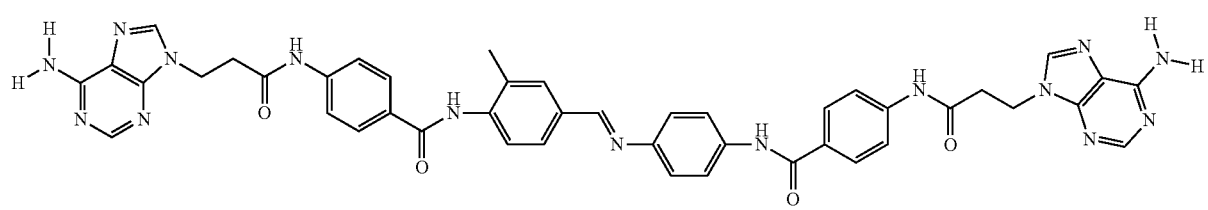
46
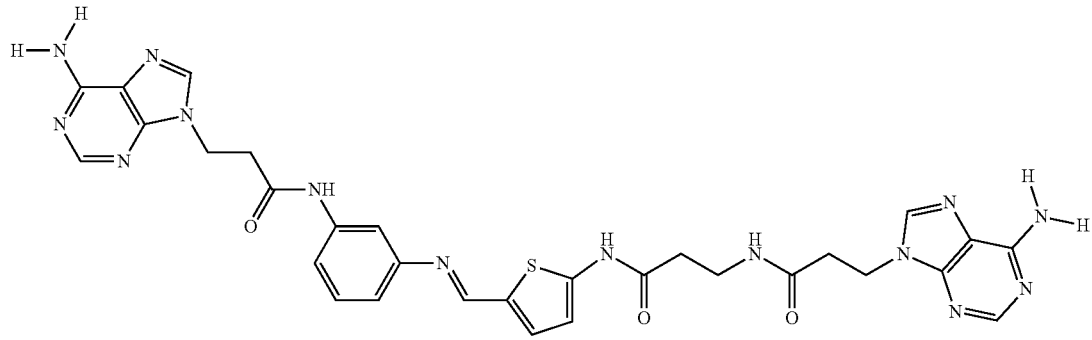
47
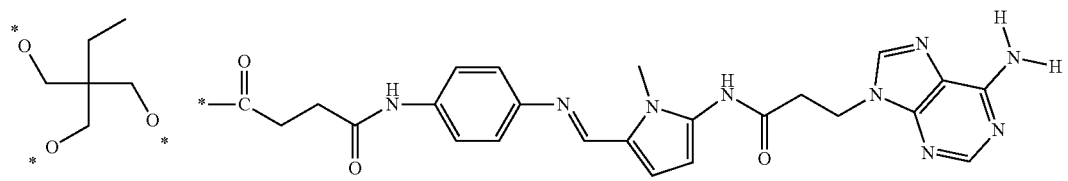
48
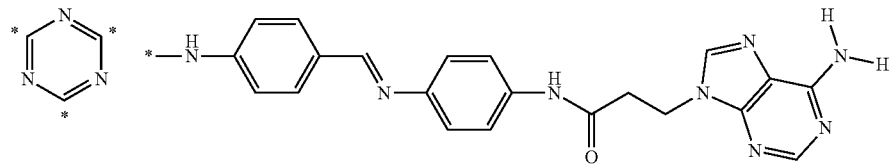
[Chemical formula 9]
49
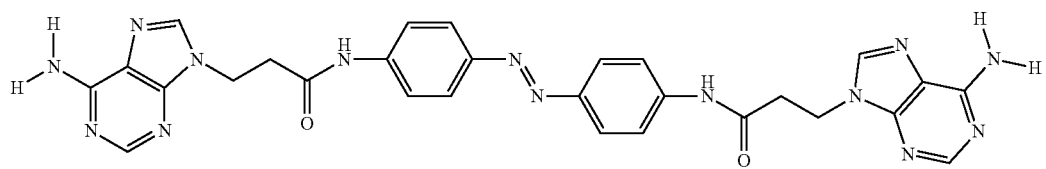

-continued
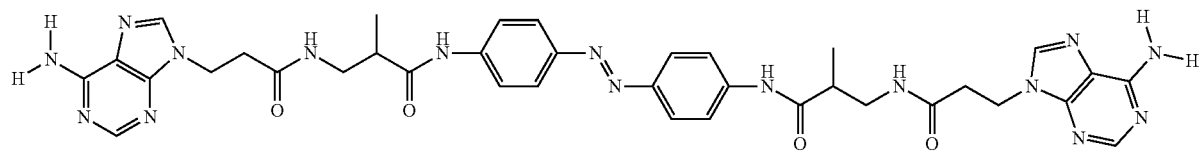
50
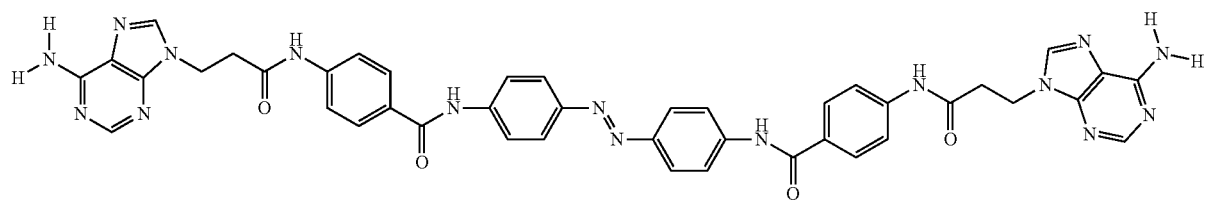
51
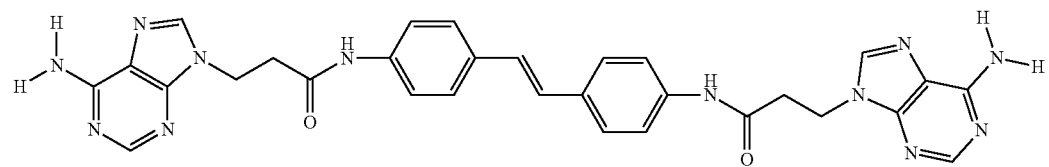
52
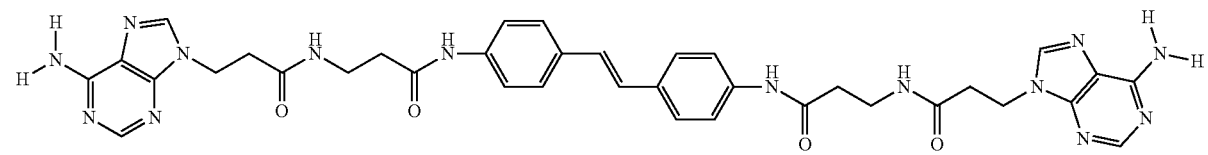
53
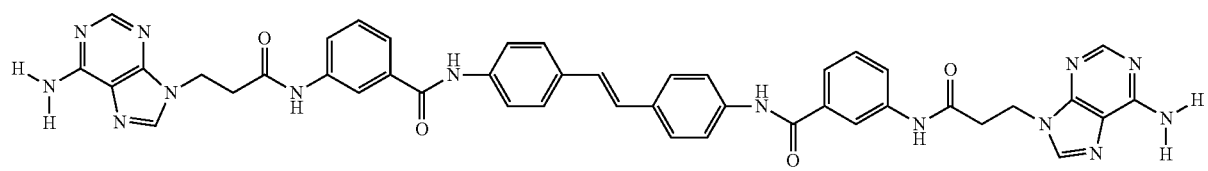
54
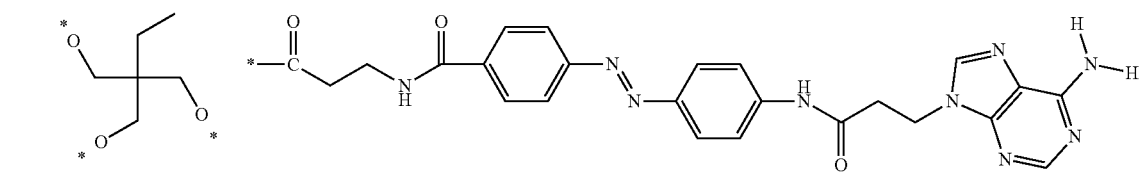
55
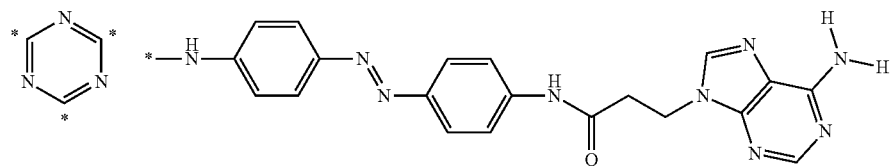
56
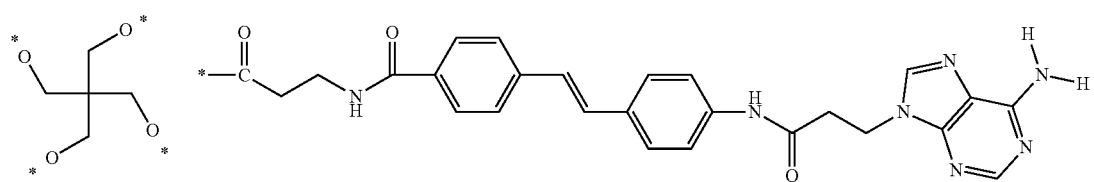
57

-continued
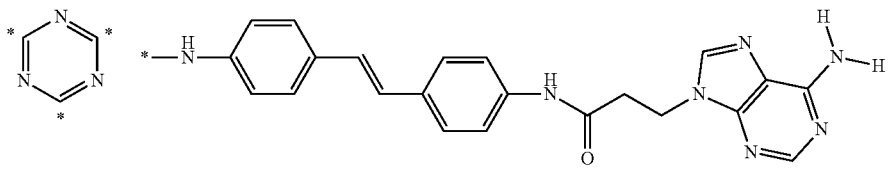
58
[Chemical formula 10]
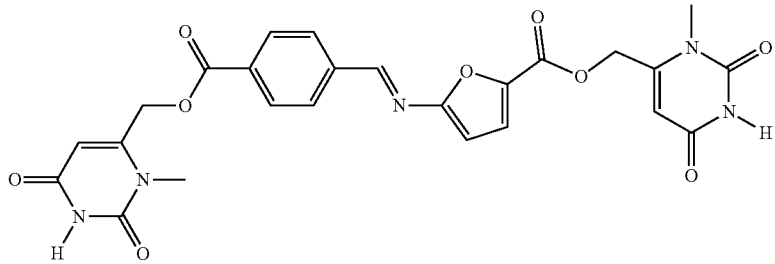
59
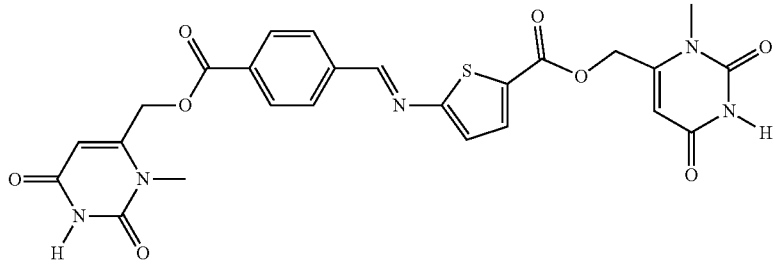
60
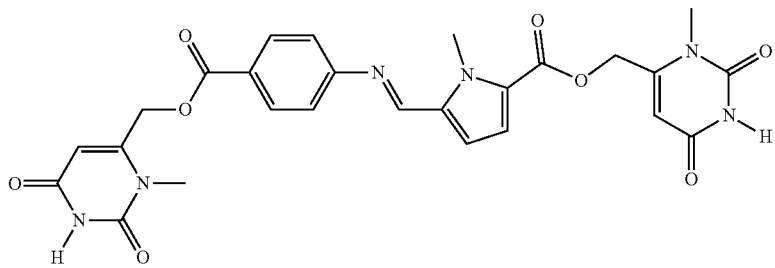
61
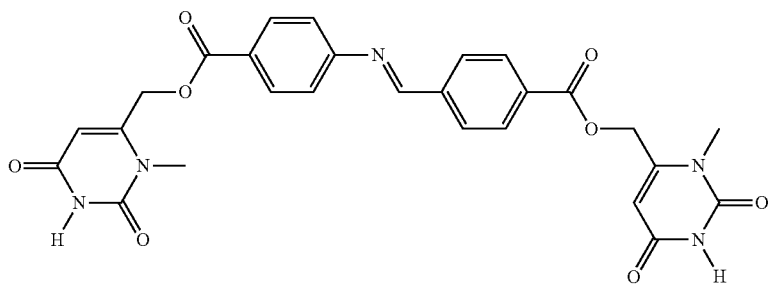
62
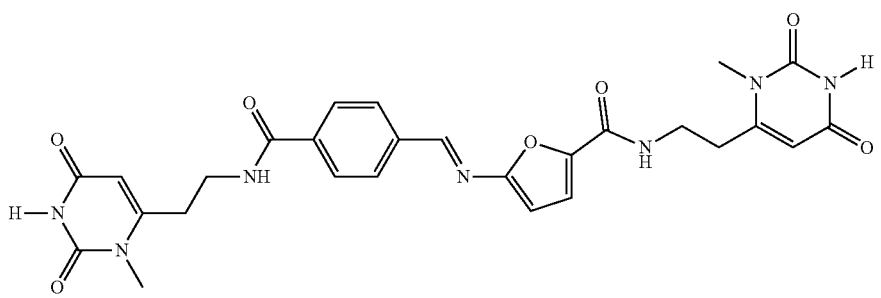
63

-continued
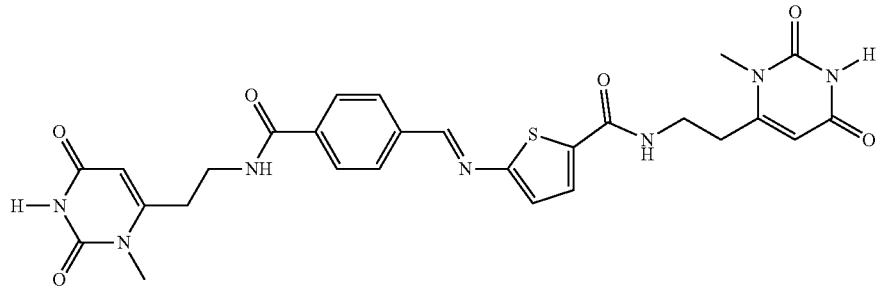
64
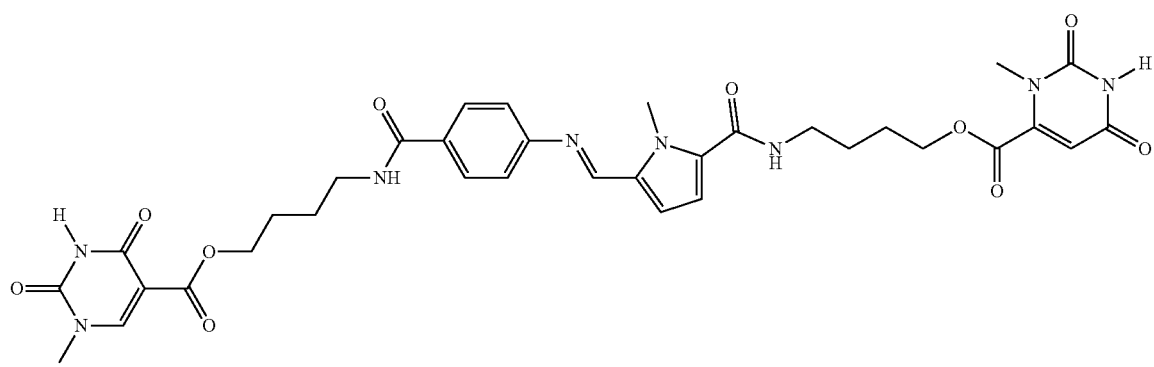
65
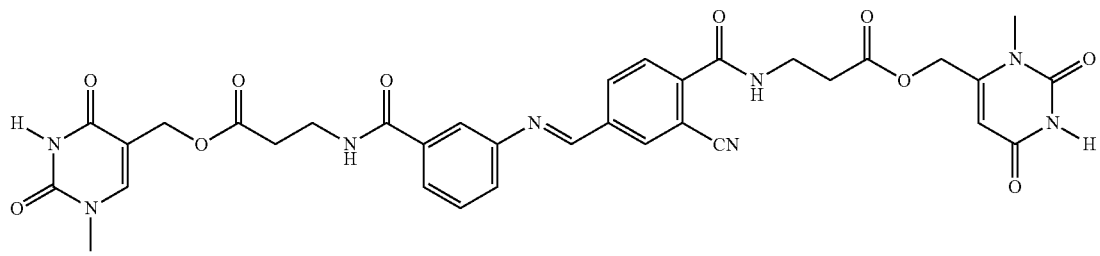
66
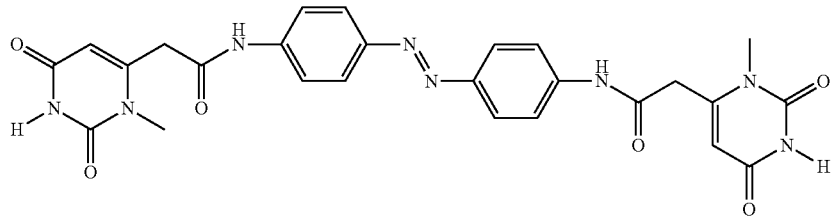
67
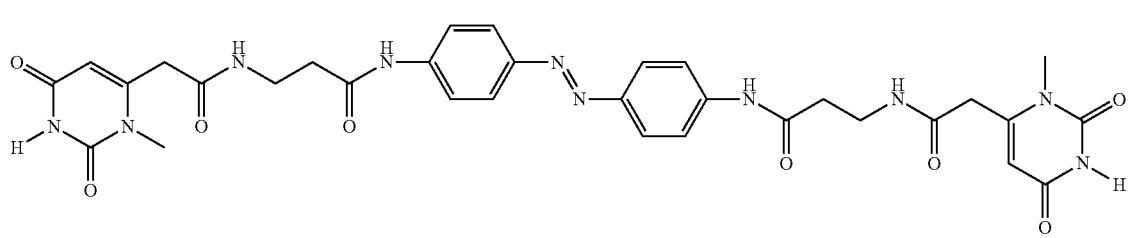
68

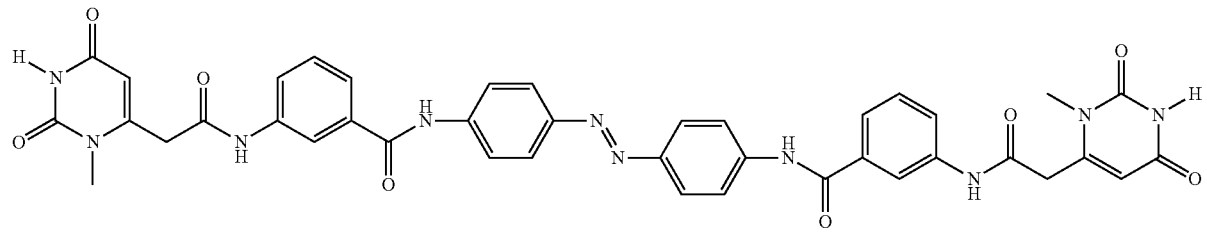
69
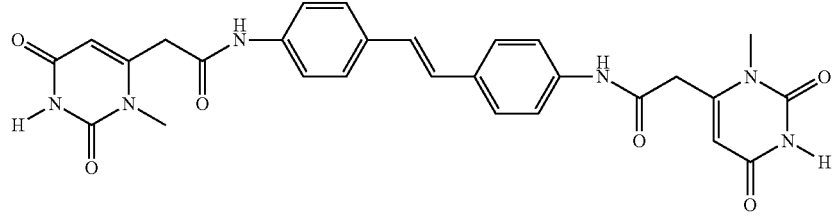
70
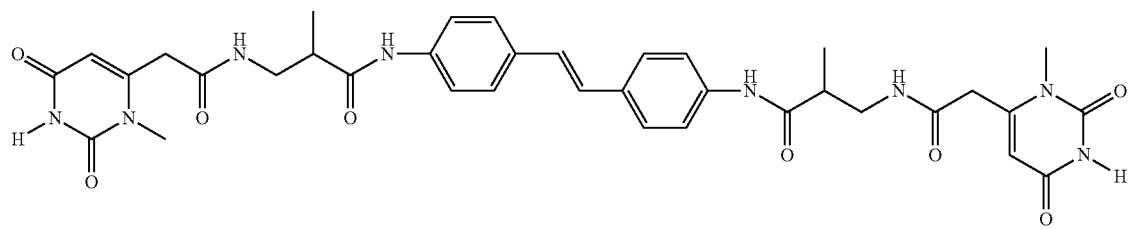
71
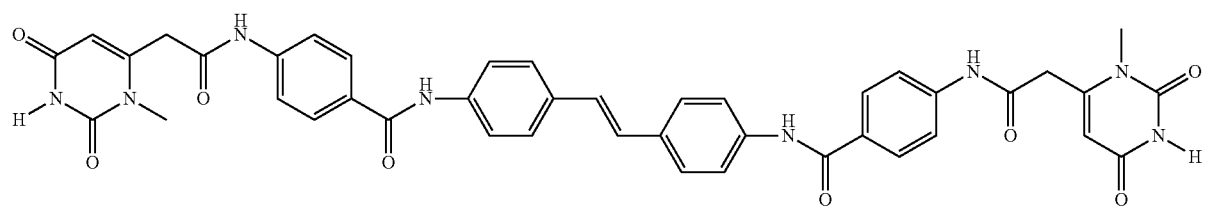
72
[Chemical formula 11]
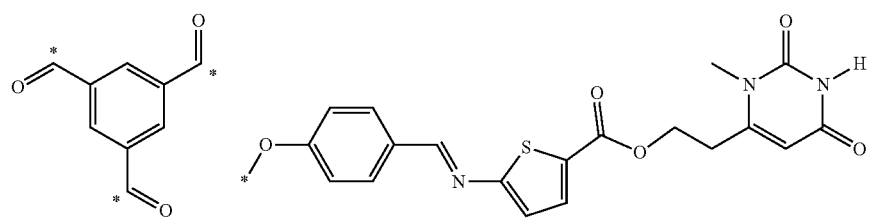
73
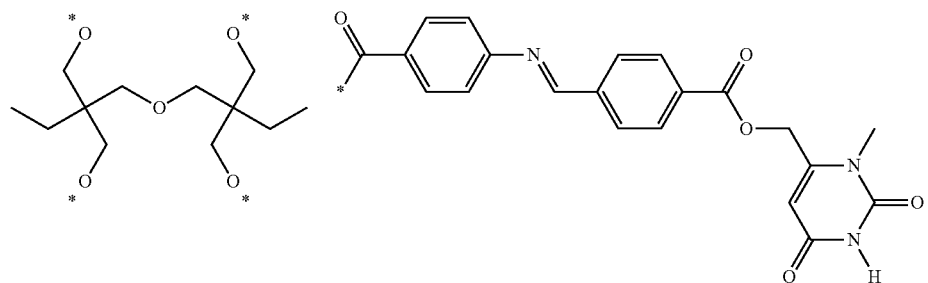
74

-continued
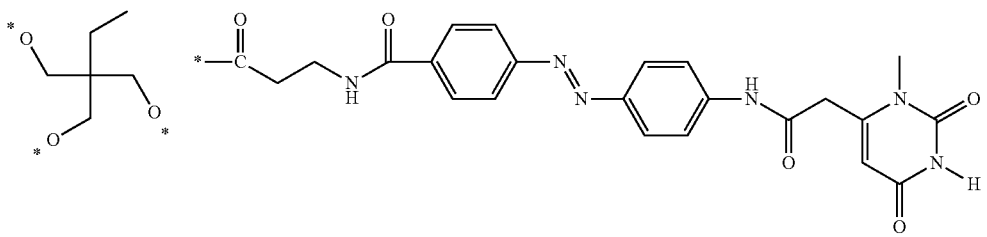
75
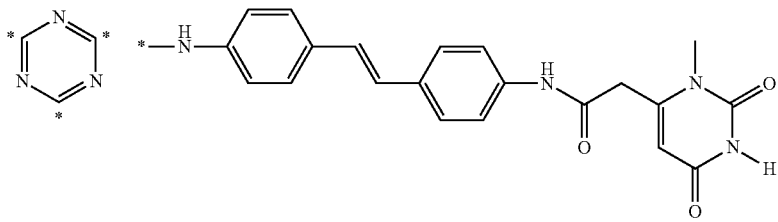
76
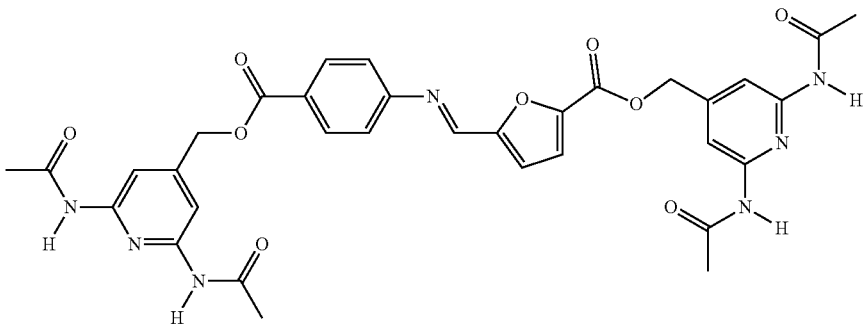
77
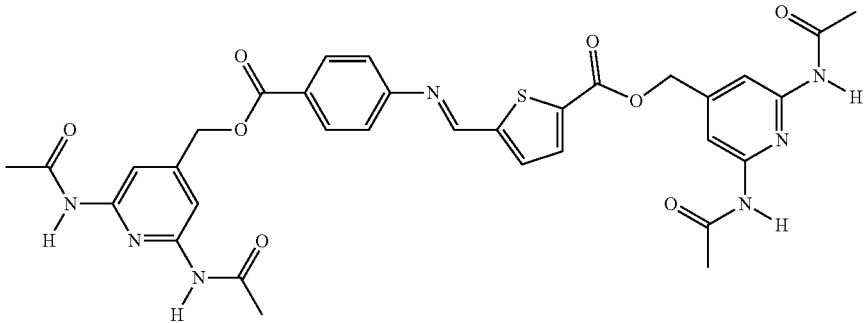
78
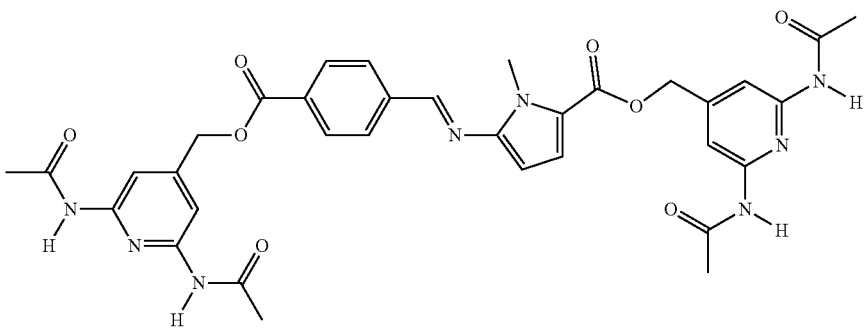
79

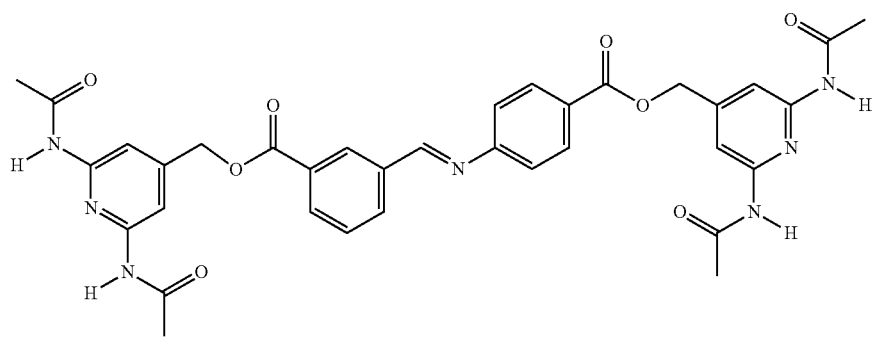
80
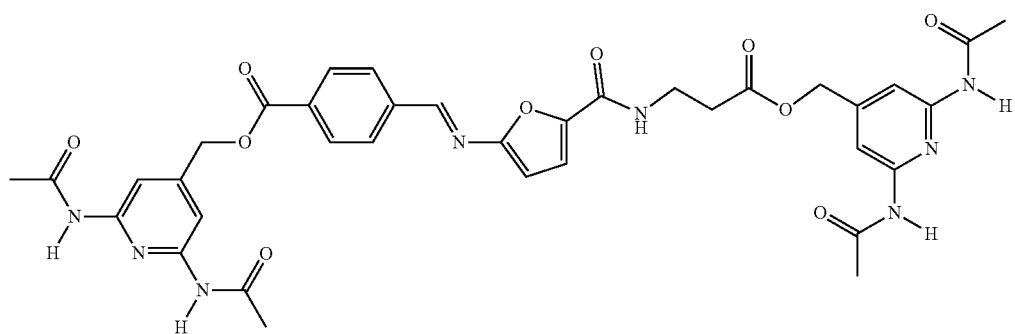
81
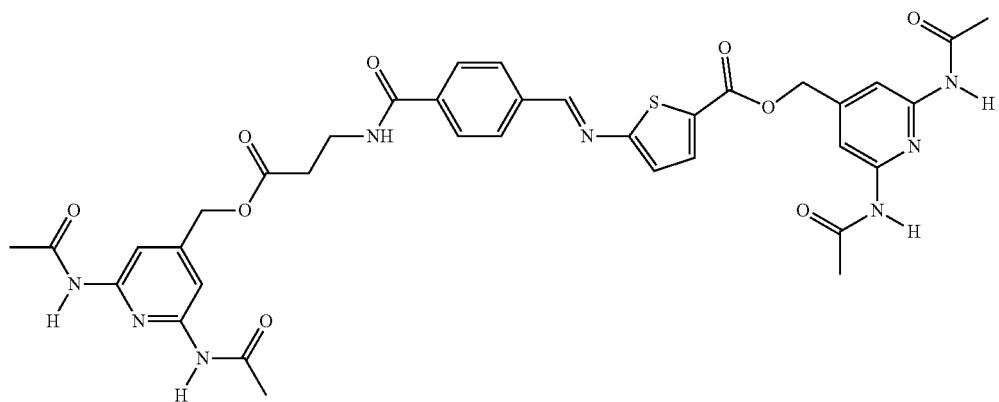
82
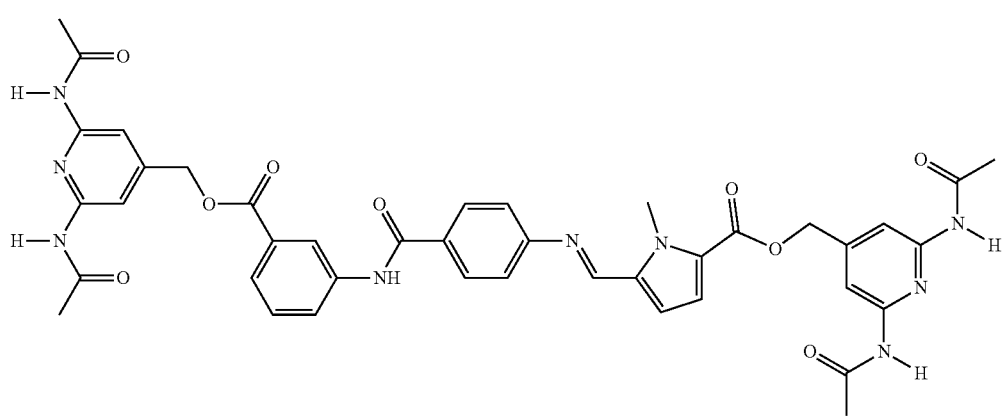
83

-continued
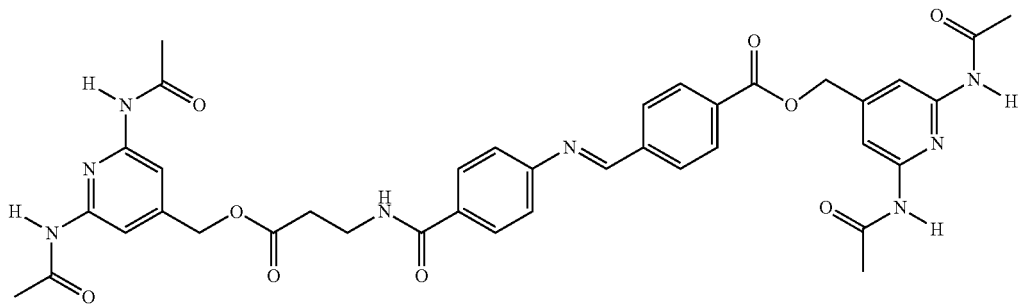
84
[Chemical formula 12]
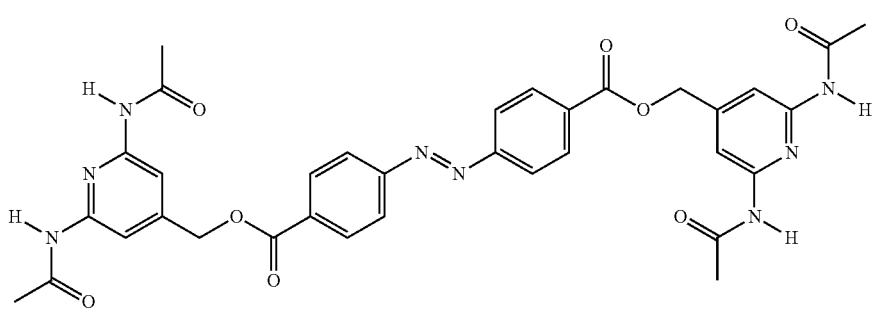
85
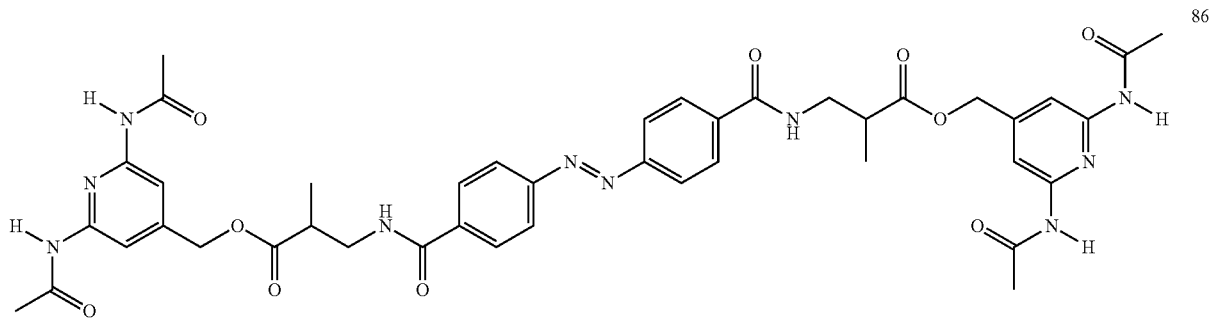
86
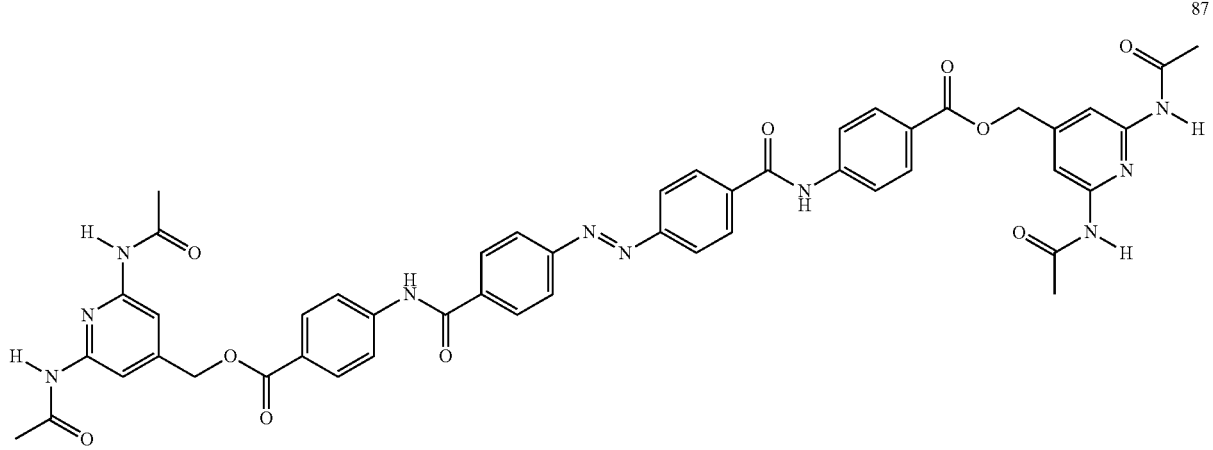
87

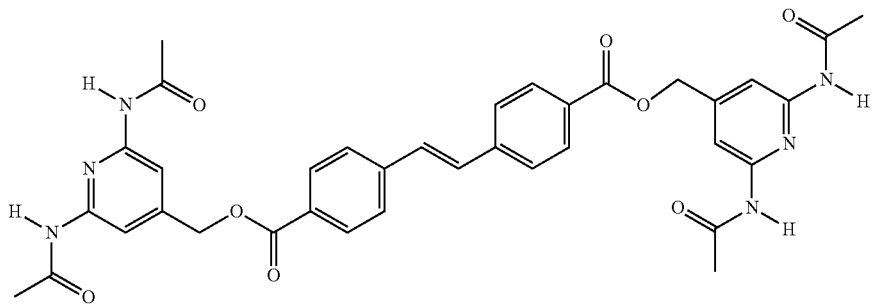
88
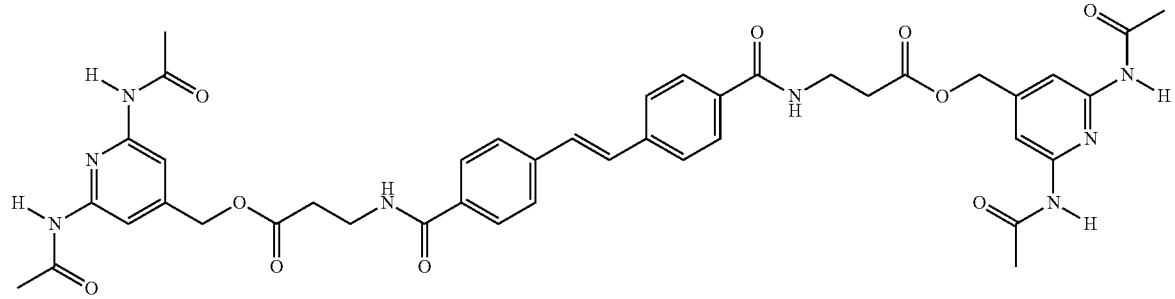
89
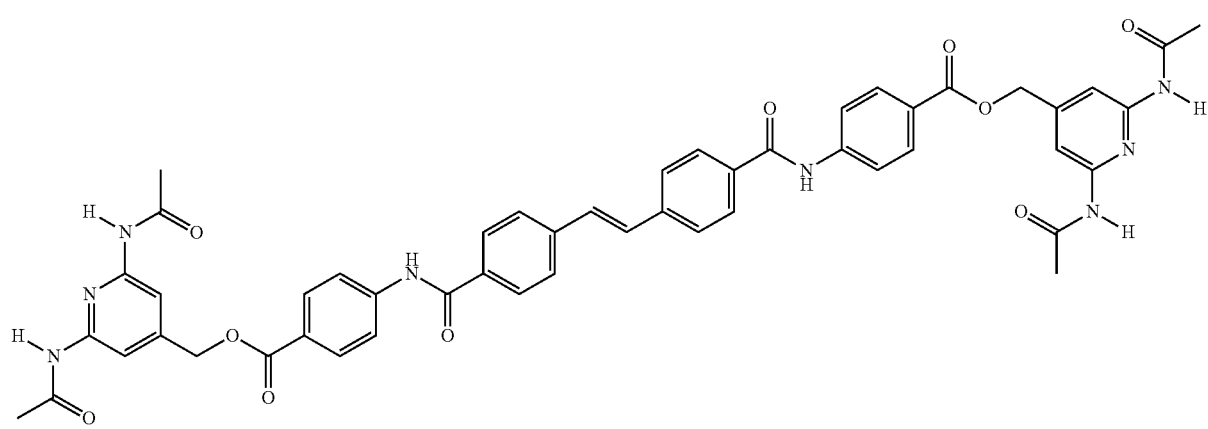
90
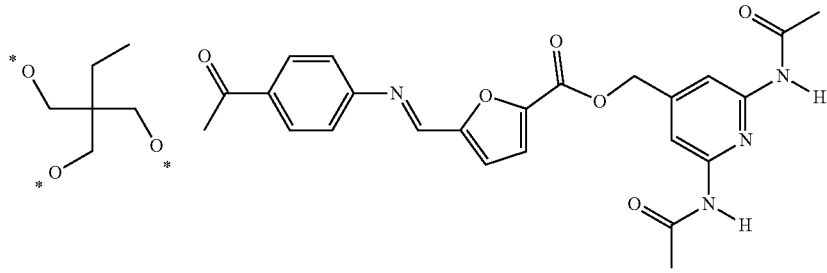
91
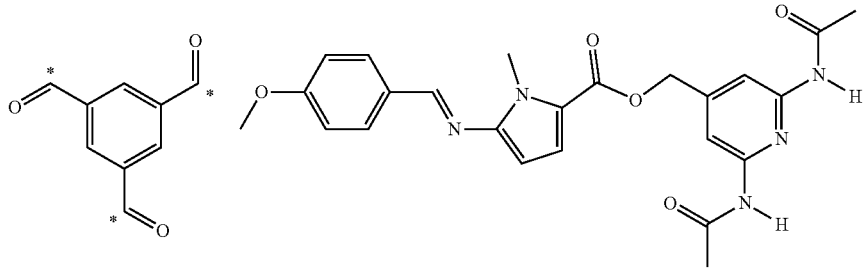
92

-continued
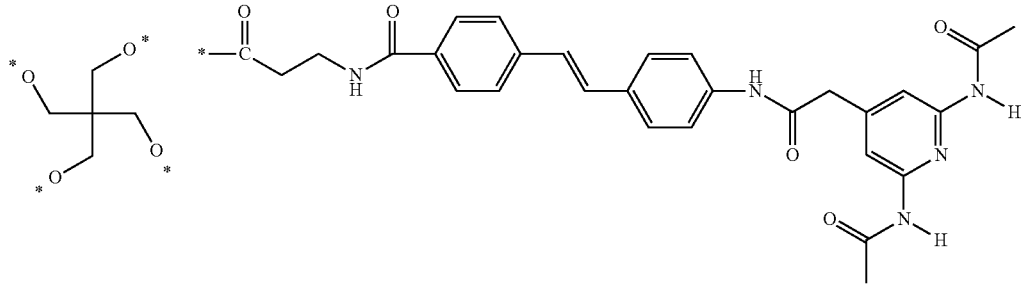
93
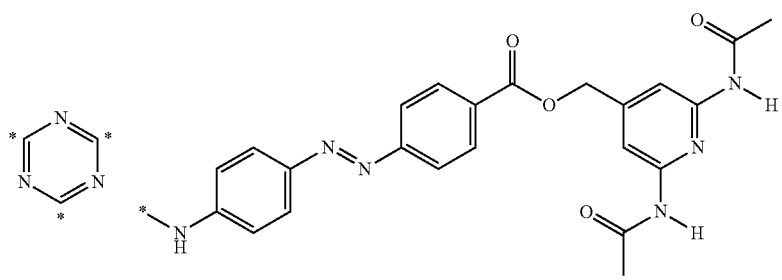
94
[Chemical formula 13]
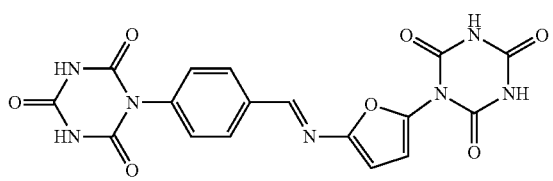
95
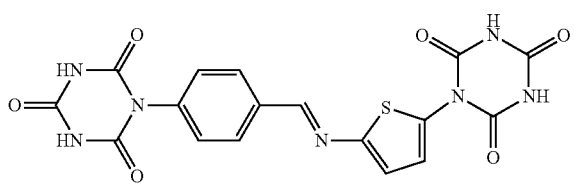
96
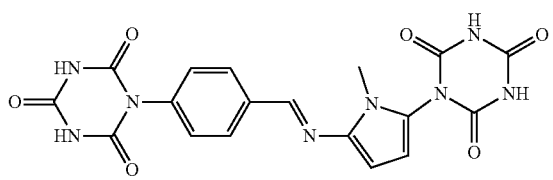
97
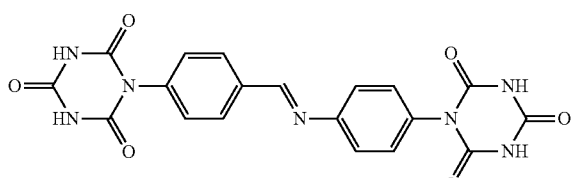
98
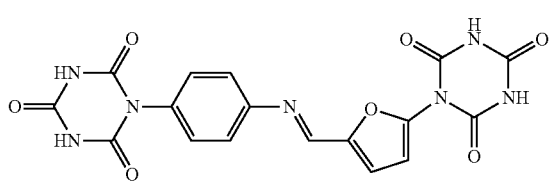
99
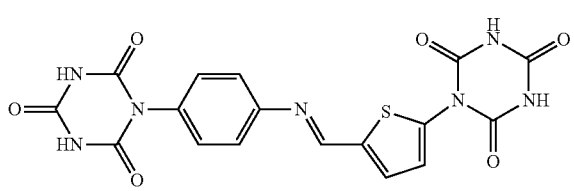
100
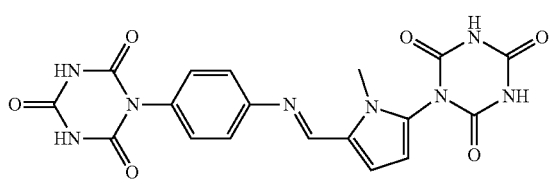
101
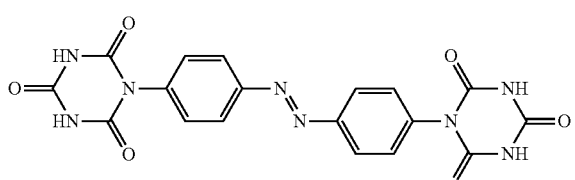
102

103
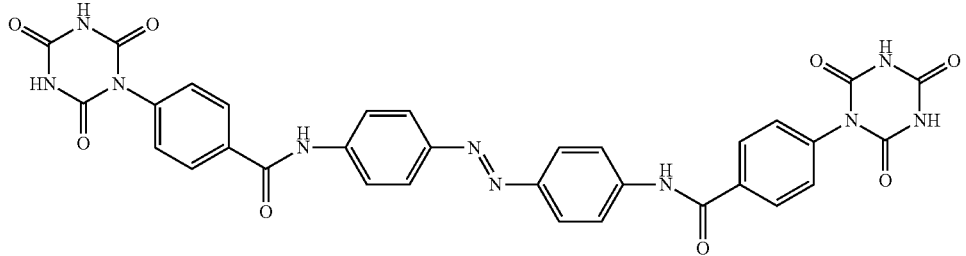
104
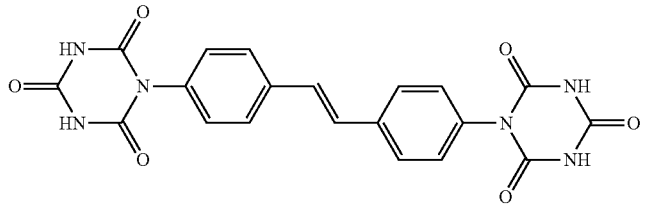
105
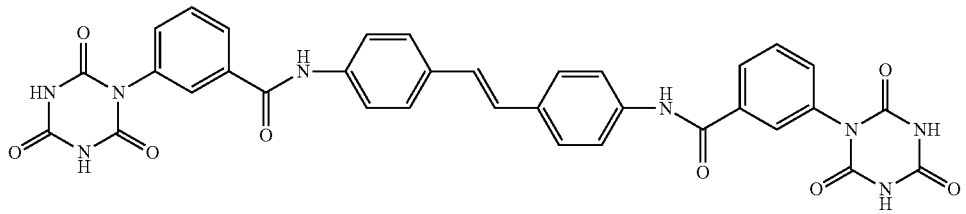
[Chemical formula 14]
106
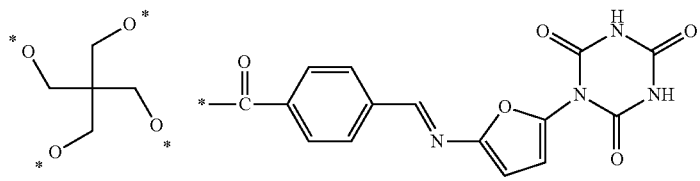
107
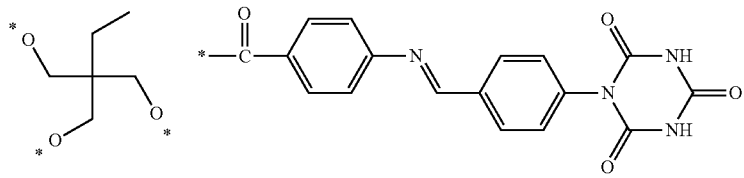
108
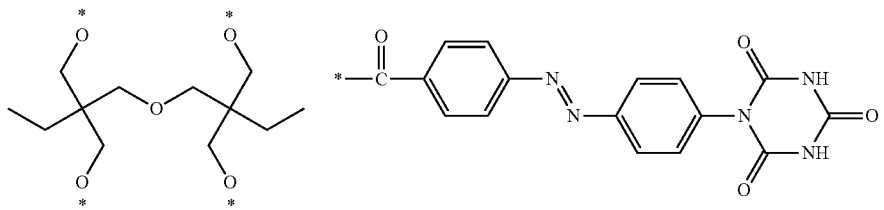
109
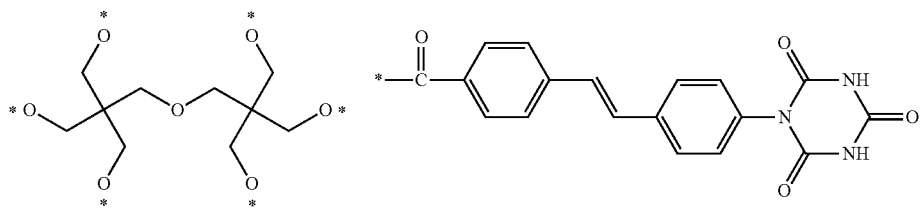

110
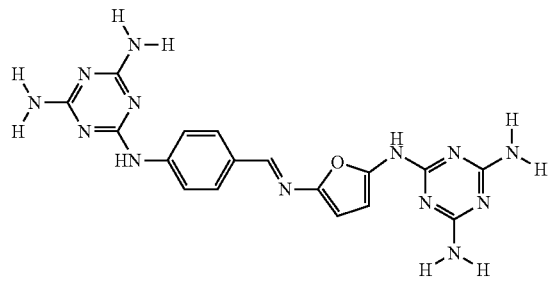
111
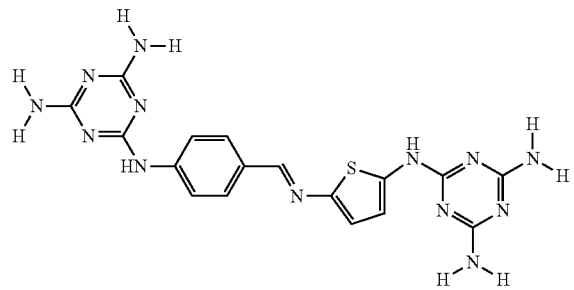
112
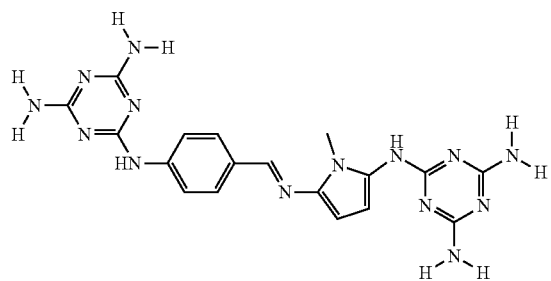
113
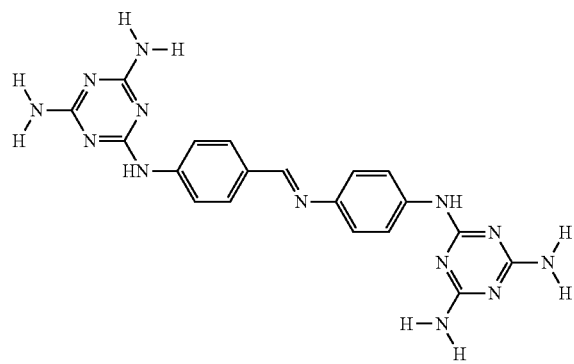
114
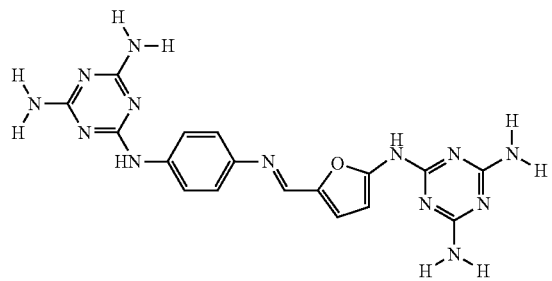
115
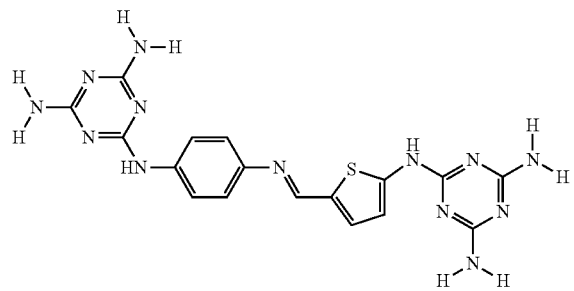
116
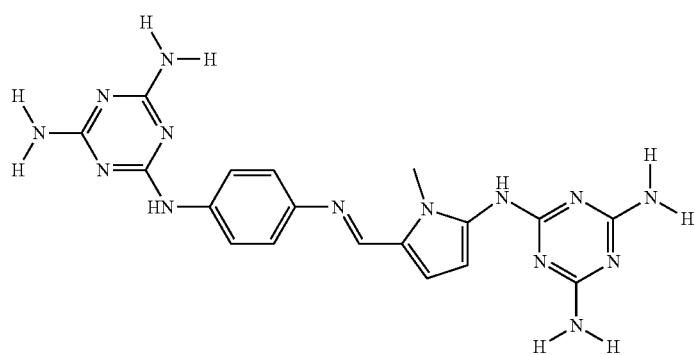

[Chemical formula 15]
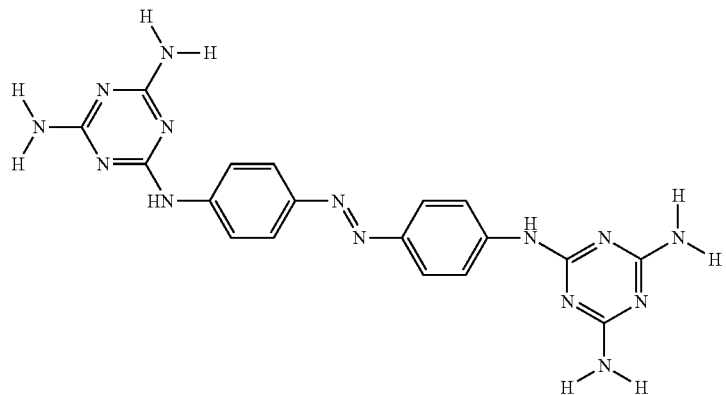
117
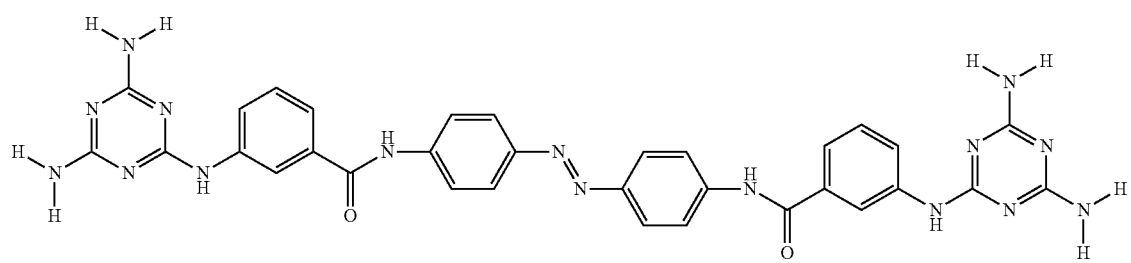
118
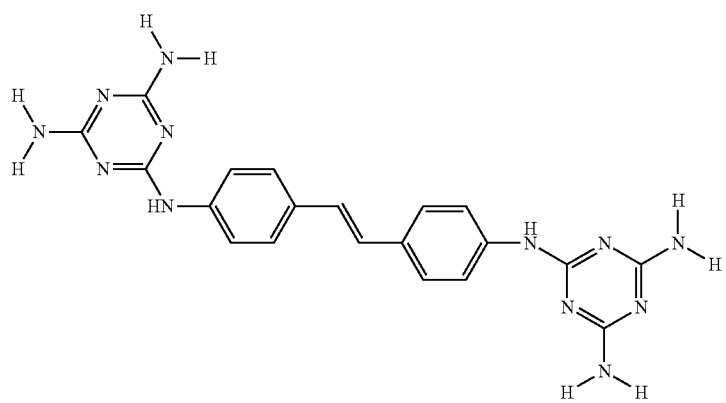
119
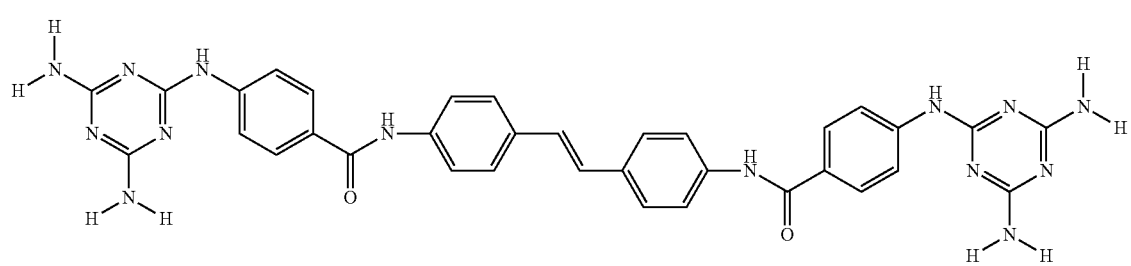
120
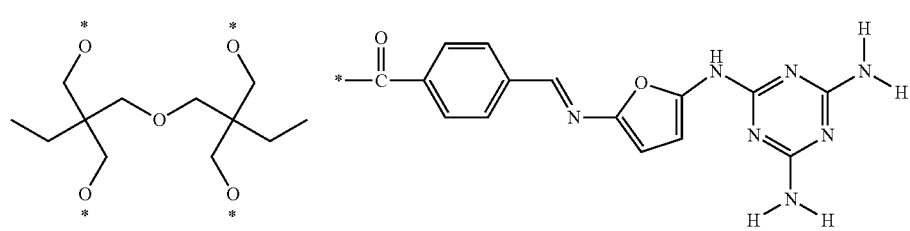
121

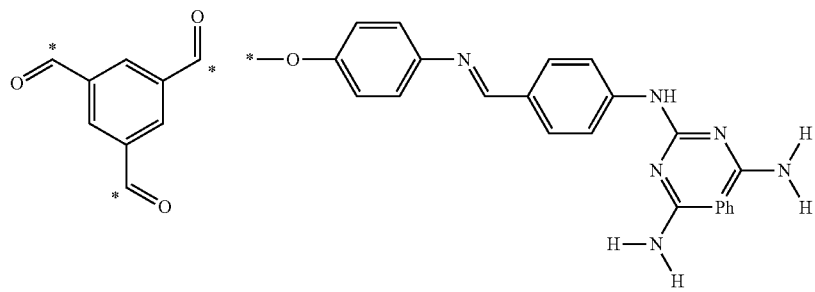
122
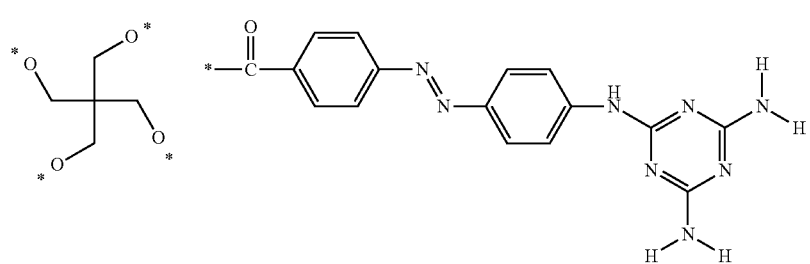
123
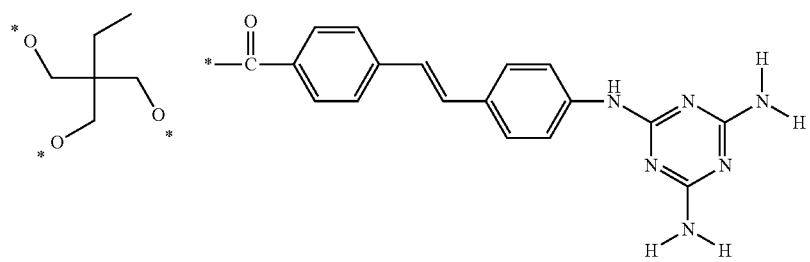
124
[Chemical formula 16]
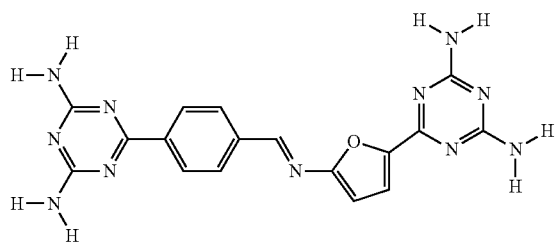
125
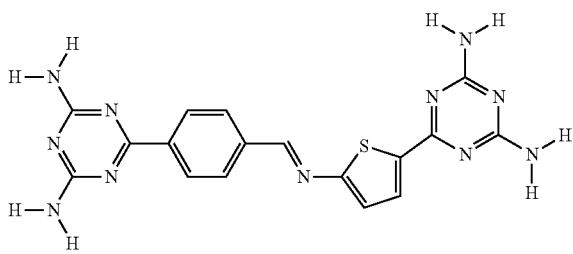
126
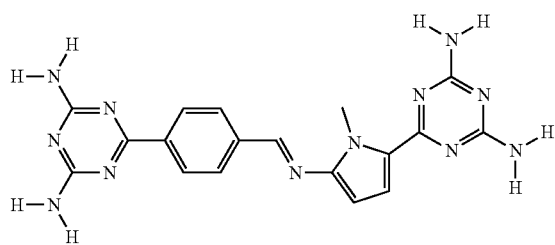
127
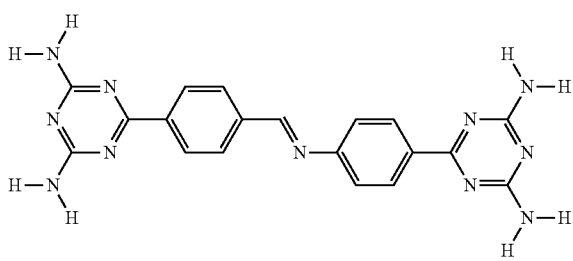
128

-continued
129
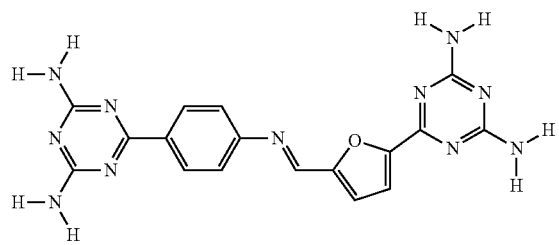
130
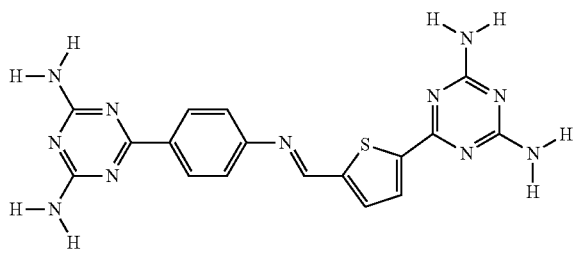
131
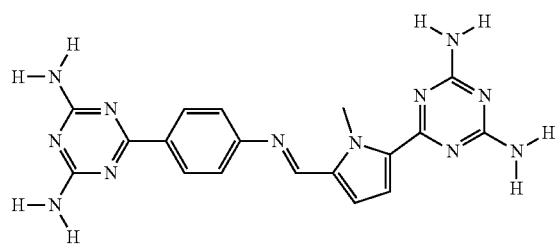
132
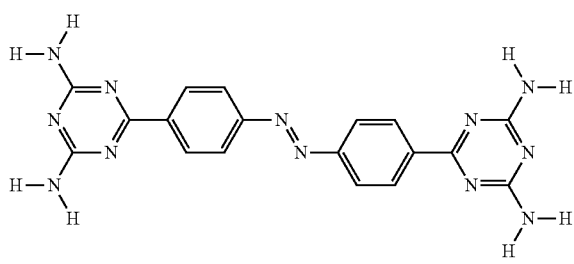
133
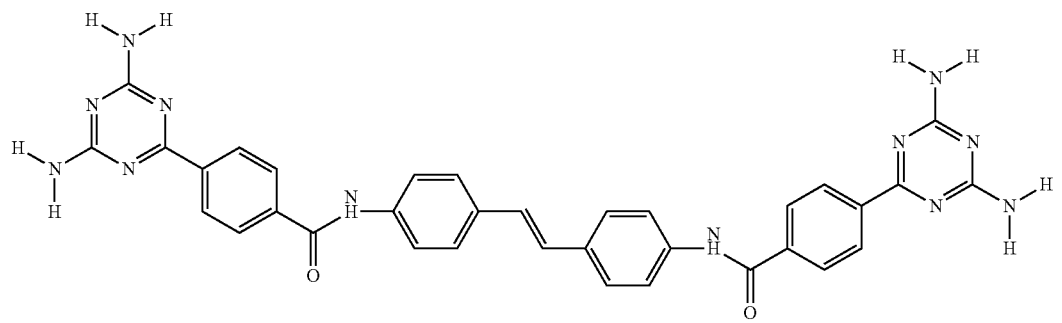
134
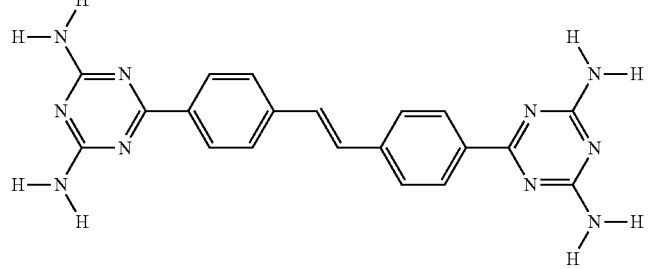
135
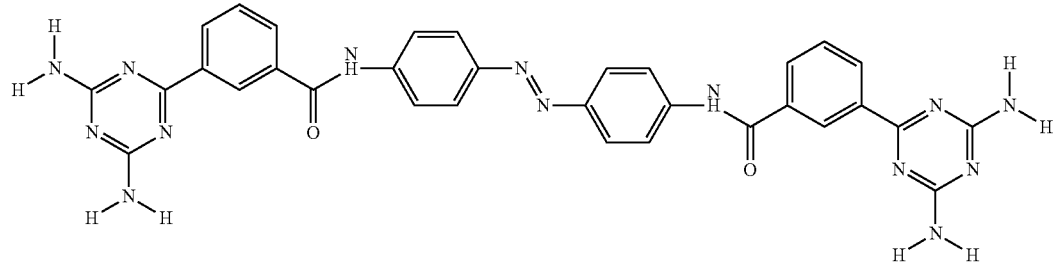

[Chemical formula 17]
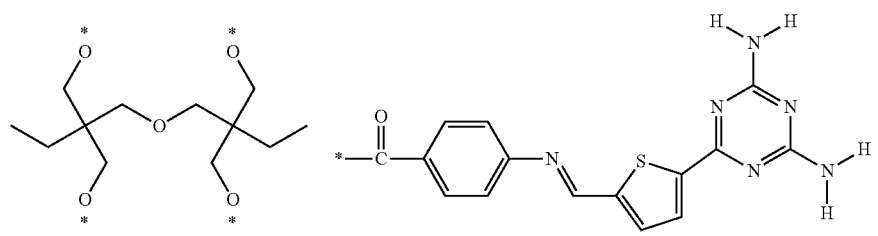 136
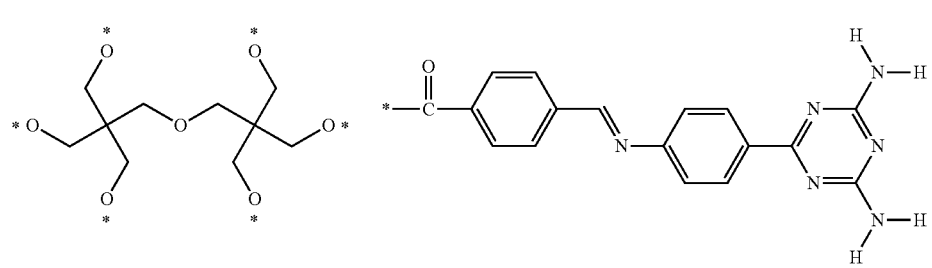 137
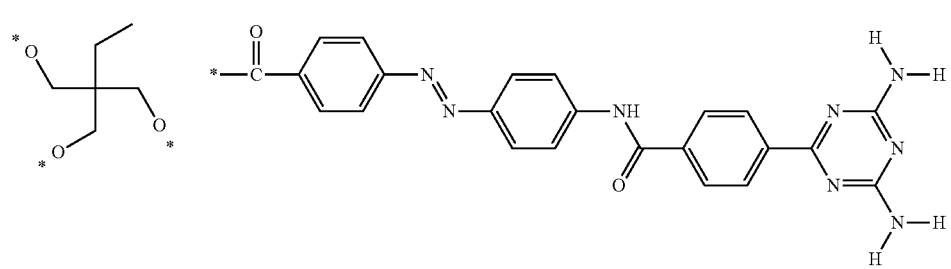 138
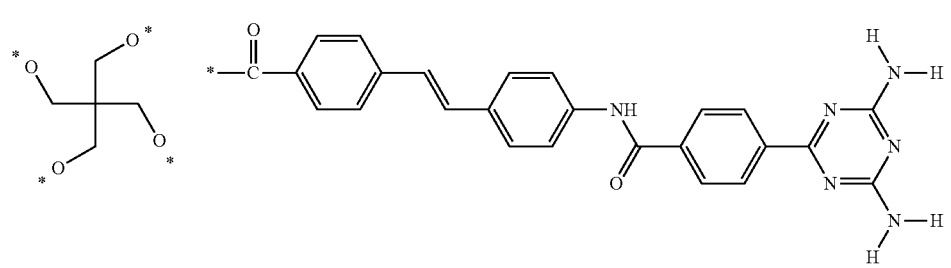 139
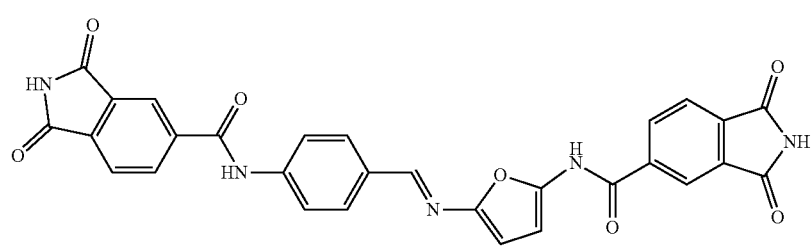 140
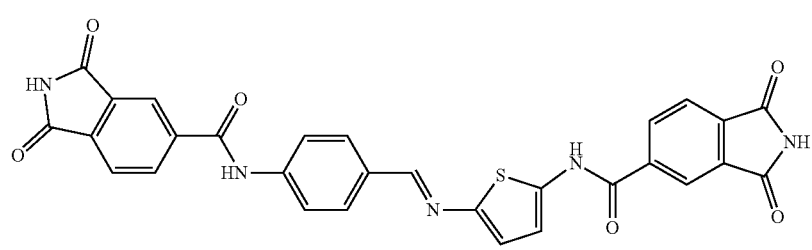 141

142
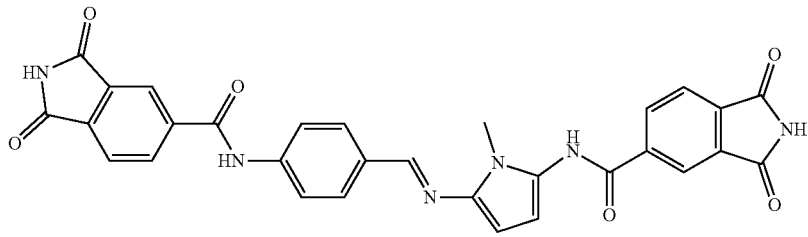
143
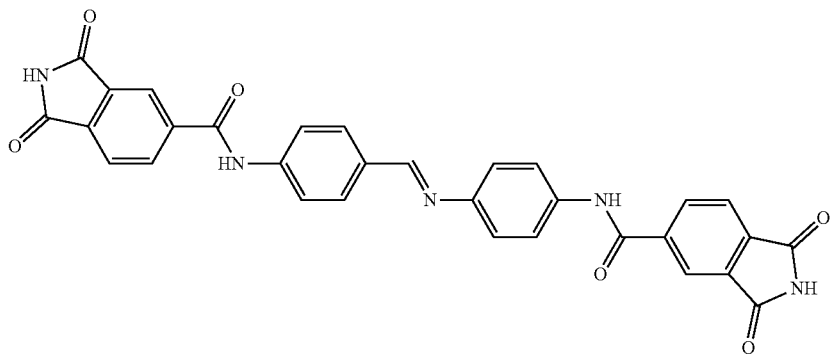
144
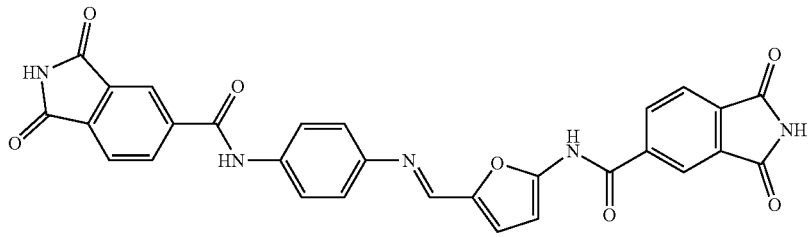
145
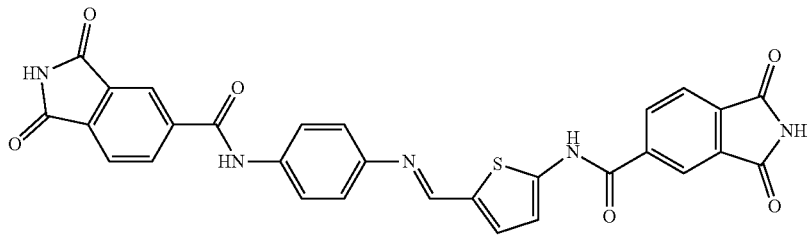
146
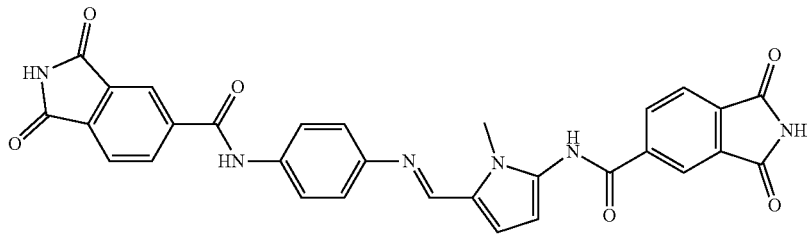

[Chemical formula 18]
147
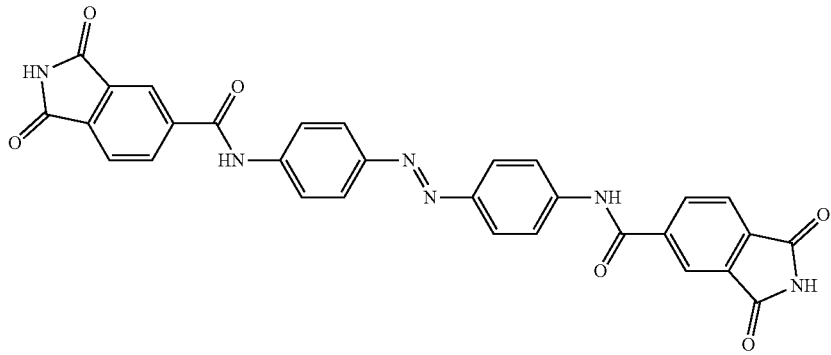
148
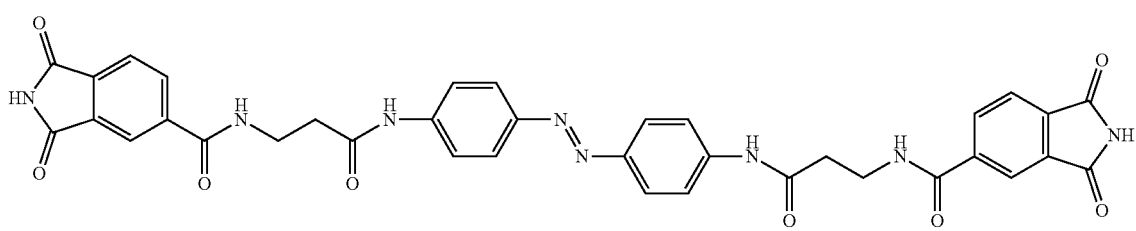
149
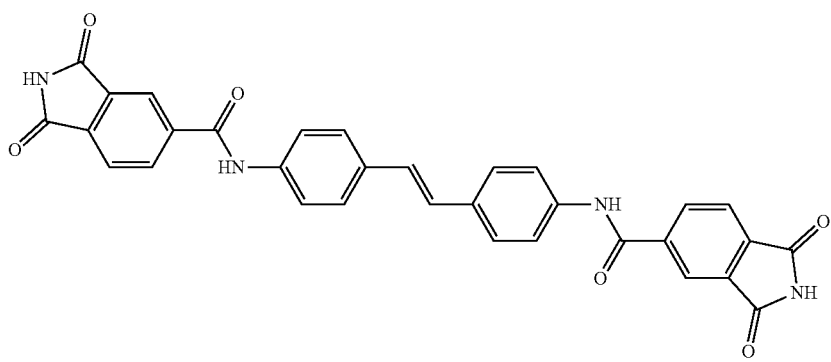
150
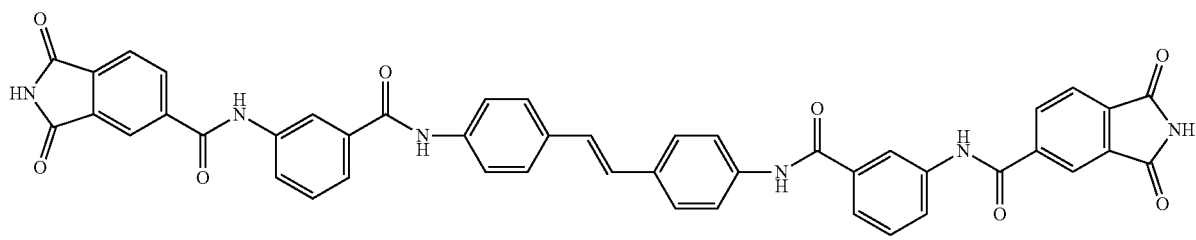
151
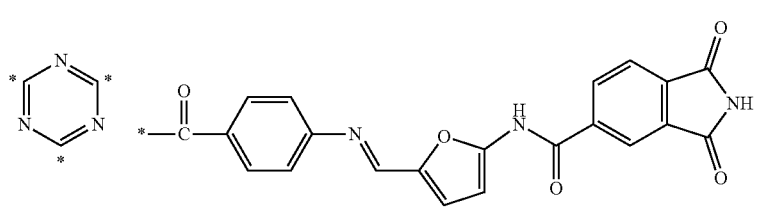

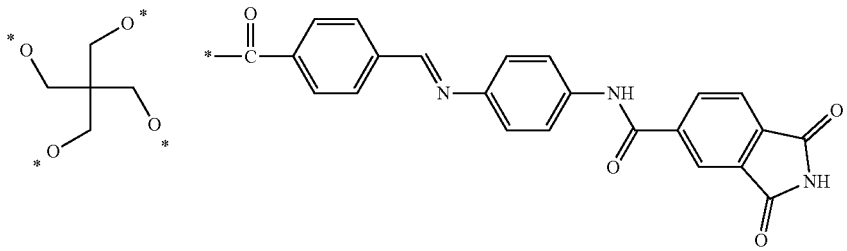

152

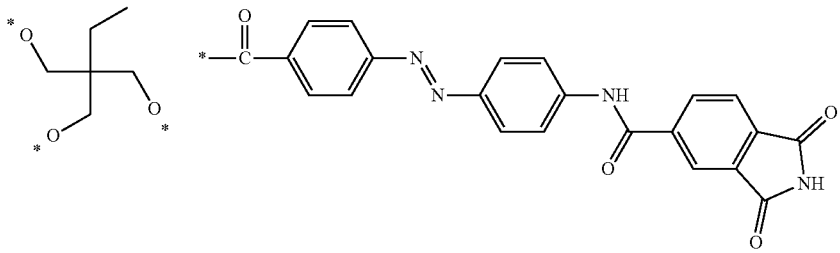

153

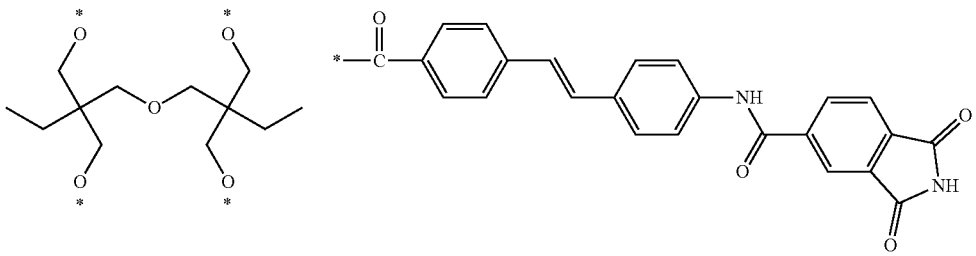

154

In the resin composition according to an embodiment of the present invention, a molar ratio of a complementary multiple hydrogen bonding group of the photoisomerization compound to a complementary multiple hydrogen bonding group of the resin (number of moles of complementary multiple hydrogen bonding group of photoisomerization compound/number of moles of complementary multiple hydrogen bonding group of resin) is preferably 0.05 to 7.0, more preferably 0.1 to 5.0, still more preferably 0.2 to 3.0, particularly preferably 0.3 to 2.5, and most preferably 0.5 to 2.0. When the molar ratio of a complementary multiple hydrogen bonding group between the resin and the photoisomerization compound is within the above range, the effect of the present invention is further exhibited.

<Method for Preparing Photoisomerization Compound>

A method for preparing the photoisomerization compound (photoisomerization compound having a complementary multiple hydrogen bonding group) represented by general formula (2) is not particularly limited. For example, the photoisomerization compound can be prepared by first preparing a desired photoisomerization compound and introducing a complementary multiple hydrogen bonding group into the obtained photoisomerization compound.

Synthesis Example 1: Synthesis of Photoisomerization Compound 1

<Synthesis of azomethine-2NO$_2$>

A reaction solution obtained by putting 4-nitroaniline (manufactured by Tokyo Chemical Industry Co., Ltd.) (80.0 g, 0.58 mol), 5-nitro-2 furaldehyde (manufactured by KANTO CHEMICAL CO., INC.) (81.7 g, 0.58 mol), and 1000 ml of ethanol into a 2000 ml four-neck flask equipped with a cooling tube, a nitrogen introducing tube, and a thermometer was heated and stirred at 50° C. Thereafter, the reaction solution was subjected to suction filtration, and the obtained powder was washed with cooling ethanol. Furthermore, the powder was recrystallized in a mixed solvent of methanol/ethanol to obtain 128.6 g (yield: 85%) of azomethine-2NO$_2$. The structure thereof was confirmed by $^1$H-NMR and IR.

<Synthesis of azomethine-2NH$_2$>

Azomethine-2NH$_2$ was synthesized with reference to Chemistry of Heterocyclic Compounds, 2004, 40 (6), 701.

In a 1000 ml four-neck flask, two three-way cocks, a thermometer, a dropping funnel, and a ball stopper were installed, and the inside of the container was depressurized and then purged with nitrogen. This operation was performed three times. With a nitrogen flow, into the four-neck flask, 400 ml of ethyl acetate, azomethine-2NO$_2$ (100.0 g, 0.38 mol), and allylpalladium(II) chloride dimer (2.8 g, 8 mmol) were put and stirred at room temperature for 30 minutes. Thereafter, triethylsilane (53.4 g, 0.46 mol) put into the dropping funnel was added dropwise to the solution in the four-neck flask over 30 minutes while the liquid temperature of the solution in the four-neck flask was maintained at 10° C. or lower with an ice bath. After the dropwise addition, the ice bath was replaced with an oil bath, and the reaction solution was stirred at 65° C. for 17 hours. The reaction solution was concentrated with an evaporator, and the obtained solid was purified by column chromatography using a methylene chloride/methanol-based solvent. As a result, 50.1 g (yield: 65%) of azomethine-2NH$_2$ was obtained. The structure thereof was confirmed by $^1$H-NMR and IR.

<Synthesis of thymine-COOH>

1-(2-Carboxyethyl) adenine was synthesized using thymine and β-propiolactone in a similar manner to Chem. Lett., 1973, 967. The structure thereof was confirmed by $^1$H-NMR and IR.

<Synthesis of thymine-COOPhCl$_5$ (Active Ester)>

To a 2 L four-neck flask, 1000 ml of DMF, 28.1 g (0.28 mol) of triethylamine, and pentachlorophenyltrichloroacetate (114.3 g, 0.28 mol) were added and stirred at room temperature for complete dissolution. To this solution, 1-(2-carboxyethyl) thymine (50.0 g, 0.25 mol) was added and allowed to react for 20 hours at room temperature. Thereafter, DMF, triethylamine, and the like were distilled off under reduced pressure until the solution was solidified, and the obtained solid was taken out from the flask and washed with cold water on a Nutsche. This solid was dried in a vacuum oven at 50° C., and then recrystallized from CHCl$_3$/MeOH=1/1 (v/v) to obtain 40.6 g of pentachlorophenyl 3-(2,4 dihydroxy-5-methylpyrimidin-1-yl) propionate (yield: 36%). The structure thereof was confirmed by $^1$H-NMR and IR.

<Synthesis of Photoisomerization Compound 1>

Into a 1000 ml eggplant flask, pentachlorophenyl 3-(2,4-dihydroxy-5-methylpyrimidin-1-yl) propionate (24.4 g, 54.7 mmol) synthesized in <Synthesis of thymine-COOPhCl$_5$ (active ester)>, azomethine-2NH$_2$ (5.0 g, 24.8 mmol) synthesized in <Synthesis of azomethine-2NH$_2$> of Synthesis Example 1, and 300 ml of DMF were put and stirred at room temperature for dissolution. Thereafter, the solution was allowed to react at room temperature for 12 hours, and then concentrated under reduced pressure using a rotary evaporator to obtain a solid. The obtained solid was washed with water and then washed with acetone. The washed solid was purified by column chromatography using a methylene chloride/methanol-based solvent. As a result, 7.2 g (yield: 51%) of photoisomerization compound 1 was obtained. The structure thereof was confirmed by $^1$H-NMR and IR.

Synthesis Example 2: Synthesis of Photoisomerization Compound 4

Photoisomerization compound 4 was synthesized in a similar manner to Synthesis Example 1 except that 5-nitro-2-furaldehyde (manufactured by KANTO CHEMICAL CO., INC.) in Synthesis Example 1 was replaced with 4-nitrobenzaldehyde (manufactured by Tokyo Chemical Industry Co., Ltd.). The structure thereof was confirmed by $^1$H-NMR and IR.

Synthesis Example 3: Synthesis of Photoisomerization Compound 16

<Synthesis of azomethine-2NH$_2$ (2)>

Azomethine-2NH$_2$ (2) was synthesized in a similar manner to Synthesis Example 1 except that 5-nitro-2-furaldehyde (manufactured by KANTO CHEMICAL CO., INC.) in Synthesis Example 1 was replaced with 1-methyl-5-nitro-1H-pyrrol-2-amine (manufactured by Aurora Fine Chemicals LLC).

<Synthesis of azomethine-2NH$_2$ (3)>

Azomethine-2NH$_2$ (2) (100.0 g, 0.47 mol) was dissolved in 500 ml of toluene, and triethylamine (114.3 g, 1.13 mol) was added thereto. Thereafter, the temperature of the solution was maintained at 10° C. or lower with an ice bath. 3-Aminopropanoyl chloride (manufactured by Aurora Fine Chemicals LLC) (110.4 g, 1.03 mol) was added dropwise to this solution over 30 minutes, and then the mixture was allowed to react at 50° C. for five hours. Methanol was added thereto and quenched. Thereafter, the mixture was concentrated under reduced pressure using a rotary evaporator, and the obtained solid was washed with water. The obtained solid was purified by column chromatography using a methylene chloride/methanol-based solvent. As a result, 86.5 g of azomethine-2NH$_2$ (3) was obtained (yield: 52%). The structure thereof was confirmed by $^1$H-NMR and IR.

<Synthesis of Photoisomerization Compound 16>

Thereafter, a reaction between azomethine-2NH$_2$ (3) and thymine-COOPhCl$_5$ (active ester) was performed in a similar manner to Synthesis Example 1 to synthesize photoisomerization compound 16. The structure thereof was confirmed by $^1$H-NMR and IR.

Synthesis Example 4: Synthesis of Photoisomerization Compound 18

<Synthesis of Ph-3NO$_2$>

In a 2000 ml four-neck flask, two three-way cocks, a thermometer, a dropping funnel, and a ball stopper were installed, and the inside of the container was depressurized and then purged with nitrogen. This operation was performed three times. With a nitrogen flow, into the four-neck flask, 800 ml of dehydrated toluene, 1-methyl-5 nitro-1H-pyrrol-2 amine (manufactured by Aurora Fine Chemicals LLC) (159.2 g, 1.24 mol), and dehydrated triethylamine (138.4 g, 1.37 mol) were put and stirred at room temperature for 30 minutes. Thereafter, 1,3,5-benzenetricarbonyl trichloride (manufactured by Tokyo Chemical Industry Co., Ltd.) (100.0 g, 0.38 mol) put into the dropping funnel was added dropwise to the solution in the four-neck flask over 30 minutes while the liquid temperature of the solution in the four-neck flask was maintained at 10° C. or lower with an ice bath. After the dropwise addition, the ice bath was removed, and the reaction solution was stirred at room temperature for six hours. Thereafter, the reaction solution was concentrated with an evaporator, and the obtained solid was purified by column chromatography using a methylene chloride/methanol-based solvent. As a result, 77.3 g (yield: 38%) of Ph-3NO$_2$ was obtained. The structure thereof was confirmed by $^1$H-NMR and IR.

<Synthesis of Ph-3NH$_2$>

Into a 1000 ml Erlenmeyer flask, Ph-3NO$_2$ (70.0 g, 0.13 mol) and palladium carbon (0.90 g, 1.94 mol) were put. Subsequently, 200 ml of ethanol and 200 ml of tetrahydrofuran were put thereinto, and the mixture was stirred while hydrogen was enclosed therein. Thereafter, palladium carbon was removed from the reaction solution, and the obtained solution was concentrated. Thereafter, the concentrated product was recrystallized with ethanol to obtain 51.3 g (yield 88%) of Ph-3NH$_2$. The structure thereof was confirmed by $^1$H-NMR and IR.

<Synthesis of azomethine-3NO$_2$>

Into a 1000 ml four-neck flask equipped with a cooling tube, a nitrogen introducing tube, and a thermometer, Ph-3NH$_2$ (50.0 g, 0.11 mol) obtained in <Synthesis of Ph-3NH$_2$>, 4-nitrobenzaldehyde (manufactured by Tokyo Chemical Industry Co., Ltd.) (55.4 g, 0.37 mol), 200 ml of ethanol, and 200 ml of tetrahydrofuran were put, and heated and stirred at 50° C. for three hours. Next, the reaction solution was cooled to room temperature and then subjected to suction filtration, and the obtained powder was washed with cooling ethanol. Furthermore, the powder was recrystallized in a mixed solvent of methanol/ethanol to obtain 55.5 g (yield: 61%) of azomethine-3NO$_2$. The structure thereof was confirmed by $^1$H-NMR and IR.

<Synthesis of azomethine-3NH$_2$>

Azomethine-3NH$_2$ was synthesized with reference to Chemistry of Heterocyclic Compounds, 2004, 40 (6), 701.

In a 500 ml four-neck flask, two three-way cocks, a thermometer, a dropping funnel, and a ball stopper were installed, and the inside of the container was depressurized and then purged with nitrogen. This operation was performed three times. With a nitrogen flow, into the four-neck flask, 300 ml of ethyl acetate, azomethine-3NO$_2$ (50.0 g, 0.06 mol) obtained in <Synthesis of azomethine-3NO$_2$>, and allylpalladium(II) chloride dimer (manufactured by Tokyo Chemical Industry Co., Ltd.) (0.7 g, 2 mmol) were put and stirred at room temperature for 30 minutes. Thereafter, triethylsilane (12.8 g, 0.11 mol) put into the dropping funnel was added dropwise to the solution in the four-neck flask over 30 minutes while the liquid temperature of the solution in the four-neck flask was maintained at 10° C. or lower with an ice bath. After the dropwise addition, the ice bath was replaced with an oil bath, and the solution was stirred at 65° C. for 17 hours. The reaction solution was concentrated with an evaporator, and the obtained solid was purified by column chromatography using a methylene chloride/methanol-based solvent. As a result, 33.8 g (yield: 73%) of azomethine-3NH$_2$ was obtained. The structure thereof was confirmed by $^1$H-NMR and IR.

<Synthesis of Photoisomerization Compound 18>

Into a 1000 ml eggplant flask, pentachlorophenyl 3-(2,4-dihydroxy-5-methylpyrimidin-1-yl) propionate (38.8 g, 86.9 mmol) synthesized in <Synthesis of thymine-COOPhCl$_5$ (active ester)> in [Synthesis Example 1], azomethine-3NH$_2$ (20.0 g, 26.3 mmol) synthesized in <Synthesis of azomethine-3NH$_2$>, and 300 ml of DMF were put and stirred at room temperature for dissolution. Thereafter, the solution was allowed to react at room temperature for 12 hours, and then concentrated under reduced pressure using a rotary evaporator to obtain a solid. The obtained solid was washed with water and then washed with acetone. The washed solid was purified by column chromatography using a methylene chloride/methanol-based solvent. As a result, 13.3 g (yield: 39%) of photoisomerization compound 18 was obtained. The structure thereof was confirmed by $^1$H-NMR and IR.

Synthesis Example 5: Synthesis of Photoisomerization Compound 22

<Synthesis of azobenzene-2NO$_2$>

In a 2000 ml four-neck flask, two three-way cocks, a thermometer, a dropping funnel, and a ball stopper were installed, and the inside of the container was depressurized and then purged with nitrogen. This operation was performed three times. With a nitrogen flow, 4,4'-azoaniline (manufactured by Aurora Fine Chemicals LLC) (100.0 g, 0.47 mol), 500 ml of toluene, and triethylamine (115.4 g, 1.14 mol) were added to the four-neck flask, and then the temperature of the solution in the four-neck flask was maintained at 10° C. or lower with an ice bath. With a nitrogen flow, 3-nitrobenzoyl chloride (manufactured by Tokyo Chemical Industry Co., Ltd.) (115.4 g, 1.04 mol) was added to this solution in portions, and a chloride was added thereto. Thereafter, the mixture was allowed to react at 50° C. for five hours. Methanol was added thereto and quenched. Thereafter, the reaction solution was concentrated under reduced pressure using a rotary evaporator, and the obtained solid was washed with water. The obtained solid was purified by column chromatography using a methylene chloride/methanol-based solvent. As a result, 153.9 g of azobenzene-2NO$_2$ was obtained (yield: 64%). The structure thereof was confirmed by $^1$H-NMR and IR.

<Synthesis of azobenzene-2NH$_2$>

Azobenzene-2NH$_2$ was obtained in a similar manner to <azomethine-3NH$_2$> in Synthesis Example 4 using the azobenzene-2NO$_2$. The structure thereof was confirmed by $^1$H-NMR and IR.

<Synthesis of Photoisomerization Compound 22>

A reaction between the azomethine-2NO$_2$ and thymine-COOPhCl$_5$ (active ester) was performed in a similar manner to Synthesis Example 1 to synthesize photoisomerization compound 22. The structure thereof was confirmed by $^1$H-NMR and IR.

Synthesis Example 6: Synthesis of Photoisomerization Compound 23

Photoisomerization compound 23 was synthesized in a similar manner to Synthesis Example 1 using 4,4'-(1,2-ethylenediyl) dianiline (manufactured by Aurora Fine Chemicals LLC) and thymine-COOPhCl$_5$ (active ester). The structure thereof was confirmed by $^1$H-NMR and IR.

Synthesis Example 7: Synthesis of Photoisomerization Compound 26

<Synthesis of TMP-3NH$_2$>

TMP-3NH$_2$ was synthesized in a similar manner to <Synthesis of azomethine-2NH$_2$ (2)> in Synthesis Example 3 except that azomethine-2NH$_2$ was replaced with trimethylolpropane (manufactured by Tokyo Chemical Industry Co., Ltd.) in <Synthesis of azomethine-2NH$_2$ (2)> in Synthesis Example 3. The structure thereof was confirmed by $^1$H-NMR and IR.

<Synthesis of TMP-3NO$_2$>

TMP-3NO$_2$ was synthesized in a similar manner to <Synthesis of azomethine-2NH$_2$ (2)> in Synthesis Example 3 except that azomethine-2NH$_2$ and 3-aminopropanoyl chloride (manufactured by Aurora Fine Chemicals LLC) were replaced with TMP-3NH$_2$ and 4-(4-nitrophenylazo) benzoyl chloride (manufactured by Chemieliva Pharmaceutical), respectively in <Synthesis of azomethine-2NH$_2$ (2)> in Synthesis Example 3. The structure thereof was confirmed by $^1$H-NMR and IR.

<Synthesis of TMP-3NH$_2$ (2)>

TMP-3NH$_2$ (2) was obtained in a similar manner to <Azomethine-3NH$_2$> in Synthesis Example 4 using the TMP-3NO$_2$. The structure thereof was confirmed by $^1$H-NMR and IR.

<Synthesis of Photoisomerization Compound 26>

Photoisomerization compound 26 was synthesized in a similar manner to Synthesis Example 1 using the TMP-3NH$_2$ (2) and thymine-COOPhCl$_5$ (active ester). The structure thereof was confirmed by $^1$H-NMR and IR.

Synthesis Example 8: Synthesis of Photoisomerization Compound 29

<Synthesis of TAZ-3NO$_2$>

TAP-3NO$_2$ was synthesized in a similar manner to <Synthesis of azomethine-2NH$_2$ (2)> in Synthesis Example 3 except that azomethine-2NH$_2$ and 3-aminopropanoyl chloride (manufactured by Aurora Fine Chemicals LLC) were replaced with 4-[2-(nitrophenyl) ethenyl]aniline (manufactured by Chemieliva Pharmaceutical Co., Ltd.) and cyanuric acid chloride (manufactured by Tokyo Chemical Industry Co., Ltd.), respectively in <Synthesis of azomethine-2NH$_2$ (2)> in Synthesis Example 3, and heating reflux was performed for six hours. The structure thereof was confirmed by $^1$H-NMR and IR.

<Synthesis of TAZ-3NH$_2$>

TAZ-3NH$_2$ was obtained in a similar manner to <Azomethine-3NH$_2$> in Synthesis Example 4 using the TAZ-3NO$_2$. The structure thereof was confirmed by $^1$H-NMR and IR.

<Synthesis of Photoisomerization Compound 29>

Photoisomerization compound 29 was synthesized in a similar manner to Synthesis Example 1 using the TAZ-3NH$_2$ and thymine-COOPhCl$_5$ (active ester). The structure thereof was confirmed by $^1$H-NMR and IR.

Synthesis Example 9: Synthesis of Photoisomerization Compound 36

<Synthesis of azomethine-2NO$_2$ (2)>

Into a 500 ml four-neck flask equipped with a cooling tube, a nitrogen introducing tube, and a thermometer, 4-nitroaniline (manufactured by Tokyo Chemical Industry Co., Ltd.) (80.0 g, 0.58 mol), 1-methyl-5 nitro-1H-pyrrole-2-carboxaldehyde (manufactured by Accel Pharmtec) (89.3 g, 0.58 mol), and 300 ml of ethanol were put, and heated and stirred at 50° C. Thereafter, the reaction solution was subjected to suction filtration, and the obtained powder was washed with cooling ethanol. Furthermore, the powder was recrystallized in a mixed solvent of methanol/ethanol to obtain 136.6 g (yield: 86%) of azomethine-2NO$_2$ (2). The structure thereof was confirmed by $^1$H-NMR and IR.

<Synthesis of azomethine-2NH$_2$ (4)>

In a 1000 ml four-neck flask, two three-way cocks, a thermometer, a dropping funnel, and a ball stopper were installed, and the inside of the container was depressurized and then purged with nitrogen. This operation was performed three times. With a nitrogen flow, into the four-neck flask, 250 ml of tetrahydrofuran, 250 ml of ethanol, azomethine-2NO$_2$ (2) (100.0 g, 0.36 mol), and allylpalladium(II) chloride dimer (2.7 g, 7 mmol) were put and stirred at room temperature for 30 minutes. Thereafter, triethylsilane (50.9 g, 0.44 mol) put into the dropping funnel was added dropwise to the solution in the four-neck flask over 30 minutes while the liquid temperature of the solution in the four-neck flask was maintained at 10° C. or lower with an ice bath. After the dropwise addition, the ice bath was replaced with an oil bath, and the solution was stirred at 65° C. for 17 hours. The reaction solution was concentrated with an evaporator, and the obtained solid was purified by column chromatography using a methylene chloride/methanol-based solvent. As a result, 64.1 g (yield: 82%) of azomethine-2NH$_2$ (4) was obtained. The structure thereof was confirmed by $^1$H-NMR and IR.

<Synthesis of azomethine-2NH$_2$ (5)>

In a 1000 ml four-neck flask, two three-way cocks, a thermometer, a dropping funnel, and a ball stopper were installed, and the inside of the container was depressurized and then purged with nitrogen. This operation was performed three times. With a nitrogen flow, azomethine-2NH$_2$ (4) (100.0 g, 0.47 mol) and 500 ml of toluene were added to the four-neck flask to dissolve azomethine-2NH$_2$ therein. Subsequently, triethylamine (114.3 g, 1.13 mol) was added thereto, and then the temperature of the solution in the four-neck flask was maintained at 10° C. or lower with an ice bath. 3-Amino-2-propanoyl chloride (manufactured by Aurora Fine Chemicals LLC) (114.3 g, 1.0 mol) was added dropwise to this solution over 30 minutes, and then the mixture was allowed to react at 50° C. for five hours. Methanol was added to the obtained reaction solution to quench the mixture. Thereafter, the mixture was concentrated under reduced pressure using a rotary evaporator, and the obtained solid was washed with water. The obtained solid was purified by column chromatography using a methylene chloride/methanol-based solvent. As a result, 105.9 g of azomethine-2NH$_2$ (5) was obtained (yield: 59%). The structure thereof was confirmed by $^1$H-NMR and IR.

<Synthesis of adenine-COOH>

9-(2-Carboxyethyl) adenine was synthesized using adenine and P-propiolactone in a similar manner to Chem. Lett., 1973, 967. The structure thereof was confirmed by $^1$H-NMR and IR.

<Synthesis of Adenine CF$_3$—COOPhNO$_2$ (Active Ester)>

To a 5 L four-neck flask, 2000 ml of pyridine, 9-(2-carboxyethyl) adenine (40.0 g, 0.19 mol), 4-nitrophenol (30.0 g, 0.22 mol), and 4-nitrophenyl trifluoroacetate (200.0 g, 0.85 mol) were added and stirred at 50° C. for two hours. Thereafter, the reaction solution was concentrated using a rotary evaporator until the solution was solidified, and the obtained solid was dissolved in CHCl$_3$. Diethyl ether was added to this solution, and a precipitated solid was filtered through Nutsche. This solid was redissolved in CHCl$_3$, and slowly added dropwise to diethyl ether in the same amount as that of CHCl$_3$ stirred vigorously to be reprecipitated and purified. The solid was filtered through Nutsche and dried in a vacuum oven at 50° C. to obtain 63.0 g of 4-nitrophenyl-3-(6-trifluoroacetamidopurin-9-yl) propionate (yield: 77%). The structure thereof was confirmed by $^1$H-NMR and IR.

<Synthesis of CF$_3$CO-Protected Photoisomerization Compound 36>

Into a 500 ml eggplant flask, 4-nitrophenyl-3-(6-trifluoroacetamidopurin-9 yl) propionate (66.2 g, 0.16 mol), azomethine-2NH$_2$ (4) (50.0 g, 0.13 mol) synthesized in the above-described <Synthesis of azomethine-2NH$_2$ (4)>, and 200 ml of dimethyl sulfoxide were put and stirred at room temperature for dissolution. Thereafter, the mixture was allowed to react at room temperature for three days, and then concentrated under reduced pressure using a rotary evaporator to obtain a solid. The obtained solid was washed with water, and then washed with diethyl ether. The washed solid was purified by column chromatography using a methylene chloride/methanol-based solvent. As a result, 88.2 g (yield: 71%) of CF$_3$CO-protected photoisomerization compound 36 was obtained. The structure thereof was confirmed by $^1$H-NMR and IR.

<Synthesis of Photoisomerization Compound 36 (Deprotection of CF$_3$CO)>

Into a 100 ml eggplant flask, potassium carbonate (2.9 g, 20.9 mmol) and 20 ml of water were put and stirred at room temperature for dissolution. Thereafter, to a solution obtained by adding 20 ml of methanol to this solution, CF$_3$CO-protected photoisomerization compound 36 (10.0 g, 10.5 mmol) synthesized in the above-described <Synthesis of CF$_3$CO-protected photoisomerization compound 36> was added, and the mixture was stirred at room temperature for 12 hours. The obtained reaction solution was concentrated under reduced pressure using a rotary evaporator, and the obtained solid was washed with water. The obtained solid was redissolved in ethanol and slowly added dropwise to vigorously stirred water to be reprecipitated and purified. This solid was dried in a vacuum oven at 50° C. to obtain 6.6 g of photoisomerization compound 36 (yield: 83%). The structure thereof was confirmed by $^1$H-NMR and IR.

Synthesis Example 10: Synthesis of Photoisomerization Compound 39

Photoisomerization compound 39 was synthesized in a similar manner to [Synthesis Example 9] except that 4-nitroaniline (manufactured by Tokyo Chemical Industry Co., Ltd.) and 1-methyl-5 nitro-1H-pyrrole-2 carboxaldehyde (manufactured by Accel Pharmtec Co., Ltd.) were replaced with 4-nitrobenzaldehyde (manufactured by Tokyo Chemical Industry Co., Ltd.) and 5-nitro-2-thiophenamine (manufactured by Chemieliva Pharmaceutica), respectively in <Synthesis of azomethine-2NO$_2$ (2)> in [Synthesis Example 9]. The structure thereof was confirmed by $^1$H-NMR and IR.

Synthesis Example 11: Synthesis of Photoisomerization Compound 49

Azomethine-2NH$_2$ (4) in <Synthesis of CF$_3$CO-protected photoisomerization compound 36> in [Synthesis Example 9] was replaced with 4,4'-azodianiline (manufactured by Sigma-Aldrich Co. LLC), and then photoisomerization compound 49 was synthesized in a similar manner to <Synthesis of photoisomerization compound 36 (deprotection of CF$_3$CO)>. The structure thereof was confirmed by $^1$H-NMR and IR.

Synthesis Example 12: Synthesis of Photoisomerization Compound 57

<Synthesis of STB-COCl>
Into a 100 ml four-neck flask equipped with a nitrogen introducing tube, a dropping funnel, and a thermometer, 50 ml of CH$_2$Cl$_2$, 4-carboxy 4'-nitrostilbene (10.0 g, 37.1 mmol), and a few drops of DMF were put and stirred at room temperature for dissolution. This solution was cooled with an ice bath, and the liquid temperature thereof was maintained at 10° C. or lower. Thereafter, oxalyl chloride (manufactured by Tokyo Chemical Industry Co., Ltd.) (5.2 g, 40.9 mmol) was added dropwise to this solution over 30 minutes. Thereafter, the ice bath was removed, the liquid temperature of the solution was set to room temperature, and this solution was stirred for five hours. The solution was concentrated under reduced pressure using a rotary evaporator, and 50 ml of CH$_2$Cl$_2$ was added thereto again. Thereafter, the mixture was concentrated under reduced pressure using a rotary evaporator. This operation was repeated three times. As a result, 10.5 g (yield 98%) of STB-COCl was obtained.
<Synthesis of Photoisomerization Compound 57>
Photoisomerization compound 57 was synthesized in a similar manner to <Synthesis of photoisomerization compound 36 (deprotection of CF$_3$CO)> in [Synthesis Example 7] and [Synthesis Example 9] except that trimethylolpropane (manufactured by Tokyo Chemical Industry Co., Ltd.), 4-(4-nitrophenylazo) benzoyl chloride (manufactured by Chemieliva Pharmaceutical Co., Ltd.), and thymine-COOPhCl$_5$ (active ester) in [Synthesis Example 7] were replaced with pentaerythritol (manufactured by Tokyo Chemical Industry Co., Ltd.), STB-COCl synthesized above, and adenine CF$_3$—COOPhNO$_2$ (active ester) synthesized above, respectively. The structure thereof was confirmed by $^1$H-NMR and IR.

Synthesis Example 13: Synthesis of Photoisomerization Compound 62

<Synthesis of uracil-NO$_2$>
Into a 100 ml four-neck flask equipped with a nitrogen introducing tube, a dropping funnel, and a thermometer, 50 ml of CH$_2$Cl$_2$, 6-(hydroxymethyl)-1-methyl-2,4-pyrimidinedione (manufactured by Aurora Fine Chemicals) (5.0 g, 32.0 mmol), and triethylamine (manufactured by Tokyo Chemical Industry Co., Ltd.) (5.8 g, 57.6 mmol) were put and stirred at room temperature for dissolution. This solution was cooled with an ice bath, and the liquid temperature thereof was maintained at 10° C. or lower. Thereafter, to this solution, 4-nitrobenzoyl chloride (manufactured by Tokyo Chemical Industry Co., Ltd.) (7.1 g, 38.4 mmol) was added dropwise over 30 minutes, and the mixture was stirred at room temperature for five hours. Thereafter, the solution was concentrated under reduced pressure using a rotary evaporator, and the obtained solid was washed with water. The solid that had been washed with water was purified by column chromatography using a methylene chloride/methanol-based solvent. As a result, 7.2 g (yield: 74%) of uracil-NO$_2$ was obtained. The structure thereof was confirmed by $^1$H-NMR and IR.
<Synthesis of uracil-NH$_2$>
Into a 200 ml Erlenmeyer flask, uracil-NO$_2$ (7.0 g, 22.9 mmol) and palladium carbon (0.11 g, 229 mmol) were put, then 30 ml of ethanol and 30 ml of tetrahydrofuran were put thereinto, and the mixture was stirred while hydrogen was enclosed therein. Palladium carbon was removed from this reaction solution, and the obtained solution was concentrated. Thereafter, the concentrated product was recrystallized with ethanol to obtain 5.4 g (yield 86%) of uracil-NH$_2$. The structure thereof was confirmed by $^1$H-NMR and IR.
<Synthesis of uracil-CHO>
Into a 100 ml four-neck flask equipped with a nitrogen introducing tube, a dropping funnel, and a thermometer, 50 ml of CH$_2$Cl$_2$, 6-(hydroxymethyl)-1-methyl-2,4-pyrimidinedione (manufactured by Aurora Fine Chemicals) (5.0 g, 32.0 mmol), and triethylamine (manufactured by Tokyo Chemical Industry Co., Ltd.) (5.8 g, 57.6 mmol) were put and stirred at room temperature for dissolution. The solution was cooled with an ice bath, and the liquid temperature thereof was maintained at 10° C. or lower. Thereafter, to this solution, 4-formylbenzoyl chloride (6.5 g, 38.4 mmol) synthesized above (manufactured by Aurora Fine Chemicals) was added dropwise over 30 minutes, and the mixture was stirred at room temperature for five hours. Thereafter, the solution was concentrated under reduced pressure using a rotary evaporator, and the obtained solid was washed with water. The solid that had been washed with water was purified by column chromatography using a methylene chloride/methanol-based solvent. As a result, 7.8 g (yield: 84%) of uracil-CHO was obtained. The structure thereof was confirmed by $^1$H-NMR and IR.
<Synthesis of Photoisomerization Compound 62>
Into a 100 ml four-neck flask equipped with a cooling tube, a nitrogen introducing tube, and a thermometer, uracil-NH$_2$ (7.0 g, 25.4 mmol) synthesized above, uracil-CHO (7.3 g, 25.4 mmol) synthesized above, and 30 ml of ethanol were put, and heated and stirred at 50° C. This reaction solution was subjected to suction filtration, and the obtained powder was washed with cooling ethanol. Furthermore, the powder was purified by column chromatography using a methylene chloride/methanol-based solvent. As a result, 9.0 g (yield: 65%) of photoisomerization compound 62 was obtained. The structure thereof was confirmed by $^1$H-NMR and IR.

Synthesis Example 14: Synthesis of Photoisomerization Compound 63

Photoisomerization compound 63 was synthesized in a similar manner to Synthesis Example 13 except that 4-nitrobenzoyl chloride (manufactured by Tokyo Chemical Industry Co., Ltd.) and 6-hydroxymethyl-1-methyl-2,4-pyrimidinedione (manufactured by Aurora Fine Chemicals Co., Ltd.) in Synthesis Example 13 were replaced with 5-nitro-2 fluroyl chloride (manufactured by Sigma-Aldrich Co. LLC) and 6-(2-aminoethyl)-1-methyl-2,4-pyrimidinedione (manufactured by Aurora Fine Chemicals Co., Ltd.), respectively. The structure thereof was confirmed by $^1$H-NMR and IR.

Synthesis Example 15: Synthesis of Photoisomerization Compound 70

<Synthesis of uracil-COOPhCl$_5$ (Active Ester)>
Uracil-COOPhCl$_5$ (active ester) was synthesized in a similar manner to <Synthesis of thymine-COOPhCl$_5$ (active ester)> in [Synthesis Example 1] except that 1-(2-carboxyethyl) thymine was replaced with 2-(1-methylpyrimidine 2,4-dion-4-yl) acetic acid in <Synthesis of thymine-COOPhCl$_5$ (active ester)> in [Synthesis Example 1]. The structure thereof was confirmed by $^1$H-NMR and IR.
<Synthesis of Photoisomerization Compound 70>
Photoisomerization compound 70 was synthesized in a similar manner to <Synthesis of thymine-COOPhCl$_5$ (active ester)> in [Synthesis Example 6] except that pentachlorophenyl 3-(2,4-dihydro-5 methylpyrimidin-1-yl) propionate in [Synthesis Example 6] was replaced with uracyl-COOPhCl$_5$ (active ester) synthesized above. The structure thereof was confirmed by $^1$H-NMR and IR.

Synthesis Example 16: Synthesis of Photoisomerization Compound 75

<Synthesis of Photoisomerization Compound 75>
Photoisomerization compound 75 was synthesized in a similar manner to [Synthesis Example 7] except that thymine-COOPhCl$_5$ (active ester) in [Synthesis Example 7] was replaced with uracil-COOPhCl$_5$ (active ester) in [Synthesis Example 15]. The structure thereof was confirmed by $^1$H-NMR and IR.

Synthesis Example 17: Synthesis of Photoisomerization Compound 79

<Synthesis of Photoisomerization Compound 79>
Photoisomerization compound 79 was synthesized in a similar manner to Synthesis Example 13 except that 4-nitrobenzoyl chloride (manufactured by Tokyo Chemical Industry Co., Ltd.) and 6-hydroxymethyl-1-methyl-2,4-pyrimidinedione (manufactured by Aurora Fine Chemicals Co., Ltd.) in Synthesis Example 13 were replaced with 5-nitro-1H-pyrrole-2 carbonyl chloride (manufactured by Chemiliva Pharmaceutical Co., Ltd.) and 2,6-diacetamide-4-hydroxymethylpyridine (manufactured by Hong Kong Chemhere Co., Ltd.), respectively. The structure thereof was confirmed by $^1$H-NMR and IR.

Synthesis Example 18: Synthesis of Photoisomerization Compound 87

<Synthesis of 2,6-diacetamidopyridine-NO$_2$>
Into a 200 ml four-neck flask equipped with a nitrogen introducing tube, a dropping funnel, and a thermometer, 50 ml of CH$_2$Cl$_2$, 2,6-diacetamide-4-hydroxymethylpyridine (manufactured by Apichemical Co., Ltd.) (10.0 g, 44.8 mmol), and triethylamine (manufactured by Tokyo Chemical Industry Co., Ltd.) (8.2 g, 80.6 mmol) were put and stirred at room temperature for dissolution. This solution was cooled with an ice bath, and the liquid temperature thereof was maintained at 10° C. or lower. Thereafter, to this solution, 4-nitrobenzoyl chloride (manufactured by Sigma-Aldrich Co. LLC) (10.0 g, 53.8 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 12.3 g (yield: 74%) of 2,6-diacetamidopyridine-NO$_2$ was obtained. The structure thereof was confirmed by $^1$H-NMR and IR.
<Synthesis of 2,6-diacetamide pyridine-NH$_2$>
Into a 200 ml Erlenmeyer flask, 2,6-diacetamide pyridine-NO$_2$ (10.0 g, 26.9 mmol) and palladium carbon (0.12 g, 269 mmol) were put. Subsequently, 50 ml of ethanol and 50 ml of tetrahydrofuran were put thereinto, and the mixture was stirred while hydrogen was enclosed therein. Palladium carbon was removed from the reaction solution, and the obtained solution was concentrated. Thereafter, the concentrated product was recrystallized with ethanol to obtain 8.4 g (yield 91%) of 2,6-diacetamidopyridin-NH$_2$.
<Synthesis of Photoisomerization Compound 87>
Into a 200 ml four-neck flask equipped with a nitrogen introducing tube, a dropping funnel, and a thermometer, 50 ml of CH$_2$Cl$_2$, 2,6-diacetamidopyridin-NH$_2$ (12.3 g, 35.8 mmol) synthesized above, and triethylamine (manufactured by Tokyo Chemical Industry Co., Ltd.) (5.4 g, 53.7 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 4,4'-azodibenzoyl dichloride (manufactured by Sigma-Aldrich Co. LLC) (5.0 g, 16.3 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 10.0 g (yield: 67%) of photoisomerization compound 87 was obtained. The structure thereof was confirmed by $^1$H-NMR and IR.

Synthesis Example 19: Synthesis of Photoisomerization Compound 88

Photoisomerization compound 88 was synthesized in a similar manner to <Synthesis of photoisomerization compound 87> in [Synthesis Example 18] using 2,6-diacetamide-4-hydroxymethylpyridine (manufactured by Apichemical Co., Ltd.) and 4,4'-stilbenedicarbonyl chloride (manufactured by Sigma-Aldrich Co. LLC). The structure thereof was confirmed by $^1$H-NMR and IR.

Synthesis Example 20: Synthesis of Photoisomerization Compound 91

<Synthesis of TMP-NO$_2$ (2)>
Into a 200 ml four-neck flask equipped with a nitrogen introducing tube, a dropping funnel, and a thermometer, 50 ml of CH$_2$Cl$_2$, trimethylolpropane (manufactured by Tokyo Chemical Industry Co., Ltd.) (5.0 g, 37.3 mmol), and triethylamine (manufactured by Tokyo Chemical Industry Co., Ltd.) (18.7 g, 184.5 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 4-nitrobenzoyl dichloride (manufactured by Sigma-Aldrich Co. LLC) (22.8 g, 123.0 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 16.9 g (yield 78%) of TMP-NO$_2$ (2) was obtained. The structure thereof was confirmed by $^1$H-NMR and IR.

<Synthesis of TMP-NH$_2$ (2)>

Into a 200 ml Erlenmeyer flask, TMP-NO$_2$ (2) (15.0 g, 25.8 mmol) and palladium carbon (0.18 g, 387 mmol) were put, 50 ml of ethanol and 50 ml of tetrahydrofuran were added thereto, and the mixture was stirred while hydrogen was enclosed therein. Palladium carbon was removed from the reaction solution, and the obtained solution was concentrated. Thereafter, the concentrated product was recrystallized with ethanol to obtain 11.0 g (yield 87%) of TMP-NH$_2$ (2).

<Synthesis of 2,6-diacetamidopyridine-CHO (2)>

Into a 200 ml four-neck flask equipped with a nitrogen introducing tube, a dropping funnel, and a thermometer, 50 ml of CH$_2$Cl$_2$, 2,6-diacetamide-4-hydroxymethylpyridine (manufactured by Apichemical Co., Ltd.) (10.0 g, 36.6 mmol), and triethylamine (manufactured by Tokyo Chemical Industry Co., Ltd.) (6.7 g, 65.9 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 5-formyl-2-furancarbonyl chloride (manufactured by Aurora Fine Chemicals) (7.0 g, 43.9 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 10.7 g (yield: 85%) of 2,6-diacetamide pyridine-CHO (2) was obtained. The structure thereof was confirmed by $^1$H-NMR and IR.

<Synthesis of Photoisomerization Compound 91>

Into a 100 ml four-neck flask equipped with a cooling tube, a nitrogen introducing tube, and a thermometer, TMP-NH$_2$ (2) (10.0 g, 20.3 mmol) synthesized above, 2,6-diacetamidopyridine-CHO (2) (7.0 g, 20.3 mmol) synthesized above, and 30 ml of DMF were put, and heated and stirred at 50° C. This reaction solution was subjected to suction filtration, and the obtained powder was washed with cooling ethanol. Furthermore, the powder was purified by column chromatography using a methylene chloride/methanol-based solvent. As a result, 15.6 g (yield: 52%) of photoisomerization compound 91 was obtained. The structure thereof was confirmed by $^1$H-NMR and IR.

Synthesis Example 21: Synthesis of Photoisomerization Compound 101

<Synthesis of Photoisomerization Compound 101>

Photoisomerization compound 101 was synthesized using azomethine-2NH$_2$ (2) synthesized in <Synthesis of azomethine-2NH$_2$ (2)> in [Synthesis Example 3] and carbonyl diisocyanate (manufactured by Chemiliva Pharmaceutical) with reference to Chemische Berichte, 1986, 119 (3), 83. The structure thereof was confirmed by $^1$H-NMR and IR.

Synthesis Example 22: Synthesis of Photoisomerization Compound 102

<Synthesis of Photoisomerization Compound 102>

Photoisomerization compound 102 was synthesized using 4,4'-azodianiline and carbonyl diisocyanate (manufactured by Chemiliva Pharmaceutical) with reference to Chemische Berichte, 1986, 119 (3), 83. The structure thereof was confirmed by $^1$H-NMR and IR.

Synthesis Example 23: Synthesis of Photoisomerization Compound 105

<Synthesis of STB-NO$_2$ (2)>

Into a 200 ml four-neck flask equipped with a nitrogen introducing tube, a dropping funnel, and a thermometer, 50 ml of CH$_2$Cl$_2$, 4,4'-(1,2-ethenediyl)-bisaniline (manufactured by Aurora Fine Chemicals LLC) (10.0 g, 47.6 mmol), and triethylamine (manufactured by Tokyo Chemical Industry Co., Ltd.) (15.9 g, 156.9 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 3-nitrobenzoyl dichloride (manufactured by Sigma-Aldrich Co. LLC) (19.4 g, 104.6 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 17.9 g (yield 74%) of STB-NO$_2$ (2) was obtained. The structure thereof was confirmed by $^1$H-NMR and IR.

<Synthesis of STB-NH$_2$ (2)>

Into a 200 ml Erlenmeyer flask, STB-NO$_2$ (2) (15.0 g, 29.5 mmol) and palladium carbon (0.14 g, 295 mmol) were put. Subsequently, 50 ml of ethanol and 50 ml of tetrahydrofuran were put thereinto, and the mixture was stirred while hydrogen was enclosed therein. Palladium carbon was removed from the reaction solution, and the obtained solution was concentrated. Thereafter, the concentrated product was recrystallized with ethanol to obtain 10.8 g (yield 82%) of STB-NH$_2$ (2).

<Synthesis of Photoisomerization Compound 105>

Photoisomerization compound 105 was synthesized using STB-NH$_2$ (2) and carbonyl diisocyanate (manufactured by Chemiliva Pharmaceutical) with reference to Chemische Berichte, 1986, 119 (3), 83. The structure thereof was confirmed by $^1$H-NMR and IR.

Synthesis Example 24: Synthesis of Photoisomerization Compound 106

<Synthesis of DTMP-CHO>

Into a 500 ml four-neck flask equipped with a nitrogen introducing tube, a dropping funnel, and a thermometer, 200 ml of CH$_2$Cl$_2$, di(trimethylolpropane) (manufactured by Tokyo Chemical Industry Co., Ltd.) (10.0 g, 39.9 mmol), and triethylamine (manufactured by Tokyo Chemical Industry Co., Ltd.) (26.7 g, 263.6 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 4-formylbenzoyl chloride (manufactured by Sigma-Aldrich Co. LLC) (29.6 g, 175.8 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 19.0 g (yield: 61%) of DTMP-CHO was obtained. The structure thereof was confirmed by $^1$H-NMR and IR.

<Synthesis of DTMP-NO$_2$>

Into a 100 ml four-neck flask equipped with a cooling tube, a nitrogen introducing tube, and a thermometer, DTMP-CHO (15.0 g, 19.3 mmol) synthesized above, 5-nitro-2 furanamine (10.9 g, 84.7 mmol), and 30 ml of CH$_2$Cl$_2$ were put, and heated and stirred at 50° C. This reaction solution was subjected to suction filtration, and the obtained powder was washed with cooling ethanol. Furthermore, the powder was purified by column chromatography using a methylene chloride/methanol-based solvent. As a result, 13.4 g (yield: 56%) of DTMP-NO$_2$ was obtained. The structure thereof was confirmed by $^1$H-NMR and IR.

<Synthesis of DTMP-NH$_2$>

Into a 200 ml Erlenmeyer flask, DTMP-NO$_2$ (12.0 g, 9.7 mmol) and palladium carbon (0.09 g, 193.1 mmol) were put. Subsequently, 50 ml of ethanol and 50 ml of tetrahydrofuran were put thereinto, and the mixture was stirred while hydrogen was enclosed therein. Palladium carbon was removed from this reaction solution, and the obtained solution was concentrated. Thereafter, the concentrated product was recrystallized with ethanol to obtain 9.9 g (yield 91%) of DTMP-NH$_2$.

<Synthesis of Photoisomerization Compound 106>

Photoisomerization compound 106 was synthesized using DTMP-NH$_2$ and carbonyl diisocyanate (manufactured by Chemiliva Pharmaceutical) with reference to Chemische Berichte, 1986, 119 (3), 83. The structure thereof was confirmed by $^1$H-NMR and IR.

Synthesis Example 25: Synthesis of Photoisomerization Compound 113

<Synthesis of azomethine-2NH$_2$ (6)>

Azomethine-2NH$_2$ (6) was synthesized in a similar manner to <Synthesis of azomethine-2NH$_2$> in Synthesis Example 1 except that 5-nitro-2 furaldehyde (manufactured by KANTO CHEMICAL CO., INC.) was replaced with 4-nitrobenzaldehyde (manufactured by Tokyo Chemical Industry Co., Ltd.) in <Synthesis of azomethine-2NH$_2$> in Synthesis Example 1. The structure thereof was confirmed by $^1$H-NMR and IR.

<Synthesis of Photoisomerization Compound 113>

Into a 500 ml four-neck flask equipped with a nitrogen introducing tube, a dropping funnel, and a thermometer, 300 ml of DMF, azomethine-NH$_2$ (6) (12.0 g, 56.8 mmol) synthesized above, and sodium hydrogen carbonate (manufactured by KANTO CHEMICAL CO., INC.) (15.7 g, 187.4 mmol) were put and stirred at room temperature for dissolution. This solution was cooled with an ice bath, and the liquid temperature thereof was maintained at 10° C. or lower. Thereafter, to this solution, 2-chloro-4,6-diamino-1,3,5-triazine (18.2 g, 125.0 mmol) was added dropwise over 30 minutes, and the mixture was stirred at room temperature for five hours. After the solution was put into water, a solid insoluble in water was filtered, and the obtained solid was washed with water. The solid that had been washed with water was dried, and then purified by column chromatography using a methylene chloride/methanol-based solvent. As a result, 11.4 g (yield: 49%) of photoisomerization compound 113 was obtained. The structure thereof was confirmed by $^1$H-NMR and IR.

Synthesis Example 26: Synthesis of Photoisomerization Compound 115

<Synthesis of Photoisomerization Compound 115>

Photoisomerization compound 115 was synthesized in a similar manner to Synthesis Example 25 except that 4-nitrobenzaldehyde (manufactured by Tokyo Chemical Industry Co., Ltd.) was replaced with 5-nitrothiophene-2-carboxaldehyde (manufactured by Aurora Fine Chemicals LLC) in Synthesis Example 25. The structure thereof was confirmed by $^1$H-NMR and IR.

Synthesis Example 27: Synthesis of Photoisomerization Compound 117

<Synthesis of Photoisomerization Compound 117>

Photoisomerization compound 117 was synthesized in a similar manner to Synthesis Example 25 except that azomethine-NH$_2$ (6) was replaced with 4,4'-(1,2-ethylenediyl)dianiline (manufactured by Aurora Fine Chemicals LLC) in <Synthesis of photoisomerization compound 113> in Synthesis Example 25. The structure thereof was confirmed by $^1$H-NMR and IR.

Synthesis Example 28: Synthesis of Photoisomerization Compound 124

<Synthesis of TMP-NO$_2$ (2)>

Into a 500 ml four-neck flask equipped with a nitrogen introducing tube, a dropping funnel, and a thermometer, 300 ml of CH$_2$Cl$_2$, trimethylolpropane (manufactured by Tokyo Chemical Industry Co., Ltd.) (5.0 g, 37.3 mmol), and triethylamine (manufactured by Tokyo Chemical Industry Co., Ltd.) (18.7 g, 184.5 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of STB-COCl (35.4 g, 123.0 mmol) synthesized in <Synthesis of STB-COCl> in [Synthesis Example 12] was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 17.9 g (yield 54%) of TMP-NO$_2$ (2) was obtained. The structure thereof was confirmed by $^1$H-NMR and IR.

<Synthesis of TMP-NH$_2$ (2)>

Into a 300 ml Erlenmeyer flask, TMP-NO$_2$ (2) (15.0 g, 16.9 mmol) and palladium carbon (0.12 g, 253.4 mmol) were put. Subsequently, 50 ml of ethanol and 50 ml of tetrahydrofuran were put thereinto, and the mixture was stirred while hydrogen was enclosed therein. Thereafter, palladium carbon was removed from the reaction solution, and the obtained solution was concentrated. Thereafter, the concentrated product was recrystallized with ethanol to obtain 11.3 g (yield 84%) of TMP-NH$_2$ (2).

<Synthesis of Photoisomerization Compound 124>

Into a 500 ml four-neck flask equipped with a nitrogen introducing tube, a dropping funnel, and a thermometer, 150 ml of DMF, TMP-NH$_2$ (2) (11.0 g, 13.8 mmol) synthesized above, and sodium hydrogen carbonate (manufactured by KANTO CHEMICAL CO., INC.) (5.7 g, 68.2 mmol) were put and stirred at room temperature for dissolution. The solution was cooled with an ice bath, and the liquid temperature thereof was maintained at 10° C. or lower. Thereafter, to this solution, 2-chloro-4,6-diamino-1,3,5-triazine (6.6 g, 45.5 mmol) was added dropwise over 30 minutes, and the mixture was stirred at room temperature for five hours. After the solution was put into water, a solid insoluble in water was filtered, and the obtained solid was washed with water. The solid that had been washed with water was dried, and then purified by column chromatography using a methylene chloride/methanol-based solvent. As a result, 6.4 g (yield: 41%) of photoisomerization compound 124 was obtained. The structure thereof was confirmed by $^1$H-NMR and IR.

Synthesis Example 29: Synthesis of Photoisomerization Compound 129

<Synthesis of azomethine-2CN>

Azomethine-2CN was synthesized in a similar manner to Synthesis Example 1 except that 4-nitroaniline (manufactured by Tokyo Chemical Industry Co., Ltd.) and 5-nitro-2-furaldehyde (manufactured by KANTO CHEMICAL CO., INC.) were replaced with 4-aminobenzonitrile (manufactured by Tokyo Chemical Industry Co., Ltd.) and 5-formyl-furan-2 carbonitrile (manufactured by Aurora Fine Chemicals LLC), respectively in <Synthesis of azomethine-2NO$_2$> in <Synthesis Example 1>. The structure thereof was confirmed by $^1$H-NMR and IR.

<Synthesis of Photoisomerization Compound 129>

Into a 100 ml four-neck flask equipped with a nitrogen introducing tube, a dropping funnel, and a thermometer, 150 ml of DMF, azomethine-2CN (10.0 g, 45.2 mmol) synthesized above, and potassium hydroxide (manufactured by KANTO CHEMICAL CO., INC.) (2.8 g, 49.7 mmol) were put. Thereafter, to the reaction solution in the four-neck flask, dicyanodiamine (manufactured by Tokyo Chemical Industry Co., Ltd.) (8.4 g, 99.4 mmol) was added, and the mixture was heated and refluxed for six hours. After the solution was put into water, a solid insoluble in water was filtered, and the obtained solid was washed with water. The solid that had been washed with water was dried, and then purified by column chromatography using a methylene chloride/methanol-based solvent. As a result, 18.9 g (yield: 47%) of photoisomerization compound 129 was obtained. The structure thereof was confirmed by $^1$H-NMR and IR.

Synthesis Example 30: Synthesis of Photoisomerization Compound 132

<Synthesis of Photoisomerization Compound 132>

Photoisomerization compound 132 was synthesized in a similar manner to <Synthesis of photoisomerization compound 129> in [Synthesis Example 29] except that azomethine-2CN was replaced with 4,4'-(1E)-1,2-ethenediyl bis-benzonitrile (manufactured by Chemiliva Pharmaceutical) in <Synthesis of photoisomerization compound 129> in [Synthesis Example 29]. The structure thereof was confirmed by $^1$H-NMR and IR.

Synthesis Example 31: Synthesis of Photoisomerization Compound 135

<Synthesis of AZB-2CN>

Into a 500 ml four-neck flask equipped with a nitrogen introducing tube, a dropping funnel, and a thermometer, 300 ml of CH$_2$Cl$_2$, 4,4'-azodianiline (manufactured by Sigma-Aldrich Co. LLC) (12.0 g, 56.5 mmol), and triethylamine (manufactured by Tokyo Chemical Industry Co., Ltd.) (18.9 g, 186.6 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 3-cyanobenzoyl chloride (20.6 g, 124.4 mmol) in [Synthesis Example 12] was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 20.7 g (yield: 78%) of AZB-2CN was obtained. The structure thereof was confirmed by $^1$H-NMR and IR.

<Synthesis of Photoisomerization Compound 135>

Photoisomerization compound 135 was synthesized in a similar manner to <Synthesis of photoisomerization compound 129> in [Synthesis Example 29] except that azomethine-2CN was replaced with AZB-2CN in <Synthesis of photoisomerization compound 129> in [Synthesis Example 29]. The structure thereof was confirmed by $^1$H-NMR and IR.

Synthesis Example 32: Synthesis of Photoisomerization Compound 137

<Synthesis of DPE-2CN>

DPE-2CN was synthesized in a similar manner to Synthesis Example 24 except that di(trimethylolpropane) (manufactured by Tokyo Chemical Industry Co., Ltd.) and 5-nitro-2-furanamine (manufactured by Aurora Fine Chemicals LLC) were replaced with di(pentaerythritol) (manufactured by Tokyo Chemical Industry Co., Ltd.) and 4-cyanoaniline (manufactured by Tokyo Chemical Industry Co., Ltd.), respectively in <Synthesis of DTMP-CHO> and <Synthesis of DTMP-NO$_2$> in [Synthesis Example 24]. The structure thereof was confirmed by $^1$H-NMR and IR.

<Synthesis of Photoisomerization Compound 137>

Photoisomerization compound 137 was synthesized in a similar manner to <Synthesis of photoisomerization compound 129> in [Synthesis Example 29] except that azomethine-2CN was replaced with DPE-2CN in <Synthesis of photoisomerization compound 129> in [Synthesis Example 29]. The structure thereof was confirmed by $^1$H-NMR and IR.

Synthesis Example 33: Synthesis of Photoisomerization Compound 140

<Synthesis of azomethine-2NH$_2$ (7)>

Azomethine-2NH$_2$ (7) was synthesized in a similar manner to <Synthesis of azomethine-2NO$_2$> and <Synthesis of azomethine-2NH$_2$> in [Synthesis Example 1] except that 4-nitroaniline (manufactured by Tokyo Chemical Industry Co., Ltd.) and 5-nitro-2 furaldehyde (manufactured by KANTO CHEMICAL CO., INC.) were replaced with 4-nitroaniline (manufactured by Tokyo Chemical Industry Co., Ltd.) and 5-nitro-2 furanamine (manufactured by Aurora Fine Chemicals LLC), respectively in <Synthesis of azomethine-2NO$_2$> in [Synthesis Example 1]. The structure thereof was confirmed by $^1$H-NMR and IR.

<Synthesis of Photoisomerization Compound 140>

Photoisomerization compound 140 was synthesized in a similar manner to <Synthesis of AZB-2CN> in [Synthesis Example 31] using azomethine-NH$_2$ (7) synthesized above and 1,3-dioxoisoindole-5-carbonyl chloride (manufactured by Aurora Fine Chemicals LLC). The structure thereof was confirmed by $^1$H-NMR and IR.

Synthesis Example 34: Synthesis of Photoisomerization Compound 145

<Synthesis of azomethine-2NH$_2$ (8)>

Azomethine-2NH$_2$ (8) was synthesized in a similar manner to <Synthesis of azomethine-2NO$_2$> and <Synthesis of azomethine-2NH$_2$> in [Synthesis Example 1] except that 4-nitroaniline (manufactured by Tokyo Chemical Industry Co., Ltd.) and 5-nitro-2 furaldehyde (manufactured by KANTO CHEMICAL CO., INC.) were replaced with 4-nitrobenzaldehyde (manufactured by Tokyo Chemical Industry Co., Ltd.) and 5-nitrothiophene-2-carboxaldehyde (manufactured by Aurora Fine Chemicals LLC), respectively in <Synthesis of azomethine-2NO$_2$> in [Synthesis Example 1]. The structure thereof was confirmed by $^1$H-NMR and IR.

<Synthesis of Photoisomerization Compound 145>

Photoisomerization compound 140 was synthesized in a similar manner to <Synthesis of AZB-2CN> in [Synthesis Example 31] using azomethine-NH$_2$ (5) synthesized above and 1,3-dioxoisoindole-5-carbonyl chloride (manufactured by Aurora Fine Chemicals LLC). The structure thereof was confirmed by $^1$H-NMR and IR.

Synthesis Example 35: Synthesis of Photoisomerization Compound 149

<Synthesis of Photoisomerization Compound 149>

Photoisomerization compound 140 was synthesized in a similar manner to <Synthesis of AZB-2CN> in [Synthesis Example 31] using 4,4'-(1,2-ethenediyl)-bisaniline (manufactured by Aurora Fine Chemicals LLC) and 1,3-dioxoisoindole-5-carbonyl chloride (manufactured by Aurora Fine Chemicals LLC). The structure thereof was confirmed by $^1$H-NMR and IR.

Synthesis Example 36: Synthesis of Photoisomerization Compound 153

<Synthesis of TMP-3NO$_2$>

Into a 500 ml four-neck flask equipped with a nitrogen introducing tube, a dropping funnel, and a thermometer, 200 ml of CH$_2$Cl$_2$, trimethylolpropane (manufactured by Tokyo Chemical Industry Co., Ltd.) (5.0 g, 37.3 mmol), and triethylamine (manufactured by Tokyo Chemical Industry Co., Ltd.) (18.7 g, 184.5 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 4-(4-nitrophenylazo) benzoyl chloride (manufactured by Chemimiva Pharmaceutical) (35.6 g, 123.0 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 21.3 g (yield: 64%) of TMP-3NO$_2$ was obtained. The structure thereof was confirmed by $^1$H-NMR and IR.

<Synthesis of TMP-3NH$_2$>

Into a 300 ml Erlenmeyer flask, TMP-NO$_2$ (2) (15.0 g, 16.8 mmol) and palladium carbon (0.12 g, 251.7 mmol) were put. Subsequently, 50 ml of ethanol and 50 ml of tetrahydrofuran were put thereinto, and the mixture was stirred while hydrogen was enclosed therein. Palladium carbon was removed from the reaction solution, and the obtained solution was concentrated. Thereafter, the concentrated product was recrystallized with ethanol to obtain 11.9 g (yield 88%) of TMP-NH$_2$ (2).

<Synthesis of photoisomerization compound 153>

Into a 200 ml four-neck flask equipped with a nitrogen introducing tube, a dropping funnel, and a thermometer, 100 ml of CH$_2$Cl$_2$, TMP-3NH$_2$ (10.0 g, 12.4 mmol), and triethylamine (manufactured by Tokyo Chemical Industry Co., Ltd.) (6.2 g, 61.6 mmol) were put and stirred at room temperature for dissolution. The solution was cooled with an ice bath, and the liquid temperature thereof was maintained at 10° C. or lower. Thereafter, to this solution, a CH$_2$Cl$_2$ solution of 1,3-dioxoisoindole-5-carbonyl chloride (manufactured by Aurora Fine Chemicals LLC) (8.6 g, 41.1 mmol) was added dropwise over 30 minutes, and the mixture was stirred at room temperature for five hours. The solution was concentrated under reduced pressure using a rotary evaporator, and the obtained solid was washed with water. The solid that had been washed with water was purified by column chromatography using a methylene chloride/methanol-based solvent. As a result, 11.5 g (yield: 70%) of photoisomerization compound 153 was obtained. The structure thereof was confirmed by $^1$H-NMR and IR.

Although several methods for synthesizing a photoisomerization compound have been exemplified above, the method for synthesizing a photoisomerization compound used in the present invention is not limited thereto.

<Other Additives of Resin Composition>

In addition to the resin described above, various additives can be applied to the resin composition according to an embodiment of the present invention as long as the intended effect of the present invention is not impaired. Hereinafter, examples of applicable additives will be described.

(Plasticizer)

In the present invention, it is preferable to add a compound known as a plasticizer from a viewpoint of modifying the resin composition, such as improving mechanical properties, imparting flexibility, imparting water absorption resistance, and reducing moisture permeability.

Examples of the plasticizer applicable to the present invention include a phosphate-based plasticizer, an ethylene glycol ester-based plasticizer, a glycerin ester-based plasticizer, a diglycerin ester-based plasticizer (fatty acid ester), a polyhydric alcohol ester-based plasticizer, a dicarboxylic acid ester-based plasticizer, a polyvalent carboxylic acid ester-based plasticizer, and a polymer plasticizer.

Among these plasticizers, it is preferable to use either or both of a polyhydric alcohol ester-based plasticizer (an ester-based plasticizer formed of a polyhydric alcohol and a monovalent carboxylic acid) and a polyvalent carboxylic acid ester-based plasticizer (an ester-based plasticizer formed of a polyvalent carboxylic acid and a monovalent alcohol).

For details of the plasticizer applicable to the resin composition according to an embodiment of the present invention, for example, compounds described in paragraphs [0102] to [0162] of JP 5380840 B2 can be referred to.

The addition amount of the plasticizer is within a range of preferably 0.001 to 50 parts by mass, more preferably 0.01 to 30 parts by mass, and still more preferably 0.1 to 15 parts by mass in 100 parts by mass of the resin composition according to an embodiment of the present invention.

(Antioxidant)

An antioxidant can also be applied to the resin composition according to an embodiment of the present invention in order to prevent decomposition of the resin by heat or light.

Examples of the antioxidant applicable to the present invention include a phenol-based antioxidant, a phosphorus-based antioxidant, a sulfur-based antioxidant, a heat resistant processing stabilizer, a light stabilizer, and an oxygen scavenger. Among these antioxidants, a phenol-based antioxidant, particularly a hindered phenol-based antioxidant having a bulky branched alkyl at an ortho position with respect to a hydroxy group of a phenol compound, a 2,2,6,6-tetraalkylpiperidine derivative, and a combination thereof are preferable.

For details of the antioxidant applicable to the resin composition according to an embodiment of the present invention, for example, compounds described in paragraphs [0163] to [0186] of JP 5380840 B2 can be referred to.

The addition amount of the antioxidant is appropriately selected as long as the object of the present invention is not impaired, but is within a range of preferably 0.001 to 5 parts by mass, more preferably 0.01 to 3.0 parts by mass, and still more preferably 0.1 to 1.0 part by mass in 100 parts by mass of the resin composition according to an embodiment of the present invention.

(Acid Scavenger and Ultraviolet Absorber)

Examples of an additive applicable to a three-dimensional laminate using the resin composition according to an embodiment of the present invention include an acid scavenger described in paragraphs [0187] to [0192] of JP 5380840 B2 and an ultraviolet absorber described in paragraphs [0193] to [0197] of JP 5380840 B2.

(Other Additives)

Examples of various resin additives that can be used in combination in the resin composition according to an embodiment of the present invention include fine particles, a release agent, a dye pigment, a flame retardant, an antistatic agent, an antifogging agent, a lubricant/antiblocking agent, a fluidity improver, a dispersant, and an antibacterial agent. Various fillers can also be blended. A filler to be blended is not particularly limited as long as it does not deteriorate the function of the composition. Powdery, fibrous, granular, and plate-like inorganic fillers, a resin-based filler, and a natural filler can be preferably used. Two or more types of these fillers may be used in combination.

The wavelength of light to be emitted for fluidizing the resin composition is preferably 250 nm to 480 nm, more preferably within a range of 260 to 450 nm, and still more preferably within a range of 270 to 420 nm. Within this range, the resin composition absorbs light well, and therefore improves a light melting property and fixability. In addition, by being irradiated with light having the above wavelength, the resin composition can be fluidized even when heat or pressure is not applied to the resin composition. In addition, by introducing the resin composition containing the resin having a complementary multiple hydrogen bonding group and the photoisomerization compound having a complementary multiple hydrogen bonding group into a toner described later, fixing at the above wavelength is possible, and a toner having high thin line reproducibility can be obtained. Note that the above wavelength range is a region of ultraviolet light, but includes a region of visible light close to ultraviolet light. This is because the resin composition according to an embodiment of the present invention can be fluidized under the following irradiation conditions even with irradiation light in a region of visible light close to ultraviolet light.

In order to make the resin composition non-fluidized, heat or light energy is applied to the fluidized resin composition. The type of energy varies depending on a partial structure of the photoisomerization compound, but the wavelength of light when light is emitted is preferably 330 nm to 700 nm, more preferably within a range of 340 to 680 nm, and still more preferably within a range of 350 to 650 nm. Within this range, the resin composition absorbs light well, and therefore can be non-fluidized even when heat or pressure is not applied to the resin composition. Therefore, by introducing the resin composition containing the resin having a complementary multiple hydrogen bonding group and the photoisomerization compound having a complementary multiple hydrogen bonding group into a toner described later, fixing at the above wavelength is possible, and a toner having high thin line reproducibility can be obtained. Note that the above wavelength range is a region of ultraviolet light, but includes a region of visible light close to ultraviolet light. This is because the resin composition according to an embodiment of the present invention can be non-fluidized under the following irradiation conditions even with irradiation light in a region of visible light close to ultraviolet light.

[Toner for Developing Electrostatic Charge Image]

A toner for developing an electrostatic charge image (hereinafter, also simply referred to as "toner") according to an embodiment of the present invention contains the resin composition according to an embodiment of the present invention. A resin in the resin composition contained in the toner can be used as a binder resin. In the following description of the toner, the "binder resin" is read as a "resin having a complementary multiple hydrogen bonding group".

The contents (content ratio) of the resin, that is, the binder resin (resin having a complementary multiple hydrogen bonding group) and the photoisomerization compound in the resin composition contained in the toner depend on the type of compound and the type of resin, but a molar ratio of a complementary multiple hydrogen bonding group of the photoisomerization compound to a complementary multiple hydrogen bonding group of the resin (number of moles of complementary multiple hydrogen bonding group of photoisomerization compound/number of moles of complementary multiple hydrogen bonding group of resin) is preferably 0.05 to 7.0, more preferably 0.1 to 5.0, still more preferably 0.2 to 3.0, particularly preferably 0.3 to 2.5, and most preferably 0.5 to 2.0 from a viewpoint of fixability and thin line reproducibility. Within this range, the photoisomerization compound is likely to undergo light phase transition, and the softening rate of the toner by light irradiation is sufficient.

The toner according to an embodiment of the present invention contains toner particles containing toner matrix particles and an external additive attached to surfaces of the toner matrix particles.

Here, "toner matrix particles" constitute a base of "toner particles". The "toner matrix particles" contain at least the resin composition, that is, the binder resin (resin having a complementary multiple hydrogen bonding group) and the photoisomerization compound (photoisomerization compound having a complementary multiple hydrogen bonding group), and may contain other components such as a colorant, a release agent (wax), and a charge control agent as necessary. The "toner matrix particles" are referred to as "toner particles" by addition of an external additive. The "toner" means an aggregate of "toner particles".

<Binder Resin>

In addition to the resin having a complementary multiple hydrogen bonding group and the photoisomerization compound having a complementary multiple hydrogen bonding group, the toner matrix particles may further contain a binder resin other than the resin having a complementary multiple hydrogen bonding group (hereinafter, also referred to as "another resin").

It is generally known that toner particles having a substantially uniform particle size and shape can be prepared by using an emulsion aggregation method described later as a method for manufacturing a toner.

By using the resin having a complementary multiple hydrogen bonding group and the another binder resin in combination, it is possible to prepare toner particles having a substantially uniform particle size and shape using salting out in the emulsion aggregation method. Therefore, the toner containing the resin having a complementary multiple hydrogen bonding group, the photoisomerization compound having a complementary multiple hydrogen bonding group, and the another binder resin can be more easily applied to an electrophotographic toner.

As such another binder resin, a resin generally used as a binder resin constituting a toner can be used without limitation. Specific examples thereof include a styrene resin, an acrylic resin, a styrene acrylic resin, a polyester resin, a silicone resin, an olefin resin, an amide resin, and an epoxy resin. These examples of the another binder resin can be used singly or in combination of two or more types thereof.

Among these resins, the another binder resin preferably contains at least one selected from the group consisting of a styrene resin, an acrylic resin, a styrene acrylic resin, and a polyester resin, and more preferably contains at least one selected from the group consisting of a styrene acrylic resin and a polyester resin from a viewpoint of reducing viscosity when being melted and having high sharpness meltability.

The styrene acrylic resin and the polyester resin, which are preferred forms in the another binder resin, are similar to the styrene acrylic resin and the polyester resin contained in the resin composition according to an embodiment of the present invention, and therefore description thereof is omitted here.

Note that the toner containing the resin having a complementary multiple hydrogen bonding group, the photoisomerization compound having a complementary multiple hydrogen bonding group, and the another binder resin may have a single layer structure or a core-shell structure. The type of a binder resin used for a core particle and a shell of the core-shell structure is not particularly limited.

<Colorant>

The toner matrix particles preferably further contain a colorant. It is considered that the photoisomerization compound having a complementary multiple hydrogen bonding group is colorless, but can induce a reversible fluidization and non-fluidization phenomena due to isomerization. Therefore, by introducing a desired colorant into a toner together with the photoisomerization compound having a complementary multiple hydrogen bonding group, it is possible to obtain a toner that can be fixed by light irradiation and has high color reproducibility of the added colorant. As the colorant, a generally known dye and pigment can be used.

Examples of a colorant for obtaining a black toner include carbon black, a magnetic material, and iron-titanium composite oxide black. Examples of the carbon black include channel black, furnace black, acetylene black, thermal black, and lamp black. Examples of the magnetic material include ferrite and magnetite.

Examples of a colorant for obtaining a yellow toner include: dyes such as C. I. Solvent Yellow 19, C. I. Solvent Yellow 44, C. I. Solvent Yellow 77, C. I. Solvent Yellow 79, C. I. Solvent Yellow 81, C. I. Solvent Yellow 82, C. I. Solvent Yellow 93, C. I. Solvent Yellow 98, C. I. Solvent Yellow 103, C. I. Solvent Yellow 104, C. I. Solvent Yellow 112, and C. I. Solvent Yellow 162; and pigments such as C. I. Pigment yellow 14, C. I. Pigment 10 yellow 17, C. I. Pigment yellow 74, C. I. Pigment yellow 93, C. I. Pigment yellow 94, C. I. Pigment yellow 138, C. I. Pigment yellow 155, C. I. Pigment yellow 180, and C. I. Pigment yellow 185.

Examples of a colorant for obtaining a magenta toner include: dyes such as C. I. Solvent Red 1, C. I. Solvent Red 49, C. I. Solvent Red 52, C. I. Solvent Red 58, C. I. Solvent Red 63, C. I. Solvent Red 111, and C. I. Solvent Red 122; and pigments such as C. I. Pigment Red 5, C. I. Pigment Red 48:1, C. I. Pigment Red 53:1, C. I. Pigment Red 57:1, C. I. Pigment Red 122, C. I. Pigment Red 139, C. I. Pigment Red 144, C. I. Pigment Red 149, C. I. Pigment Red 166, C. I. Pigment Red 177, C. I. Pigment Red 178, and C. I. Pigment Red 222.

Examples of a colorant for obtaining a cyan toner include: dyes such as C. I. Solvent Blue 25, C. I. Solvent Blue 36, C. I. Solvent Blue 60, C. I. Solvent Blue 70, C. I. Solvent Blue 93, and C. I. Solvent Blue 95; and pigments such as C. I. Pigment Blue 1, C. I. Pigment Blue 7, C. I. Pigment Blue 15, C. I. Pigment Blue 60, C. I. Pigment Blue 62, C. I. Pigment Blue 66, and C. I. Pigment Blue 76.

Colorants for obtaining toners of colors can be used singly or in combination of two or more types thereof for each of the colors.

The content ratio of the colorant is preferably within a range of 0.5 to 20% by mass, and more preferably within a range of 2 to 10% by mass in the toner matrix particles.

<Release Agent>

The toner according to an embodiment of the present invention preferably further contains a release agent. By introducing the release agent into a toner together with the resin composition (resin and photoisomerization compound) according to an embodiment of the present invention, a toner having better fixability can be obtained.

The release agent used is not particularly limited, and various known waxes can be used. Examples of the wax include a polyolefin such as low molecular weight polypropylene, polyethylene, oxidized low molecular weight polypropylene, or polyethylene, a paraffin, and a synthetic ester wax. In particular, a synthetic ester wax is preferably used because the synthetic ester wax has a low melting point and a low viscosity. Behenyl behenate, glycerin tribehenate, pentaerythritol tetrabehenate, or the like is particularly preferably used as the synthetic ester wax.

The content ratio of the release agent is preferably within a range of 1 to 30% by mass, and more preferably within a range of 3 to 15% by mass in the toner matrix particles.

<Charge Control Agent>

The toner according to an embodiment of the present invention may further contain a charge control agent. The charge control agent used is not particularly limited as long as being able to provide a positive or negative charge by frictional charging and being colorless, and various known positively chargeable charge control agents and negatively chargeable charge control agents can be used.

The content ratio of the charge control agent is preferably within a range of 0.01 to 30% by mass, and more preferably within a range of 0.1 to 10% by mass in the toner matrix particles.

<External Additive>

In order to improve the fluidity, chargeability, cleanability, and the like of the toner, an external additive such as a fluidizing agent, which is a so-called post-treatment agent, or a cleaning aid may be added to the toner particles to constitute the toner according to an embodiment of the present invention.

Examples of the external additive include inorganic particles such as inorganic oxide particles including silica particles, alumina particles, and titanium oxide particles, inorganic stearic acid compound particles including aluminum stearate particles and zinc stearate particles, or inorganic titanic acid compound particles including strontium titanate particles and zinc titanate particles. These particles can be used singly or in combination of two or more types thereof.

These inorganic particles may be surface-treated with a silane coupling agent, a titanium coupling agent, a higher fatty acid, silicone oil, or the like in order to improve heat resistant storage stability and environmental stability.

The addition amount of the external additive is preferably within a range of 0.05 to 5% by mass, and more preferably within a range of 0.1 to 3% by mass in the toner matrix particles.

<Average Particle Size of Toner>

An average particle size of the toner particles is preferably within a range of 4 to 10 μm, and more preferably within a range of 6 to 9 μm in terms of volume-based median size ($D_{50}$). When the volume-based median size ($D_{50}$) is within the above range, transfer efficiency is increased, image quality of halftone is improved, and image quality of a thin line, a dot, or the like is improved.

In the present invention, the volume-based median size ($D_{50}$) of the toner is measured and calculated using a measuring device in which a computer system (manufactured by Beckman Coulter, Inc.) having data processing software "Software V 3.51" mounted thereon is connected to "Coulter Counter 3" (manufactured by Beckman Coulter, Inc.).

Specifically, 0.02 g of a measurement sample (toner) is added to 20 mL of a surfactant solution (for example, a surfactant solution obtained by diluting a neutral detergent containing a surfactant component 10 times with pure water in order to disperse toner particles) and familiarized. Thereafter, the resulting solution is subjected to ultrasonic dispersion for one minute to prepare a toner dispersion. This toner dispersion is injected into a beaker containing ISOTON II (manufactured by Beckman Coulter Co., Ltd.) in a sample stand using a pipette until the indicated concentration on the measuring device is 8%.

Here, by setting the concentration within this concentration range, a reproducible measured value can be obtained. Then, in the measuring device, the count number of measurement particles is set to 25000, an aperture size is set to 50 μm, a measurement range of 1 to 30 μm is divided into 256 parts, and a frequency value is calculated. A particle size of 50% from a larger volume integration fraction is taken as the volume-based median size ($D_{50}$).

[Method for Manufacturing Toner]

A method for manufacturing the toner according to an embodiment of the present invention is not particularly limited.

When a toner containing a compound represented by the general formula (1), a binder resin, and an additive such as a colorant is manufactured, it is preferable to use a manufacturing method utilizing an emulsion aggregation method in which the particle size and shape can be easily controlled. Such a manufacturing method preferably includes:

(1A) a binder resin particle dispersion preparation step of preparing a dispersion of binder resin particles;

(1B) a colorant particle dispersion preparation step of preparing a dispersion of colorant particles;

(1C) a photoisomerization compound solution preparation step of preparing a solution of a photoisomerization compound;

(2) an association step of adding a flocculant to an aqueous medium in which binder resin particles, colorant particles, and a photoisomerization compound are present to promote salting out, and simultaneously aggregating and fusing the particles to form associated particles;

(3) an aging step of controlling the shapes of the associated particles to form toner matrix particles;

(4) a filtering and washing step of filtering and separating the toner matrix particles from the aqueous medium and removing a surfactant and the like from the toner matrix particles;

(5) a drying step of drying the washed toner matrix particles; and (6) an external additive addition step of adding an external additive to the dried toner matrix particles. Steps (1A) to (1C) will be described below.

(1A) Binder Resin Particle Dispersion Preparation Step

In this step, resin particles are formed by conventionally known emulsion polymerization or the like, and the resin particles are aggregated and fused to form binder resin particles. For example, a polymerizable monomer constituting a binder resin is put into an aqueous medium and dispersed therein, and the polymerizable monomer is polymerized by a polymerization initiator to prepare a dispersion of binder resin particles.

As the method for obtaining the binder resin particle dispersion, in addition to the method for polymerizing a polymerizable monomer by a polymerization initiator in an aqueous medium, for example, a method for performing a dispersion treatment in an aqueous medium without using a solvent, or a method for dissolving a binder resin (crystalline resin or the like) in a solvent such as ethyl acetate to form a solution, emulsifying and dispersing the solution in an aqueous medium using a disperser, and then removing the solvent may be used.

At this time, the binder resin may contain a release agent (wax) in advance as necessary. For the purpose of dispersion, polymerization is preferably performed appropriately in the presence of a known surfactant (for example, an anionic surfactant such as polyoxyethylene (2) sodium dodecyl ether sulfate, sodium dodecyl sulfate, or dodecyl benzene sulfonic acid). Note that separately from the binder resin particle dispersion, a release agent particle dispersion may be prepared in a similar manner to the colorant particle dispersion preparation step, and may be present in the aqueous medium in the above association step (2).

The volume-based median size of the binder resin particles in the dispersion is preferably within a range of 50 to 300 nm. The volume-based median size of the binder resin particles in the dispersion can be measured by a dynamic light scattering method using "Microtrack UPA-150" (manufactured by Nikkiso Co., Ltd.).

(1B) Colorant Particle Dispersion Preparation Step

This colorant particle dispersion preparation step is a step of dispersing a colorant in a form of fine particles in an aqueous medium to prepare a dispersion of colorant particles.

The colorant can be dispersed using mechanical energy. The number-based median size of the colorant particles in the dispersion is preferably within a range of 10 to 300 nm, and more preferably within a range of 50 to 200 nm. The number-based median size of the colorant particles can be measured using an electrophoretic light scattering photometer "ELS-800" (manufactured by Otsuka Electronics Co., Ltd.).

(1C) Photoisomerization Compound Solution Preparation Step

The photoisomerization compound solution preparation step is a step of dissolving a photoisomerization compound having a complementary multiple hydrogen bonding group in an organic solvent to prepare a photoisomerization compound solution. The amount of the organic solvent used is not particularly limited as long as the photoisomerization compound is dissolved in the organic solvent, but is preferably as small as possible from a viewpoint of efficiently performing the subsequent association step and aging step.

<Organic Solvent>

The organic solvent used in the present step is not particularly limited and can be used as long as the organic solvent can dissolve the photoisomerization compound according to an embodiment of the present invention. Specific examples of the organic solvent include: an ester such as ethyl acetate or butyl acetate; an ether such as diethyl ether, diisopropyl ether, or tetrahydrofuran; a ketone such as acetone or methyl ethyl ketone; a saturated hydrocarbon such as hexane or heptane; and a halogenated hydrocarbon such as dichloromethane, dichloroethane, or carbon tetrachloride.

These organic solvents can be used singly or in mixture of two or more types thereof. Among these organic solvents, a ketone and a halogenated hydrocarbon are preferable, and acetone, methyl ethyl ketone, and dichloromethane are more preferable.

<Aqueous Medium>

Examples of the aqueous medium used in steps (1A) and (1B) include water and an aqueous medium mainly containing water and optionally containing a water-soluble solvent such as an alcohol or a glycol, a surfactant, a dispersant, or the like. The aqueous medium is preferably a mixture of water and a surfactant.

Examples of the surfactant include a cationic surfactant, an anionic surfactant, and a nonionic surfactant. Examples of the cationic surfactant include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Examples of the anionic surfactant include a fatty acid soap such as sodium stearate or sodium dodecanoate, sodium dodecylbenzene sulfonate, and sodium dodecyl sulfate. Examples of the nonionic surfactant include polyoxyethylene dodecyl ether, polyoxyethylene hexadecyl ether, polyoxyethylene nonyl phenyl ether, polyoxyethylene lauryl ether, polyoxyethylene sorbitan monooleate ether, and monodecanoyl sucrose.

These surfactants can be used singly or in combination of two or more types thereof. Among the surfactants, an anionic surfactant is preferably used, and sodium dodecylbenzene sulfonate is more preferably used.

The addition amount of the surfactant is preferably within a range of 0.01 to 10 parts by mass, and more preferably within a range of 0.04 to 1 part by mass with respect to 100 parts by mass of the aqueous medium.

The steps of association step (2) to external additive addition step (6) can be performed according to conventionally known various methods.

Note that the flocculant used in associative step (2) is not particularly limited, but is suitably selected from metal salts. Examples of the metal salts include: a monovalent metal salt such as a salt of an alkali metal such as sodium, potassium, or lithium; a divalent metal salt of calcium, magnesium, manganese, or copper; and a trivalent metal salt of iron or aluminum. Specific examples of the metal salts include sodium chloride, potassium chloride, lithium chloride, calcium chloride, magnesium chloride, zinc chloride, copper sulfate, magnesium sulfate, and manganese sulfate. Above all, a divalent metal salt is particularly preferably used because of being able to promote aggregation in a smaller amount. These metal salts can be used singly or in combination of two or more types thereof.

[Developer]

For example, the toner according to an embodiment of the present invention may be used as a one-component magnetic toner containing a magnetic material, may be used as a two-component developer mixed with a so-called carrier, or may be used singly as a non-magnetic toner, any of which can be suitably used.

Examples of the magnetic material include magnetite, y-hematite, and various ferrites.

Examples of the carrier constituting the two-component developer include magnetic particles made of a conventionally known material such as a metal including iron, steel, nickel, cobalt, ferrite, and magnetite, or alloys of those metals with a metal such as aluminum or lead.

As the carrier, a coated carrier obtained by coating surfaces of magnetic particles with a coating agent such as a resin, or a so-called resin dispersion type carrier obtained by dispersing magnetic material powder in a binder resin is preferably used. The coating resin is not particularly limited, but examples thereof include an olefin resin, a styrene resin, a styrene acrylic resin, a silicone resin, a polyester resin, and a fluorocarbon resin. A resin for constituting the resin dispersion type carrier is not particularly limited, and a known resin can be used. Examples thereof include an acrylic resin, a styrene acrylic resin, a polyester resin, a fluorocarbon resin, and a phenol resin.

The volume-based median size of the carrier is preferably within a range of 20 to 100 μm, and more preferably within a range of 25 to 80 μm. The volume-based median size of the carrier can be typically measured with a laser diffraction type particle size distribution measuring device "HELOS" (manufactured by SYMPATEC Gmbh) equipped with a wet type disperser.

The mixing amount of the toner with respect to the carrier is preferably within a range of 2 to 10% by mass with respect to 100% by mass of the total mass of the toner and the carrier.

[Image Forming Method]

The toner according to an embodiment of the present invention can be used in various known electrophotographic image forming methods. For example, the toner can be used in a monochrome image forming method or a full color image forming method. In the full color image forming method, the toner according to an embodiment of the present invention can be applied to any image forming method such as a 4-cycle image forming method including four types of color developing devices for yellow, magenta, cyan, and black and one photoreceptor, or a tandem type image forming method in which an image forming unit including a color developing device for each color and a photoreceptor is mounted for each color.

An image forming method according to an embodiment of the present invention includes: a step of forming a toner image formed of a toner containing the resin composition according to an embodiment of the present invention on a recording medium; and irradiating the toner image with light to soften the toner image.

The wavelength of light when the toner image is irradiated with light is preferably within a range of 280 nm or more and 480 nm or less from a viewpoint of sufficiently fluidizing the photoisomerization compound in the toner and quickly softening the toner image.

The image forming method preferably further includes a step of pressurizing the toner image from a viewpoint of obtaining better fixability. Furthermore, the toner image is preferably further heated in the pressurizing step from ae viewpoint of obtaining better fixability.

FIG. 1 is a schematic configuration diagram illustrating an image forming apparatus 100 used in an image forming method according to an embodiment of the present invention. However, the image forming apparatus used in the present invention is not limited to the following forms and illustrated examples. FIG. 1 illustrates an example of the monochrome image forming apparatus 100, but the present invention can also be applied to a color image forming apparatus.

The image forming apparatus 100 is an apparatus that forms an image on a recording sheet S as a recording medium, includes an image reader 71 and an automatic document feeder 72, and forms an image on the recording sheet S conveyed by a sheet conveyance system 7 with an image forming unit 10, an irradiation unit 40, and a pressure bonding unit 9.

The image forming apparatus 100 uses the recording sheet S as a recording medium. However, the medium on which an image is formed may be other than a sheet.

A document d placed on a document table of the automatic document feeder 72 is scanned and exposed by an optical system of a scanning exposure device of the image reader 71, and read by an image sensor CCD. An analog signal photoelectrically converted by the image sensor CCD is subjected to analog processing, A/D conversion, shading correction, image compression processing, and the like in the image processor 20 and then input to an exposure unit 3 of the image forming unit 10.

The sheet conveyance system 7 includes a plurality of trays 16, a plurality of sheet feeders 11, a conveyance roller 12, a conveyance belt 13, and the like. The trays 16 store recording sheets S having determined sizes, respectively, operate the sheet feeders 11 of the trays 16 determined according to an instruction from a control unit 90, and supply the recording sheets S. The conveyance roller 12 conveys the recording sheet S fed from each of the trays 16 by each of the sheet feeders 11 or the recording sheet S carried from a manual sheet feeder 15 to the image forming unit 10.

In the image forming unit 10, a charger 2, the exposure unit 3, a developing unit 4, a transfer unit 5, a charge remover (not illustrated), and a cleaner 8 are disposed in this order around the photoreceptor 1 in a rotational direction of the photoreceptor 1.

The photoreceptor 1, which is an image carrier, is an image carrier on a surface of which a photoconductive layer is formed, and is rotatable in an arrow direction in FIG. 1 by a driving device (not illustrated). Around the photoreceptor 1, a temperature and humidity meter 17 that detects a temperature and a humidity in the image forming apparatus 100 is disposed.

The charger 2 uniformly charges a surface of the photoreceptor 1 to uniformly charge the surface of the photoreceptor 1. The exposure unit 3 includes a beam emitting light source such as a laser diode, and irradiates the surface of the charged photoreceptor 1 with beam light to dissipate charges of a portion irradiated with the beam light, and forms an electrostatic latent image according to image data on the photoreceptor 1. The developing unit 4 supplies a toner contained therein to the photoreceptor 1 to form a toner image based on the electrostatic latent image on the surface of the photoreceptor 1.

The transfer unit 5 is disposed so as to face the photoreceptor 1 via the recording sheet S, and transfers a toner image onto the recording sheet S. The charge remover removes charges on the photoreceptor 1 after the toner image is transferred. The cleaner 8 includes a blade 85. The blade 85 cleans the surface of the photoreceptor 1 to remove the developer remaining on the surface of the photoreceptor 1.

The recording sheet S onto which the toner image has been transferred is conveyed to the pressure bonding unit 9 by the conveyance belt 13. The pressure bonding unit 9 is arbitrarily installed, and applies only pressure or heat and pressure to the recording sheet S onto which the toner image has been transferred by pressurizing members 91 and 92 to perform a fixing treatment, and thereby fixes an image onto the recording sheet S. The recording sheet S onto which the image has been fixed is conveyed to a sheet discharger 14 by a conveyance roller and discharged through the sheet discharger 14 to the outside of the apparatus.

In addition, the image forming apparatus 100 includes a sheet reversing unit 24, and can convey the thermally fixed recording sheet S to the sheet reversing unit 24 before the sheet discharger 14, can turn the recording sheet S upside down, and can discharge the recording sheet S, or can convey the recording sheet S that has been turned upside down to the image forming unit 10 again and can form images on both sides of the recording sheet S.

<Irradiation Unit>

Figure 2:
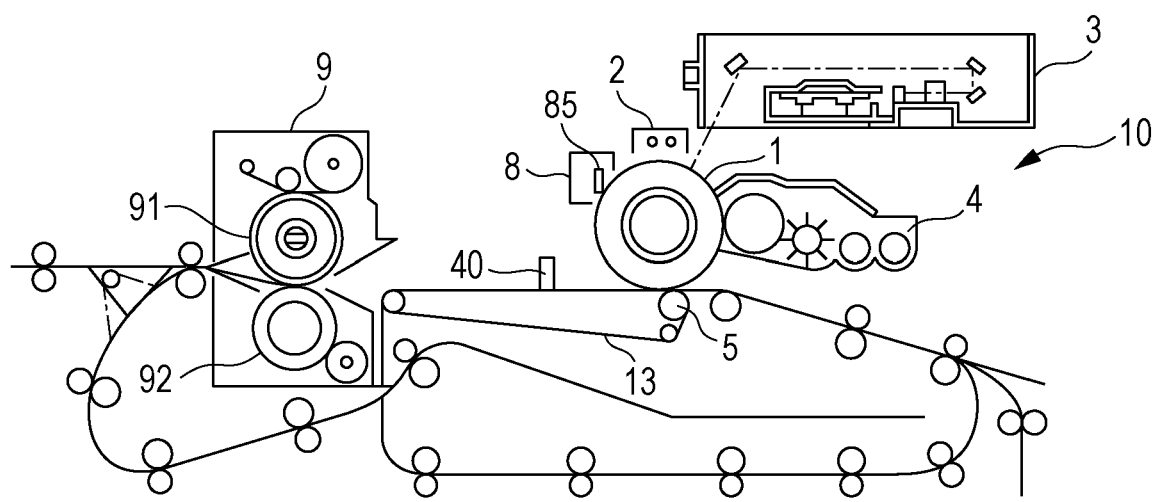
FIG. 2 is a schematic configuration diagram of an irradiation unit in the image forming apparatus.

FIG. 2 is a schematic configuration diagram of the irradiation unit 40 in the image forming apparatus 100.

The image forming apparatus 100 according to an embodiment of the present invention includes the irradiation unit 40. Examples of a device constituting the irradiation unit 40 include a light emitting diode (LED) and a laser light source.

The irradiation unit 40 melts and fluidizes the photoisomerization compound contained in the toner of the developer. The wavelength of light for irradiation may be any wavelength as long as the photoisomerization compound can be fluidized sufficiently, and is preferably within a range of 280 to 480 nm, more preferably within a range of 300 to 420 nm, and still more preferably within a range of 330 to 420 nm. The irradiation amount (integrated light amount) of light in the irradiation unit 40 may also be any amount as long as the photoisomerization compound can be fluidized sufficiently, and is preferably within a range of 0.1 to 200 J/cm$^2$, more preferably within a range of 0.1 to 100 J/cm$^2$, and still more preferably within a range of 0.1 to 50 J/cm$^2$.

When the photoisomerization compound is non-fluidized (re-solidified), the photoisomerization compound only needs to be left as it is at room temperature (within a range of 25±15° C.) to be non-fluidized.

That is, the image forming method according to an embodiment of the present invention includes: a step of forming a toner image formed of the toner according to an embodiment of the present invention on a recording medium; a step of irradiating the toner image with light having a wavelength within a range of 280 to 480 nm to soften the toner image; and a step of leaving the softened toner image at room temperature (within a range of 25 f 15° C.) to solidify the toner image to fix the toner image onto the recording medium. Note that the fixing step preferably further includes a step of pressurizing the softened toner image. In the pressurization step, the softened toner image is preferably further heated. This is because the toner image can be further softened by heating the toner.

Heating temperature at the time of further heating the toner image in the pressurizing step is preferably within a range of 30 to 100° C., and more preferably within a range of 40 to 100° C.

The irradiation unit 40 emits light toward a first surface of a recording sheet S holding a toner image on a photoreceptor side, and is disposed on the photoreceptor side with respect to the recording sheet S surface nipped by the photoreceptor 1 and a transfer roller 5 which is the transfer unit. The irradiation unit 40 is disposed in a conveyance direction (sheet conveyance direction) of the recording sheet S.

The irradiation unit 40 is disposed on a downstream side in the sheet conveyance direction with respect to the nip position by the photoreceptor 1 and the transfer roller 5 and on an upstream side in the sheet conveyance direction with respect to the pressure bonding unit 9.

By the image forming method according to an embodiment of the present invention, a uniform potential is applied to the photoreceptor 1 by the charger 2 to charge the photoreceptor 1. Thereafter, the photoreceptor t is scanned with a light flux emitted by the exposure unit 3 based on original image data to form an electrostatic latent image. Next, eth developer containing the toner containing the photoisomerization compound is supplied onto the photoreceptor 1 by the developing unit 4.

When the recording sheet S is conveyed from the tray 16 to the image forming unit 10 in synchronization with the timing when a toner image carried on a surface of the photoreceptor 1 reaches the position of the transfer roller 5 which is the transfer unit by rotation of the photoreceptor 1, the toner image on the photoreceptor 1 is transferred onto the recording sheet S nipped by the transfer roller 5 and the photoreceptor 1 by a transfer bias applied to the transfer roller 5.

The transfer unit 5 also serves as a pressurizing member, and can reliably bring the photoisomerization compound contained in the toner image into close contact with the recording sheet S while the transfer unit 5 can transfer the toner image from the photoreceptor 1 onto the recording sheet S.

After the toner image is transferred onto the recording sheet S, the blade 85 of the cleaner 8 removes the developer remaining on the surface of the photoreceptor 1.

In a process in which the recording sheet S onto which the toner image has been transferred is conveyed to the pressure bonding unit 9 by the conveyance belt 13, the irradiation unit 40 irradiates the toner image transferred onto the recording sheet S with light having a wavelength of 280 to 480 nm. By emitting ultraviolet light toward the toner image on the first surface of the recording sheet S from the irradiation unit 40, the toner image can be melted more reliably, and the fixability of the toner image onto the recording sheet S can be enhanced.

When the recording sheet S holding the toner image reaches the pressure bonding unit 9 by the conveyance belt 13, the pressurizing members 91 and 92 pressure-bond the toner image to the first surface of the recording sheet S. The toner image is softened by irradiation with ultraviolet light from the irradiation unit 40 before the toner image is fixed by the pressure bonding unit 9. Therefore, energy required for pressure-bonding the image to the recording sheet S can be reduced. The image forming method according to an embodiment of the present invention preferably further includes a step of pressurizing the toner image with the pressurizing members 91 and 92 while leaving the toner image at room temperature (within a range of 25±15° C.) in the step of solidifying the toner image to fix the toner image onto the recording medium. By applying pressure by the pressurizing members 91 and 92, the fixability of the toner image onto the recording sheet S is further enhanced.

A pressure for pressurizing the toner image on the recording medium is not particularly limited, but is preferably within a range of 0.01 to 5.0 MPa, and more preferably within a range of 0.05 to 1.0 MPa. By setting the pressure to 0.01 MPa or more, the deformation amount of the toner image can be increased. Therefore, the contact area between the toner image and a recording sheet S increases, and the fixability of an image is further enhanced easily. In addition, by setting the pressure to 5.0 MPa or less, shock noise during pressurization can be suppressed.

In the pressurization step, the toner image is preferably further heated. By applying pressure and heat by the pressurizing members 91 and 92, the fixability of the toner image onto the recording sheet S is further enhanced. Specifically, when the recording sheet S passes between the pressurizing members 91 and 92, the toner image softened by light irradiation is pressurized in a state of being further softened by heating. As a result, the fixability of the toner image onto the recording sheet S is further enhanced.

Thereafter, the toner image on the recording sheet S is (left at room temperature) in a natural environment to be solidified. Specifically, by placing the toner image in a natural environment (leaving the toner image at room temperature) until the recording sheet S that has passed between the pressurizing members 91 and 92 reaches the sheet discharger 14, the toner image on the recording sheet S can be more reliably solidified, and the fixability of the toner image onto the recording sheet S can be further improved.

When images are formed on both sides of the recording sheet S, the pressure-bonded recording sheet S is conveyed to the sheet reversing unit 24 before the sheet discharger 14, turned upside down, and discharged, or the recording sheet S that has been turned upside down is conveyed to the image forming unit 10 again.

(Optical Switching Material)

Since the resin composition according to an embodiment of the present invention is fluidized by light irradiation and then non-fluidized, an optical switching material can be prepared using the resin composition according to an embodiment of the present invention. For example, an optical switching material can be prepared by utilizing a change in color or polarity, mass transfer, a change in orientation, a change in viscosity, and a change in surface tension due to photoisomerization. For example, in a liquid crystal material or the like, the resin composition according to an embodiment of the present invention can be applied to patterning drawing that can be repeatedly rewritten in response to a change in molecular orientation due to photoisomerization. In addition, for example, a surface of a polymer film can be finely processed by utilizing a change in surface tension due to light irradiation and the resulting mass transfer. That is, an embodiment of the present invention provides an optical switching material containing the resin composition according to an embodiment of the present invention.

(Photosensitive Adhesive)

Since the resin composition according to an embodiment of the present invention is fluidized by light irradiation and then non-fluidized, a photosensitive adhesive that can be repeatedly used can be prepared using the resin composition according to an embodiment of the present invention. For example, the resin composition according to an embodiment of the present invention can be applied to various bonding techniques as a photosensitive adhesive that can be repeatedly photoattached and photodetached in response to a change in viscosity (coefficient of friction). That is, an embodiment of the present invention is a photosensitive adhesive containing the resin composition according to an embodiment of the present invention.

The photosensitive adhesive according to an embodiment of the present invention can be used for temporary fixing that can be used repeatedly, and is also suitable for recycling, but is not limited thereto.

When the resin composition according to an embodiment of the present invention is used as a temporary fixing material for bonding objects to each other, if the resin composition is not non-fluidized after being peeled off from the objects by light irradiation, the resin composition is bonded to various articles in a working environment and contaminates the working environment. In addition, the resin composition according to an embodiment of the present invention deteriorates the quality of the object, and is therefore required to be fluidized and then non-fluidized by light irradiation. In a preferred embodiment, the resin composition according to an embodiment of the present invention is reversibly fluidized and non-fluidized by light irradiation.

The photosensitive adhesive according to an embodiment of the present invention may contain, in addition to the resin composition according to an embodiment of the present invention, an additive such as the plasticizer, the antioxidant, the acid scavenger, or the ultraviolet absorber described in <Other additives of resin composition>, and the additive is not limited thereto.

EXAMPLES

Hereinafter, the present invention will be specifically described with reference to Examples, but the present invention is not limited thereto. Note that, in the following Examples, operations were performed at room temperature (25° C.) unless otherwise specified. Note that "%" and "parts" mean "% by mass" and "parts by mass", respectively, unless otherwise specified.

Photoisomerization compounds illustrated in Tables 1 to 4 below were each synthesized by the synthesis method described above. Comparative Compounds A to D used in Comparative Examples were synthesized by the following method.

[Chemical formula 19]

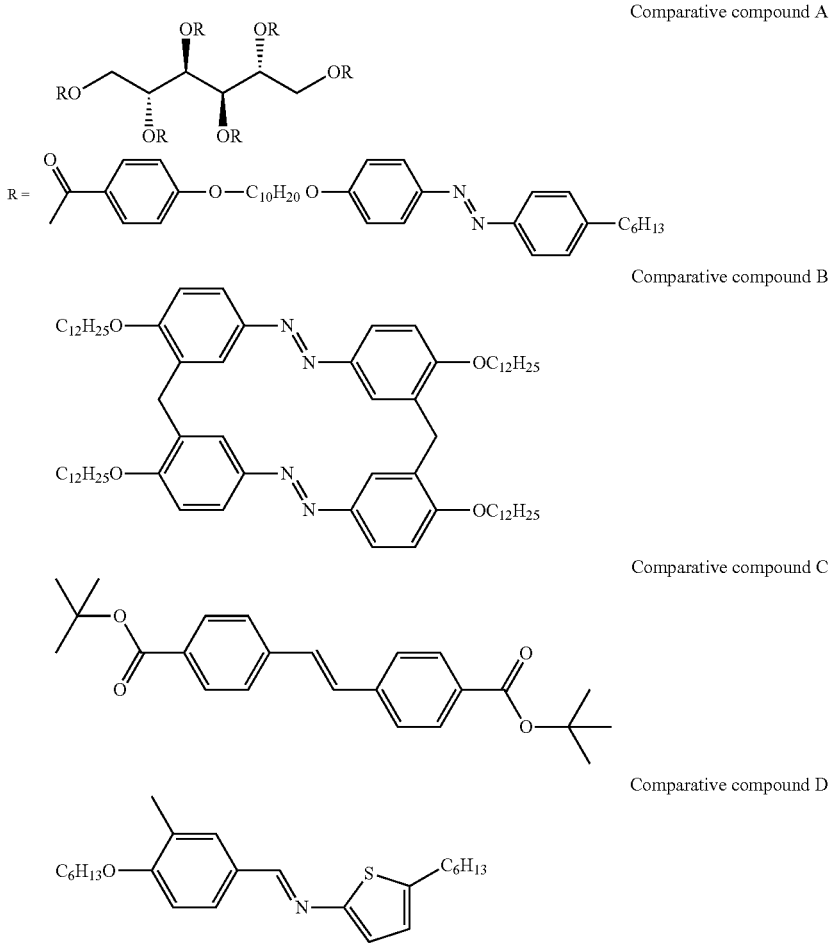

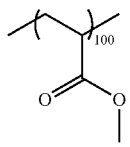

PA-A

[Synthesis of Comparative Compound A (Azobenzene Compound A)]

Azobenzene compound A was obtained in a similar manner to "(1-1-1) Synthesis of UV softening material A" described in paragraphs [0217] to [0224] of JP 2014-191078 A. The structure thereof was confirmed by $^1$H-NMR and IR, and it was found that the desired compound was obtained.

[Synthesis of Comparative Compound C (Stilbene Compound C)]

Comparative compound C was synthesized with reference to Chemistry of Materials, 2015, 27 (21), 7388-7394.

[Chemical formula 22]

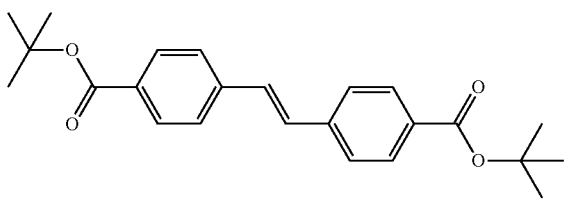

Comparative compound C

[Chemical formula 20]

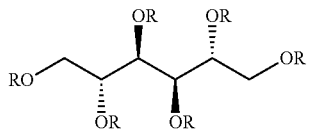

Comparative compound A

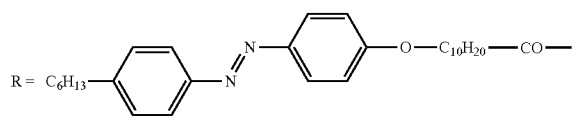

[Synthesis of Comparative Compound B (Azobenzene Compound B)]

Azobenzene compound B was obtained in a similar manner to "(1-2-1) Synthesis of UV softening material B" described in paragraphs [0227] to [0237] of JP 2014-191078 A. The structure thereof was confirmed by $^1$H-NMR and IR, and it was found that the desired compound was obtained.

[Synthesis of Comparative Compound D (Azomethine Compound D)]

In dimethylformamide (DMF), 4-hydroxy-3-methylbenzaldehyde and 1-iodohexane ($C_6H_{13}I$) were allowed to react with each other while being heated and refluxed using potassium carbonate ($K_2CO_3$), and the reaction solution was washed with water, then concentrated, and purified by column chromatography to obtain 4-hexyloxy-3-methylbenzaldehyde (see the following scheme 1). In ethanol (EtOH), 4-hexyloxy-3-methylbenzaldehyde obtained in scheme 1 and 5-hexylthiophen-2-amine were allowed to react with each other while being heated and stirred. The reaction solution was filtered, and the obtained powder was washed with cooling ethanol and recrystallized with methanol/ethanol to obtain azomethine compound D as a target product (see the following scheme 2). The structure thereof was confirmed by $^1$H-NMR and IR, and it was found that the desired compound was obtained.

[Chemical formula 21]

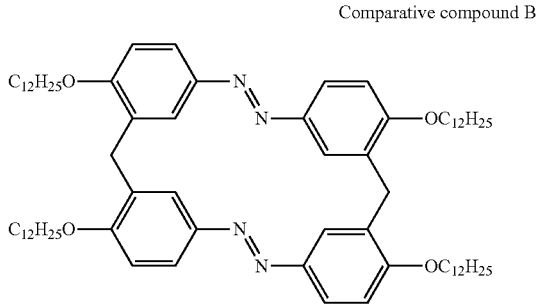

Comparative compound B

Scheme 1

[Chemical formula 23]

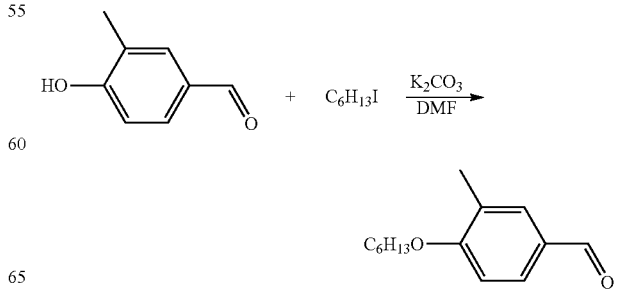

Scheme 2

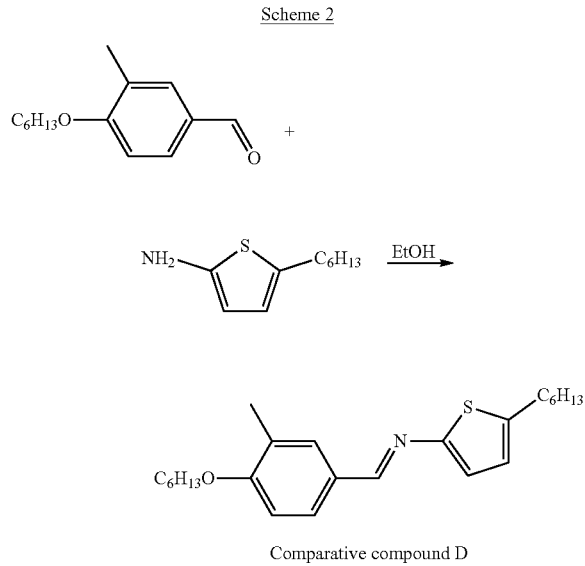

Comparative compound D

Resins illustrated in Tables 1 to 4 below were each synthesized by a synthesis method described later.

Note that hereinafter, among all the units constituting the resin, a molar ratio of the unit (S) not having a complementary multiple hydrogen bonding group B (unit S) to the unit (T) having a complementary multiple hydrogen bonding group B (unit T) is, for example, S/T=6/94 in a case of PA1-1 because MA/MA1=6/94 (mol/mol). In addition, the content (molar ratio) of the complementary multiple hydrogen bonding group B as a side chain to the resin including the unit S and the unit T is, for example, B/(S+T)=6/100 in the case of PA1-1 because MA/MA1=6/94 (mol/mol).

Compounds MA1 to MA8 represented by the following formulas were synthesized by the following methods. Note that DC1 (5-(2-propen-1-yloxy)-1,3-benzenedicarboxylic acid) as a polycarboxylic acid component of a polyester resin was obtained from Chemieliva Pharmaceutical.

[Chemical formula 24]

MA1

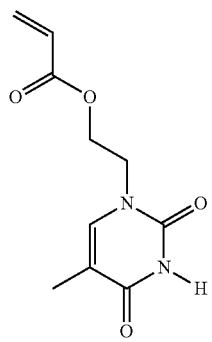

MA2

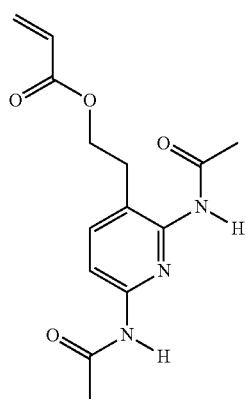

MA3

MA4

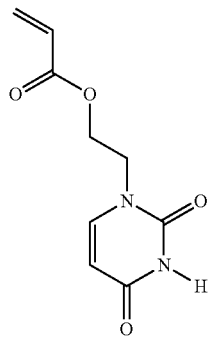

MA5

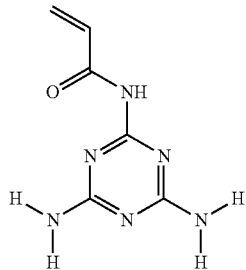

-continued

MA6

MA7

MA8

DC1

[Synthesis of (meth)acrylate Monomer]

Synthesis Example MA1

Monomer MA1 having an adenine moiety was obtained using 2-(6-amino-9H-purin-9-yl) ethanol (manufactured by Sigma-Aldrich Co. LLC) and acryloyl chloride (manufactured by Tokyo Chemical Industry Co., Ltd.) with reference to Organic & Biomolecular Chemistry, 2004, 2 (22), 3374. The structure thereof was confirmed by $^1$H-NMR and IR.

Synthesis Example MA2

Monomer MA2 having a thymine moiety was obtained using 2-bromoethyl acrylate (manufactured by Sigma-Aldrich Co. LLC), 2,4-di-t-butyl-p-cresol (manufactured by Tokyo Chemical Industry Co., Ltd.), and O,O'-bis(trimethylsilyl) thymine (manufactured by Sigma-Aldrich Co. LLC) with reference to Journal of Medicinal Chemistry, 2012, 55 (20), 8712. The structure thereof was confirmed by $^1$H-NMR and IR.

Synthesis Example MA3

Monomer MA3 having a 2,6-diacetamidopyridine moiety was obtained in a similar manner to <Synthesis Example MA1> except that 2-(6-amino-9H-purin-9-yl) ethanol in <Synthesis Example MA1> was replaced with 2,6-diacetamide-4-hydroxymethylpyridine (manufactured by Hong Kong Chemhere Co., Ltd.). The structure thereof was confirmed by $^1$H-NMR and IR.

Synthesis Example MA4

Monomer MA4 having a uracil moiety was obtained from Sigma-Aldrich Co. LLC.

Synthesis Example MA5

Monomer MA5 having a melamine moiety was obtained from Chemieliva Pharmaceutical.

Synthesis Example MA6

Into a 200 ml Erlenmeyer flask, 1-(4-nitrophenyl)-1,3,5-triazine-2,4,6-trione (5.0 g, 20.0 mmol, manufactured by Chemieliva Pharmaceutical Co., Ltd.) and palladium carbon (0.09 g, 200 mmol) were put, 30 ml of ethanol and 30 ml of tetrahydrofuran were put thereinto, and the mixture was stirred while hydrogen was enclosed therein. Palladium carbon was removed from the reaction solution, and the obtained solution was concentrated and then recrystallized with ethanol to obtain 4.2 g (yield 95%) of 1-(4-aminophenyl)-1,3,5-triazine-2,4,6-trione. Subsequently, monomer MA6 having a cyanuric acid moiety was obtained in a similar manner to <Synthesis Example MA1> except that 2-(6-amino-9H-purin-9-yl) ethanol in <Synthesis Example MA1> was replaced with 1-(4-aminophenyl)-1,3,5-triazine-2,4,6-trione. The structure thereof was confirmed by $^1$H-NMR and IR.

Synthesis Example MA7

Monomer MA7 having a diaminotriazine moiety was obtained from Chemieliva Pharmaceutical.

Synthesis Example MA8

Monomer MA8 having a naphthalimide moiety was obtained in a similar manner to <Synthesis Example MA1> except that 2-(6-amino-9H-purin-9-yl) ethanol in <Synthesis Example MA1> was replaced with 5-amino-1H-benzo[de]isoquinoline-1,3-dione (manufactured by Chemieliva Pharmaceutical). The structure thereof was confirmed by $^1$H-NMR and IR.

[Synthesis of Acrylic Resin]
Acrylic resins PA1-1 to PA1-5 and PA2 to PA8 represented by the following formulas were synthesized by the following methods.
[Chemical formula 25]
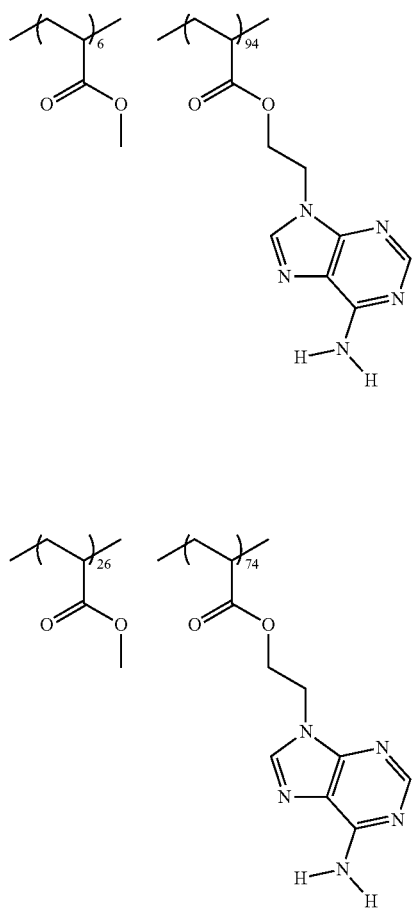
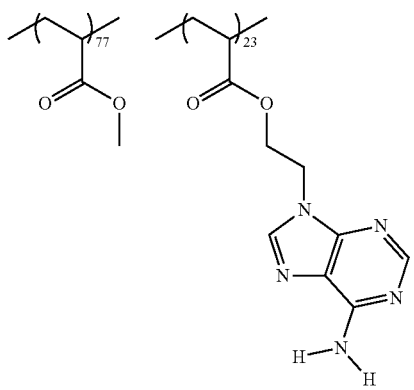
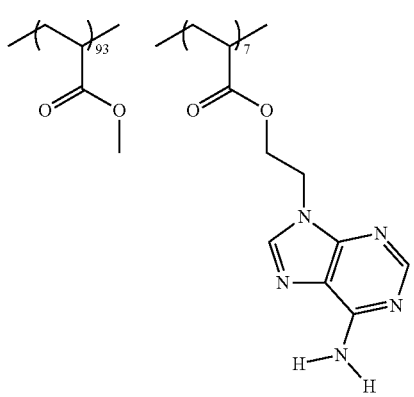
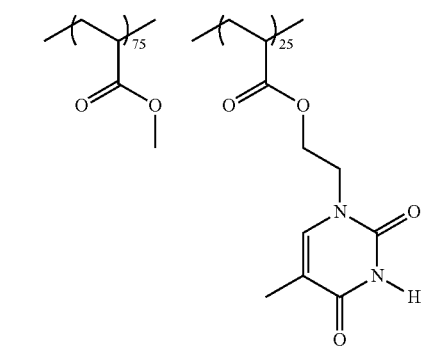
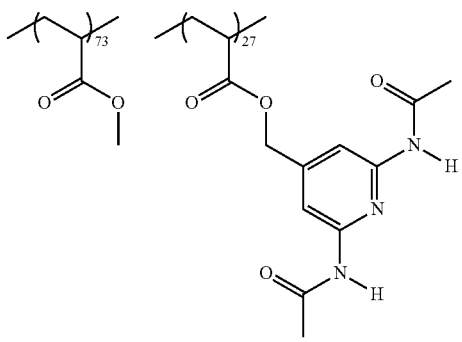

PA4

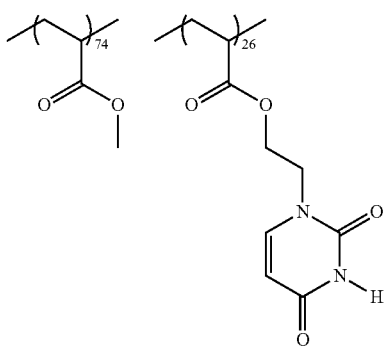

PA5

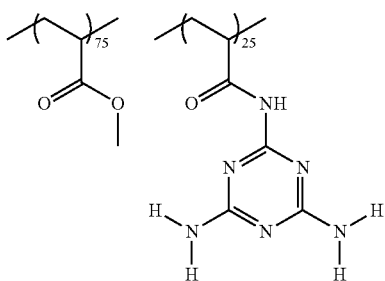

PA6

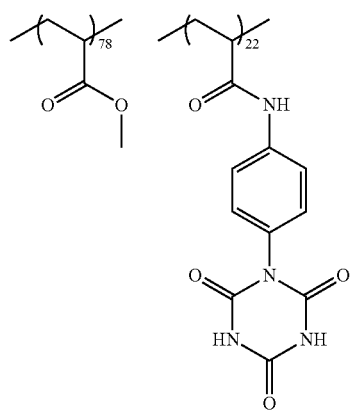

PA7

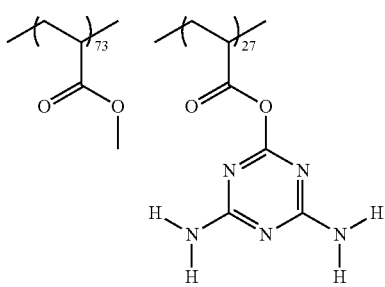

PA8

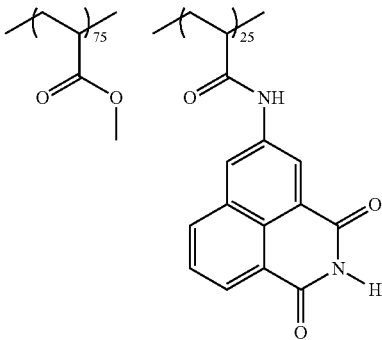

Synthesis Example PA1-1

Into a 100 ml three-neck flask equipped with a nitrogen line and a cooling tube, 50 ml of tetrahydrofuran was put, and heated and refluxed for 10 minutes. The mixture was cooled to room temperature with a nitrogen flow, and 9.5 ml of tetrahydrofuran degassed with a nitrogen-purged syringe was weighed. This tetrahydrofuran was put into a 50 ml four-neck flask equipped with a nitrogen line, a cooling tube, and a thermometer and already purged with nitrogen by a vacuum pump and nitrogen. Thereafter, with a nitrogen flow, methyl acrylate (manufactured by Tokyo Chemical Industry Co., Ltd.) (0.05 g, 0.6 mmol), MA1 (2.57 g, 11.0 mmol) obtained in <Synthesis Example MA1>, and AIBN (manufactured by Tokyo Chemical Industry Co., Ltd.) (0.10 g, 0.6 mmol) were put thereinto, and heated and refluxed for six hours. The polymerization solution was cooled to room temperature, and then slowly added dropwise to 50 ml of vigorously stirred ethanol to be reprecipitated. The whole amount of the polymerization solution was added dropwise thereto. Thereafter, the mixture was stirred at room temperature for 30 minutes, and the solid was filtered. The obtained solid was dried using a vacuum pump to obtain 2.28 g of PA1-1 having an adenine moiety (yield: 87%). A molar ratio of MA (methyl acrylate) to MA1 (MA/MA1) in PA1-1 was calculated from an integral ratio of $^1$H-NMR, and was 6/94 (mol/mol).

In the case of PA1-1, among all the units constituting the resin, a molar ratio of the unit (S) not having a complementary multiple hydrogen bonding group B to the unit (T) having a complementary multiple hydrogen bonding group B was S/T=6/94 because MA/MA1=6/94 (mol/mol).

In addition, the content of the complementary multiple hydrogen bonding group B as a side chain to the resin including the unit S and the unit T is, for example, B/(S+T)=6/100 in the case of PA1-1 because MA/MA1=6/94 (mol/mol).

The molecular weight of the obtained resin was measured under the following conditions using gel permeation chromatography (GPC).

(GPC Measurement Conditions)
Solvent: Methylene chloride
Column: Shodex K806, K805, and K803 (three column manufactured by Showa Denko K.K. were connected to each other to be used)
Column temperature: 25° C.
Sample concentration: 0.1% by mass
Detector: RI Model 504 (manufactured by GL Sciences Inc.)
Pump: L6000 (manufactured by Hitachi, Ltd.)
Flow rate: 1.0 mL/min
Mn of PA1-1 thus measured was 21400, and Mw/Mn was 2.33.

Synthesis Example PA1-2

1.92 g (yield: 84%) of PA1-2 was obtained in a similar manner to <Synthesis Example PA1-1> except that methyl acrylate (manufactured by Tokyo Chemical Industry Co., Ltd.) (0.25 g, 2.9 mmol), MA1 (2.03 g, 8.7 mmol) obtained in <Synthesis Example MA1>, and AIBN (manufactured by Tokyo Chemical Industry Co., Ltd.) (0.10 g, 0.6 mmol) were used. A ratio of MA to MA1 (MA/MA1) in PA1-2, that is, S/T was calculated from an integral ratio of $^1$H-NMR, and was 26/74 (mol/mol). Mn of PA1-2 was 26800, and Mw/Mn was 2.41.

Synthesis Example PA1-3 (Charging Ratio: 50/50)

1.92 g (yield: 84%) of PA1-3 was obtained in a similar manner to <Synthesis Example PA1-1> except that methyl acrylate (manufactured by Tokyo Chemical Industry Co., Ltd.) (0.5 g, 5.8 mmol), MA1 (1.35 g, 5.8 mmol) obtained in <Synthesis Example MA1>, and AIBN (manufactured by Tokyo Chemical Industry Co., Ltd.) (0.10 g, 0.6 mmol) were used. A molar ratio of MA to MA1 (MA/MA1) in PA1-3, that is, S/T was calculated from an integral ratio of $^1$H-NMR, and was 52/48 (mol/mol). Mn of PA1-3 was 29100, and Mw/Mn was 2.32.

Synthesis Example PA1-4

1.56 g (yield: 82%) of PA1-4 was obtained in a similar manner to <Synthesis Example PA1-1> except that methyl acrylate (manufactured by Tokyo Chemical Industry Co., Ltd.) (1.0 g, 11.6 mmol), MA1 (0.9 g, 3.9 mmol) obtained in <Synthesis Example MA1>, and AIBN (manufactured by Tokyo Chemical Industry Co., Ltd.) (0.13 g, 0.8 mmol) were used. A molar ratio of MA to MA1 (MA/MA1) in PA1-4, that is, S/T was calculated from an integral ratio of $^1$H-NMR, and was 77/23 (mol/mol). Mn of PA1-4 was 24400, and Mw/Mn was 2.21.

Synthesis Example PA1-5

1.97 g (yield: 86%) of PA1-5 was obtained in a similar manner to <Synthesis Example PA1-1> except that methyl acrylate (manufactured by Tokyo Chemical Industry Co., Ltd.) (2.0 g, 23.2 mmol), MA1 (0.29 g, 1.2 mmol) obtained in <Synthesis Example MA1>, and AIBN (manufactured by Tokyo Chemical Industry Co., Ltd.) (0.20 g, 1.22 mmol) were used. A molar ratio of MA to MA1 (MA/MA1) in PA1-5, that is, S/T was calculated from an integral ratio of $^1$H-NMR, and was 93/7 (mol/mol). Mn of PA1-5 was 25700, and Mw/Mn was 2.08.

Synthesis Example PA-A: Comparative Example 1.82 g (yield 91%) of PA-A was obtained in a similar manner to <Synthesis Example PA1-1> except that methyl acrylate (manufactured by Tokyo Chemical Industry Co., Ltd.) (2.0 g, 23.2 mmol) and AIBN (manufactured by Tokyo Chemical Industry Co., Ltd.) (0.19 g, 1.16 mmol) were used. Mn of PA-A was 26300, and Mw/Mn was 2.44.

Synthesis Examples PA2 to PA8

PA2 to PA8 were synthesized in a similar manner to <Synthesis Example PA1-4> except that MA1 in <Synthesis Example PA1-4> was replaced with MA2 to MA8, respectively.

[Synthesis of Polyester and Polyester Having Complementary Multiple Hydrogen Bonding Group]

Polyesters PES1-1 to PES1-3 represented by the following formulas were synthesized according to the following method, and then complementary multiple hydrogen bonding groups were introduced into polyesters PES1-1 to PES1-3 to synthesize polyesters PES1-1-1 to PES1-3-1, respectively. Polyesters PES2-1 to PES2-3 represented by the following formulas were synthesized according to the following method, and then complementary multiple hydrogen bonding groups were introduced into polyesters PES2-1 to PES2-3 to synthesize polyesters PES2-1-1 to PES2-3-1, respectively.

[Chemical formula 26]

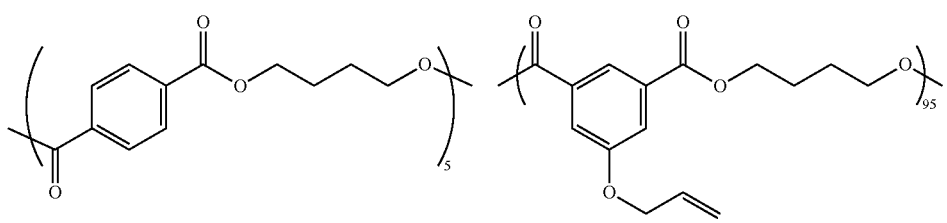

PES1-1

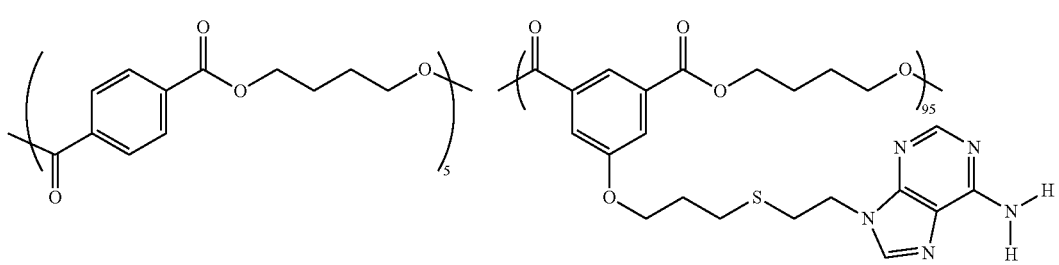

PES1-1-1

-continued
PES1-2
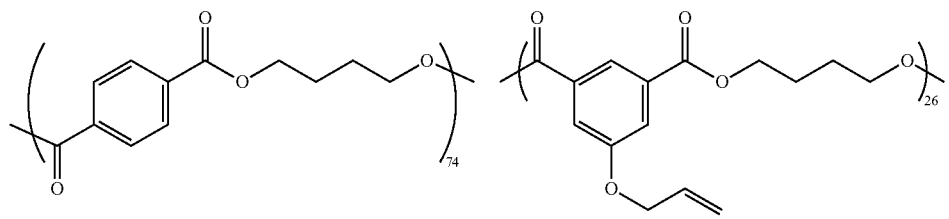
PES1-2-1
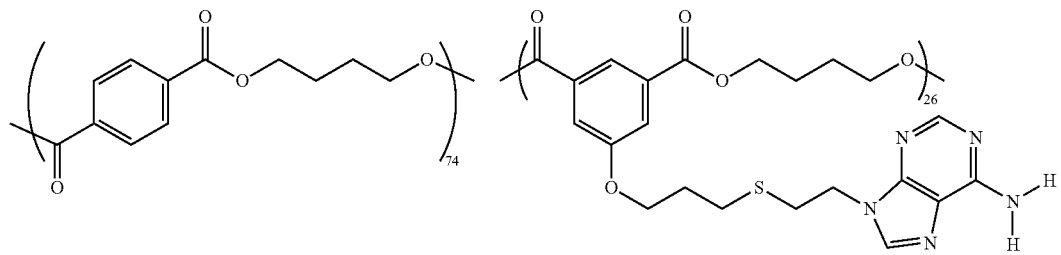
PES1-3
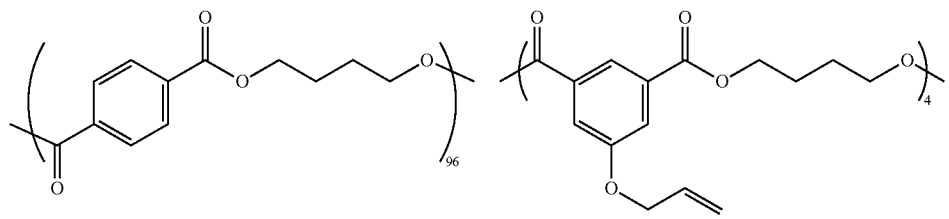
PES1-3-1
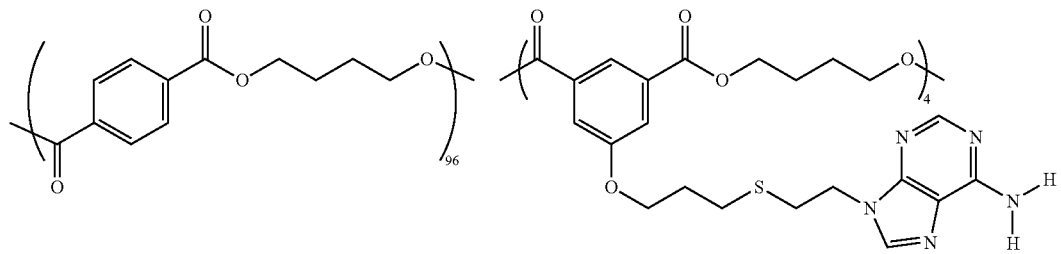
[Chemical formula 27]
PES2-1
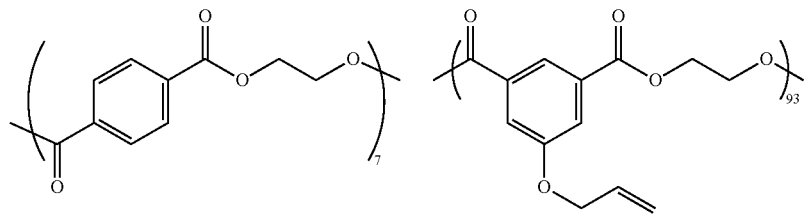
PES2-1-1
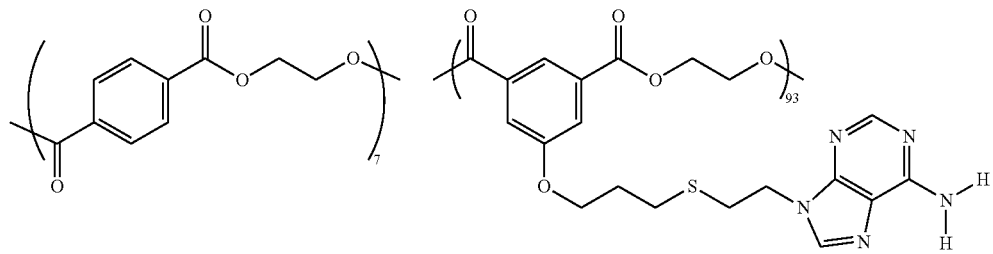

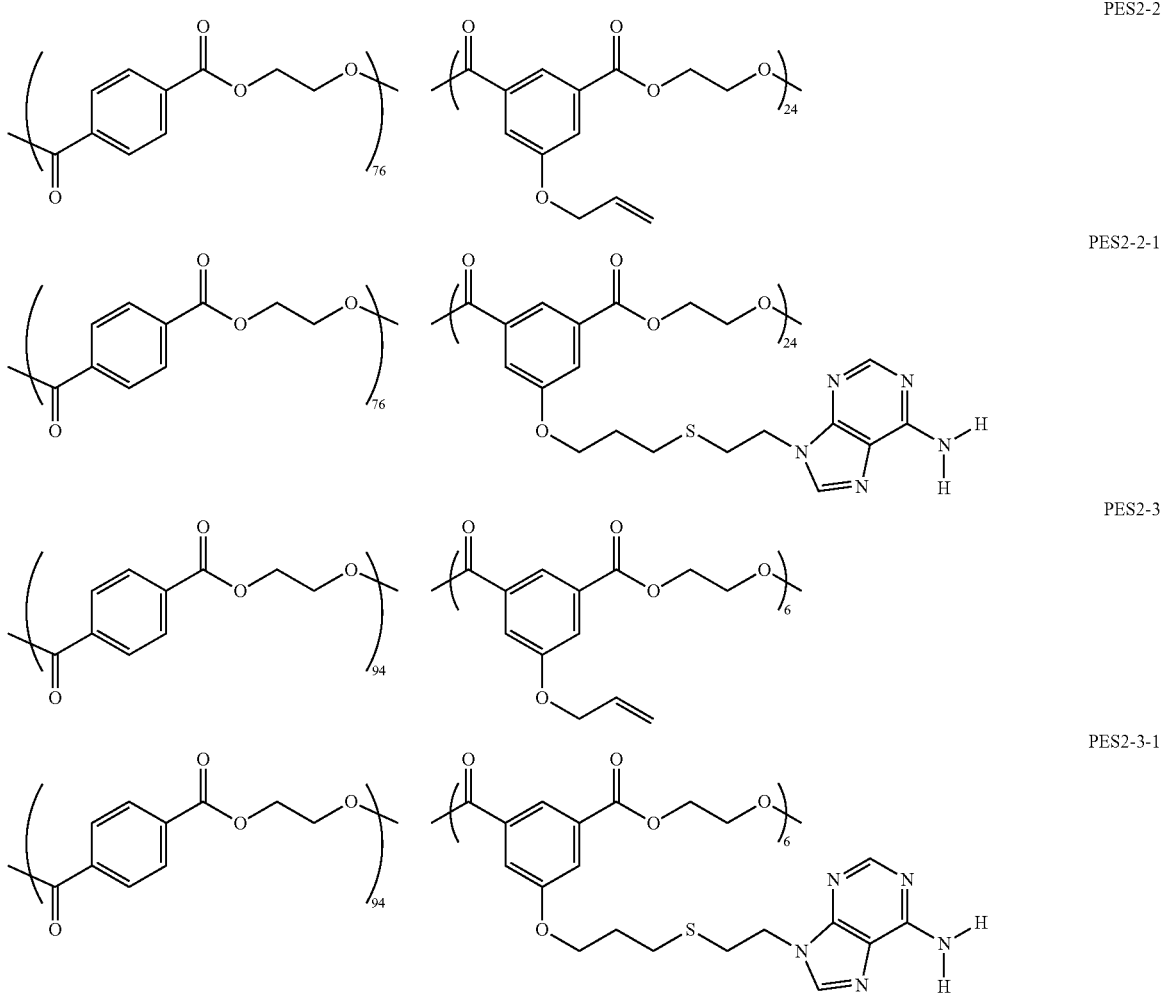

Synthesis Examples PES1-1 to PES1-3

PES1-1 to PES1-3 were synthesized using 5-(2-propen-1-yloxy)-1,3-benzenedicarboxylic acid (manufactured by Chemieliva Pharmaceutical) (DC1) with reference to Journal of Polymer Science, Polymer Physics Edition, 21, 7, 1091-1101 (1983). Introduction ratios of an allyloxy group unit in the polymers were calculated from an integral ratio of $^1$H-NMR, and were 5/95, 74/26, and 96/4 (mol/mol) in PES1-1 to PES1-3, respectively.

Synthesis Examples PES1-1-1 to PES1-3-1

PES1-1 to PES1-3 were each completely dissolved in tetrahydrofuran. Thereafter, a reaction solution containing 6-amino-9H-purin-9-ethanethiol (manufactured by Aurora Fine Chemicals LLC) in a molar amount 1.5 times the molar amount of allyl groups contained in each of the polymers was irradiated with UV light (254 nm) under stirring in a similar manner to Green Chemistry, 2013, 15 (4), 1016. Ethyl alcohol in an amount 30 times the amount of the reaction solution was put into a flask. A mechanical stirrer and Teflon (registered trademark) blade were installed therein. The obtained reaction solution was added dropwise into the flask over one hour while ethyl alcohol was vigorously stirred. The mixture was stirred for two hours, and then filtered under reduced pressure with Nutsche and filter paper. The obtained solid was dried under reduced pressure at 60° C. to obtain PES1-1-1 to PES1-3-1. Disappearance of a double bond of the allyl group was confirmed from an integral ratio of $^1$H-NMR.

Note that values of S/T in PES1-1-1 to PES1-3-1 were calculated based on an integration ratio of an allyl group in $^1$H-NMR, and were 5/95, 74/26, and 96/4 (mol/mol), respectively. Values of Mn of PES1-1-1 to PES1-3-1 were 20800, 21700, and 19600, respectively, and values of Mw/Mn of PES1-1-1 to PES1-3-1 were 2.38, 2.27, and 2.41, respectively.

Synthesis Examples PES2-1 to PES2-3

PES2-1 to PES2-3 were synthesized with reference to Macromolecules, 37, 7, 2532-2537 (2004). Introduction ratios of an allyloxy group unit in the polymers were calculated from an integral ratio of $^1$H-NMR, and were 7/93, 76/24, and 94/6 (mol/mol) in PES2-1 to PES2-3, respectively.

Synthesis Examples PES2-1-1 to PES2-3-1

PES2-1-1 to PES2-3-1 were obtained in a similar manner to <Synthesis Examples PES1-1-1 to PES1-3-1> except that PES2-1 to PES2-3 were used instead of PES1-1 to PES1-3. Disappearance of a double bond of the allyl group was confirmed from an integral ratio of $^1$H-NMR.

Note that values of S/T in PES2-1-1 to PES2-3-1 were calculated based on an integration ratio of an allyl group in $^1$H-NMR, and were 7/93, 76/24, and 94/6 (mol/mol), respectively. Values of Mn of PES2-1-1 to PES2-3-1 were 22700, 24100, and 22200, respectively, and values of Mw/Mn of PES2-1-1 to PES2-3-1 were 2.51, 2.35, and 2.27, respectively.

[Synthesis of Polycarbonate and Polycarbonate Having Complementary Multiple Hydrogen Bonding Group]

Polycarbonates PC1-1 to PC1-3 represented by the following formulas were synthesized according to the following method, and then polycarbonates PC-1-1 to PC1-3-1 having complementary multiple hydrogen bonding groups were synthesized using polycarbonates PC1-1 to PC1-3, respectively.

[Chemical formula 28]

PC1-1

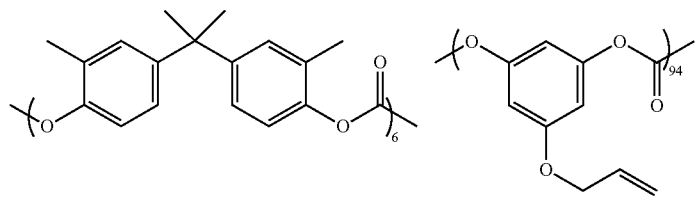

PC1-1-1

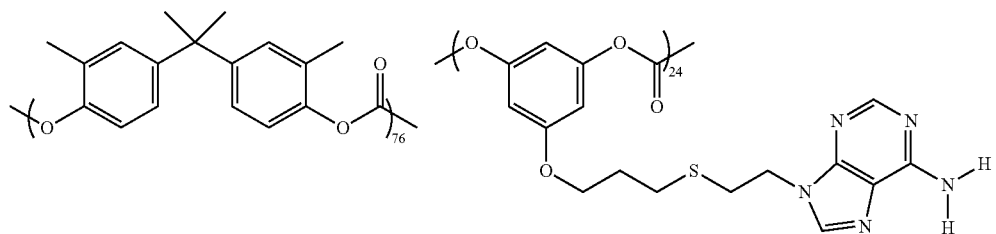

PC1-2

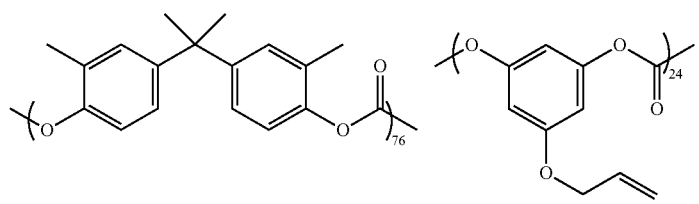

PC1-2-1

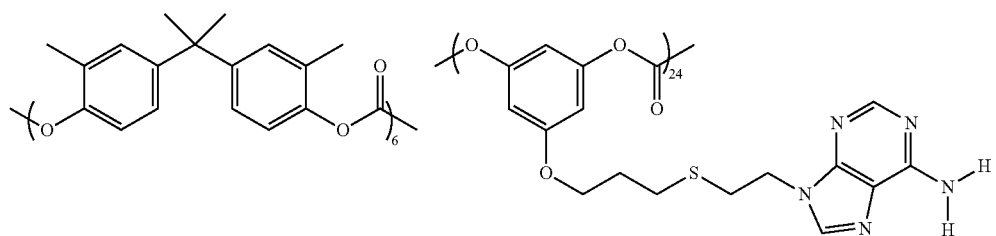

PC1-3

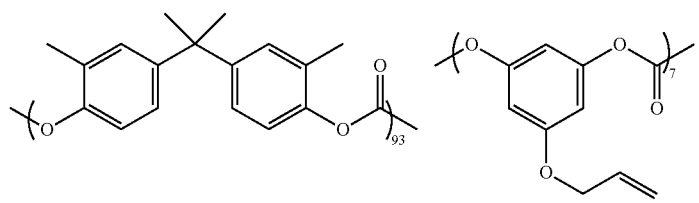

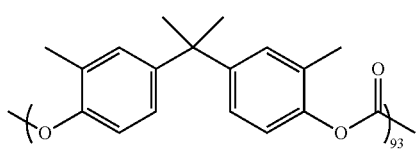
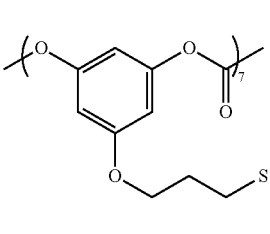

PC1-3-1

Synthesis Examples PC1-1 to PC1-3

PC1-1 to PC1-3 were synthesized with reference to Macromolecules, 25, 18, 4588-4596 (1992). Introduction ratios of an allyloxy group unit in the polymers were calculated from an integral ratio of $^1$H-NMR, and were 6/94, 76/24, and 93/7 (mol/mol) in PC1-1 to PC1-3, respectively.

Synthesis Examples PC1-1-1 to PC1-3-1

PC1-1-1 to PC1-3-1 were obtained in a similar manner to <Synthesis Examples PES1-1-1 to PES1-3-1> except that PC1-1 to PC1-3 were used instead of PES1-1 to PES1-3, respectively. Disappearance of a double bond of the allyl group was confirmed from an integral ratio of $^1$H-NMR.

Note that values of S/T in PC1-1-1 to PC1-3-1 were calculated based on an integration ratio of an allyl group in $^1$H-NMR, and were 6/94, 76/24, and 93/7 (mol/mol), respectively. Values of Mn of PC1-1-1 to PC1-3-1 were 17400, 19600, and 18800, respectively, and values of Mw/Mn of PC1-1-1 to PC1-3-1 were 2.02, 2.29, and 2.14, respectively.

(1) Example 1

[Preparation of Resin Composition]
<Preparation of Resin Composition 1-1>

100 mg of PA1-1 and 235 mg of photoisomerization compound 1 were put into a petri dish, and then 100 ml of $CHCl_3$ was added thereto. The petri dish was covered with an aluminum foil, and left in a draft until $CHC_3$ was dried and solidified. Thereafter, the mixture was vacuum-dried at room temperature using a vacuum dryer to remove the solvent.

<Resin compositions 1-2 to 1-53 and 1-A to 1-F>

Compositions 1-2 to 1-53 and Comparative Examples 1-A to 1-F were prepared in a similar manner to <Preparation of composition 1-1> using the resins and photoisomerization compounds described in Tables 1 and 2 and using the resins and photoisomerization compounds in the ratios described in Tables 1 and 2. In a case of a hardly soluble composition, a solution was heated to dissolve the composition.

[Photoresponsive Adhesion Test]

Figure 3:
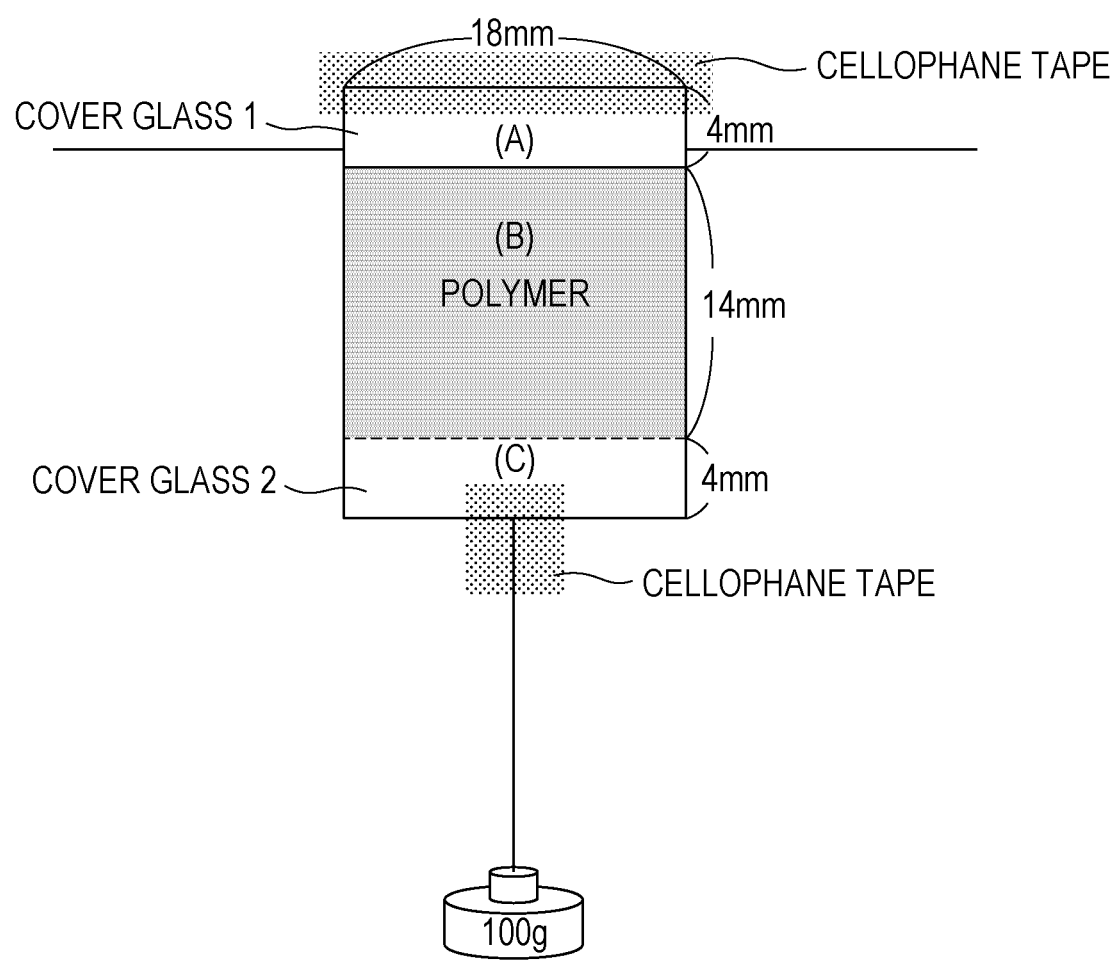
FIG. 3 is a schematic diagram of an apparatus for measuring changes in fluidity and non-fluidity (adhesiveness) of photoresponsive compounds synthesized in Examples and Comparative Examples due to light irradiation.

A change in adhesiveness of each of resin compositions 1-1 to 1-53 and 1-A to 1-H prepared above due to light irradiation was evaluated by the following photoresponsive adhesion test using the apparatus illustrated in FIG. 3.

As illustrated in FIG. 3, 2 mg of each of the resin compositions was placed on 18 mm square cover glass 1 within a radius of 6 mm from the center of the glass, and cover glass 2 having the same size as cover glass 1 was set at a position displaced by about 4 mm in a direction parallel to cover glass 1.

Each of resin compositions 1-1 to 1-53 and 1-A to 1-F was sandwiched between the cover glasses. Thereafter, the cover glasses were heated to melt each of the resin compositions, and cover glass 1 and cover glass 2 were bonded to each other. Each of the obtained samples was subjected to the following fluidization test (test of non-fluidity→fluidity), and then subjected to the following non-fluidization test (test of fluidity→non-fluidity).

<Fluidization Test (Test of Non-Fluidity→Fluidity)>

The portion (A) illustrated in FIG. 3 was fixed to a table with a cellophane tape, and a vinyl string having a length of 30 cm with a 100 g weigh was fixed to the portion (C) with a cellophane tape. The portion (B) was irradiated with light having a wavelength of 365 nm at an irradiation amount of 30 J/cm$^2$ for five minutes. It was confirmed whether cover glass 2 was peeled off from cover glass 1, and judgement was made according to the following evaluation criteria. Note that ○ and Δ were regarded to be acceptable according to the following evaluation criteria. The obtained results are illustrated in Tables 1 and 2.

(Evaluation Criteria)

○: Cover glass 2 has been completely peeled off from cover glass 1.

Δ: Cover glass 2 has been displaced.

x: Cover glass 2 has not moved.

<Non-Fluidization Test (Test of Fluidity→Non-Fluidity>

Five minutes after start of the test of non-fluidity→fluidity (the samples were left in a natural environment, that is, at room temperature (within a range of 25±15° C. for five minutes), cover glass 3 (having the same size as cover glasses 1 and 2) was placed so as to cover a sample portion (portion (B)) of cover glass 1 used in the test. It was confirmed whether cover glass 1 and cover glass 3 were bonded to each other, and judgment was made according to the following evaluation criteria. Note that ○ and Δ were regarded to be acceptable according to the following evaluation criteria. The obtained results are illustrated in Tables 1 and 2.

(Evaluation Criteria)

○: Not bonded (non-fluidized)

Δ: Partially bonded (partially kept in a fluidized state)

x: Bonded (kept in a fluidized state) Note that in the following Tables 1 to 4, "B in photoisomerization compound/B in resin" represents "number of moles of complementary multiple hydrogen bonding group in photoisomerization compound/number of moles of complementary multiple hydrogen bonding group in resin".

TABLE 1

| | Resin composition No. | Resin | S/T [molar ratio] | Photoisomerization compound | B in photoisomerization compound/B in resin [molar ratio] | Photoresponsive adhesion test Fluidity test | Non-fluidity test |
|---|---|---|---|---|---|---|---|
| Example 1-1 | 1-1 | PA1-1 | 6/94 | 1 | 1.0 | ○ | ○ |
| Example 1-2 | 1-2 | PA1-2 | 26/74 | 1 | 1.0 | ○ | ○ |
| Example 1-3 | 1-3 | PA1-3 | 52/48 | 1 | 1.0 | ○ | ○ |
| Comparative Example 1-A | 1-A | PA1-4 | 77/23 | — | — | × | × |
| Example 1-4 | 1-4 | PA1-4 | 77/23 | 1 | 0.1 | Δ | Δ |
| Example 1-5 | 1-5 | PA1-4 | 77/23 | 1 | 0.5 | ○ | ○ |
| Example 1-6 | 1-6 | PA1-4 | 77/23 | 1 | 1.0 | ○ | ○ |
| Example 1-7 | 1-7 | PA1-4 | 77/23 | 1 | 3.0 | ○ | ○ |
| Example 1-8 | 1-8 | PA1-4 | 77/23 | 1 | 5.0 | Δ | Δ |
| Comparative Example 1-B | 1-E | PA1-4 | 77/23 | A | 1.0 | × | × |
| Comparative Example 1-C | 1-C | PA1-4 | 77/23 | B | 1.0 | × | × |
| Comparative Example 1-D | 1-D | PA1-4 | 77/21 | C | 1.0 | × | × |
| Comparative Example 1-E | 1-E | PA1-4 | 77/23 | D | 1.0 | × | × |
| Example 1-9 | 1-9 | PA1-4 | 93/7 | 1 | 1.0 | ○ | ○ |
| Comparative Example 1-F | 1-F | PA-A | 100/0 | 1 | 1.0 | × | × |
| Example 1-10 | 1-10 | PES1-1-1 | 5/95 | 1 | 1.0 | ○ | ○ |
| Example 1-11 | 1-11 | PES1-2-1 | 74/26 | 1 | 1.0 | ○ | ○ |
| Example 1-12 | 1-12 | PES1-3-1 | 96/4 | 1 | 1.0 | ○ | ○ |
| Example 1-13 | 1-13 | PES2-1-1 | 7/93 | 1 | 1.0 | ○ | ○ |
| Example 1-14 | 1-14 | PES2-2-1 | 76/24 | 1 | 1.0 | ○ | ○ |
| Example 1-15 | 1-15 | PES2-3-1 | 94/6 | 1 | 1.0 | ○ | ○ |
| Example 1-16 | 1-16 | PC1-1-1 | 6/94 | 1 | 1.0 | ○ | ○ |
| Example 1-17 | 1-17 | PC1-2-1 | 76/24 | 1 | 1.0 | ○ | ○ |
| Example 1-18 | 1-18 | PC1-3-1 | 93/7 | 1 | 1.0 | ○ | ○ |
| Example 1-19 | 1-19 | PA1-4 | 77/23 | 4 | 1.0 | ○ | ○ |
| Example 1-20 | 1-20 | PA1-4 | 77/23 | 16 | 1.0 | ○ | ○ |
| Example 1-21 | 1-21 | PA1-4 | 77/23 | 18 | 1.0 | ○ | ○ |
| Example 1-22 | 1-22 | PA1-4 | 77/23 | 22 | 1.0 | ○ | ○ |
| Example 1-23 | 1-23 | PA1-4 | 77/23 | 23 | 1.0 | ○ | ○ |
| Example 1-24 | 1-24 | PA1-4 | 77/23 | 26 | 1.0 | ○ | ○ |
| Example 1-25 | 1-25 | PA1-4 | 77/23 | 29 | 1.0 | ○ | ○ |
| Example 1-26 | 1-26 | PA2 | 75/25 | 36 | 1.0 | ○ | ○ |
| Example 1-27 | 1-27 | PA2 | 75/25 | 39 | 1.0 | ○ | ○ |
| Example 1-28 | 1-28 | PA2 | 75/25 | 49 | 1.0 | ○ | ○ |
| Example 1-29 | 1-29 | PA2 | 75/25 | 57 | 1.0 | ○ | ○ |

TABLE 2

| | Resin composition No. | Resin | S/T [molar ratio] | Photoisomerization compound | B in photoisomerization compound/B in resin [molar ratio] | Photoresponsive adhesion test Fluidity test | Non-fluidity test |
|---|---|---|---|---|---|---|---|
| Example 1-30 | 1-30 | PA3 | 73/27 | 62 | 1.0 | ○ | ○ |
| Example 1-31 | 1-31 | PA3 | 73/27 | 63 | 1.0 | ○ | ○ |
| Example 1-32 | 1-32 | PA3 | 73/27 | 70 | 1.0 | ○ | ○ |
| Example 1-33 | 1-33 | PA3 | 73/27 | 75 | 1.0 | ○ | ○ |
| Example 1-34 | 1-34 | PA4 | 74/26 | 79 | 1.0 | ○ | ○ |
| Example 1-35 | 1-35 | PA4 | 74/26 | 87 | 1.0 | ○ | ○ |
| Example 1-36 | 1-36 | PA4 | 74/26 | 88 | 1.0 | ○ | ○ |
| Example 1-37 | 1-37 | PA4 | 74/26 | 91 | 1.0 | ○ | ○ |
| Example 1-38 | 1-38 | PA5 | 75/25 | 101 | 1.0 | ○ | ○ |
| Example 1-39 | 1-39 | PA5 | 75/25 | 102 | 1.0 | ○ | ○ |
| Example 1-40 | 1-40 | PA5 | 75/25 | 105 | 1.0 | ○ | ○ |
| Example 1-41 | 1-41 | PA5 | 75/25 | 106 | 1.0 | ○ | ○ |
| Example 1-42 | 1-42 | PA6 | 78/22 | 113 | 1.0 | ○ | ○ |
| Example 1-43 | 1-43 | PA6 | 78/22 | 115 | 1.0 | ○ | ○ |
| Example 1-44 | 1-44 | PA6 | 78/22 | 117 | 1.0 | ○ | ○ |
| Example 1-45 | 1-45 | PA6 | 78/22 | 124 | 1.0 | ○ | ○ |
| Example 1-46 | 1-46 | PA7 | 73/27 | 129 | 1.0 | ○ | ○ |
| Example 1-47 | 1-47 | PA7 | 73/27 | 132 | 1.0 | ○ | ○ |
| Example 1-48 | 1-48 | PA7 | 73/27 | 135 | 1.0 | ○ | ○ |
| Example 1-49 | 1-49 | PA7 | 73/27 | 137 | 1.0 | ○ | ○ |
| Example 1-50 | 1-50 | PA8 | 75/25 | 140 | 1.0 | ○ | ○ |

TABLE 2-continued

| | Resin composition No. | Resin | S/T [molar ratio] | Photoisomerization compound | B in photoisomerization compound/B in resin [molar ratio] | Photoresponsive adhesion test Fluidity test | Non-fluidity test |
|---|---|---|---|---|---|---|---|
| Example 1-51 | 1-51 | PA8 | 75/25 | 145 | 1.0 | ○ | ○ |
| Example 1-52 | 1-52 | PA8 | 75/25 | 149 | 1.0 | ○ | ○ |
| Example 1-53 | 1-53 | PA8 | 75/25 | 153 | 1.0 | ○ | ○ |

As illustrated in the above results, it has been found that the resin compositions according to an embodiment of the present invention induce a reversible fluidization/non-fluidization phenomenon in the fluidization and non-fluidization test. On the other hand, the resin compositions of Comparative Example did not induce both fluidization and non-fluidization phenomena. Note that in the resin composition 1-A of Comparative Example, cover glass 2 was completely peeled off from cover glass 1 in the fluidization test, and a coating film was peeled off from the cover glasses.

Example 2-1: Preparation of Toner 1

(2) Example 2

[Manufacture of Toner 2-1]
<Preparation of Styrene Acrylic Resin Particle Dispersion 1C-C>
(First Stage Polymerization)

Into a reaction container equipped with a stirrer, a temperature sensor, a cooling tube, and a nitrogen introducing device, a solution obtained by dissolving 8 g of sodium dodecylsulfate in 3000 g of deionized water was put. While the solution was stirred at a stirring speed of 230 rpm under a nitrogen flow, the internal temperature thereof was raised to 80° C. After the temperature was raised, a solution obtained by dissolving 15.0 g of potassium persulfate in 200 g of deionized water was added thereto, and the liquid temperature thereof was adjusted to 80° C. again. On the other hand, a polymerizable monomer solution containing styrene (475.2 g, 4.56 mol), n-butyl acrylate (247.5 g, 1.93 mol), methacrylic acid (67.3 g, 0.93 mol), monomer MA1 (17.5 g, 0.08 mol) synthesized in <Synthesis Example MA1>, and 16.0 g of n-octyl-3-mercaptopropionate was mixed, and then a 5 mol/liter aqueous sodium hydroxide solution was added thereto to adjust the pH to 8. Thereafter, the monomer solution was added dropwise to the solution in which the above-described surfactant and initiator were dissolved over one hour. After completion of the dropwise addition, the mixture was heated and stirred at 80° C. for two hours to perform polymerization, thus preparing a styrene acrylic resin particle dispersion (1A) containing styrene acrylic resin particles (1a). This solution was heated to 60° C., and photoisomerization compound 1 (synthesized in <Synthesis Example 1>) (42.1 g, 0.08 mol) dissolved in a minimal amount of acetone was slowly added thereto. After the addition, the mixture was stirred for 90 minutes, and acetone was removed, thus preparing a styrene acrylic resin particle dispersion (1A-A) crosslinked with photoisomerization compound 1.
(Second Stage Polymerization)

Into a reaction container equipped with a stirrer, a temperature sensor, a cooling tube, and a nitrogen introducing device, a solution obtained by dissolving 7 g of sodium polyoxyethylene-2-dodecyl ether sulfate in 800 g of deionized water was put. The solution was heated to 98° C. Thereafter, a polymerizable monomer solution obtained by dissolving 260 g of the above styrene acrylic resin particle dispersion (1A-A), styrene (242.6 g, 2.33 mol), n-butyl acrylate (118.8 g, 0.93 mol), monomer MA1 (7.7 g, 0.03 mol) synthesized in <Synthesis Example MA1>, 1.5 g of n-octyl-3-mercaptopropionate, and 67 g of a paraffin wax "HNP-11" (manufactured by Nippon Seiro Co., Ltd.) as a release agent at 90° C. was added thereto. The solution was mixed and dispersed for one hour with a mechanical disperser "CREARMIX" (manufactured by M. Technique Co., Ltd.) having a circulation path to prepare a dispersion containing emulsified particles (oil droplets).

Subsequently, an initiator solution obtained by dissolving 9.0 g of potassium persulfate in 200 g of deionized water was added to the dispersion, and the system was heated and stirred at 82° C. for one hour to perform polymerization, thus preparing a styrene acrylic resin particle dispersion (1B) containing styrene acrylic resin particles (1b). This solution was heated to 60° C., and photoisomerization compound 1 (synthesized in <Synthesis Example 1>) (18.5 g, 0.03 mol) dissolved in a minimal amount of acetone was slowly added thereto. After the addition, the mixture was stirred for 90 minutes to remove acetone, thus preparing a styrene acrylic resin particle dispersion (1B-B) crosslinked with photoisomerization compound 1.
(Third Stage Polymerization)

A solution obtained by dissolving 16.5 g of potassium persulfate in 400 g of deionized water was added to the styrene acrylic resin particle dispersion liquid (1B-B), and a polymerizable monomer solution containing styrene (430.7 g, 4.13 mol), n-butyl acrylate (128.7 g, 1.00 mol), methacrylic acid (32.7 g, 0.25 mol), monomer MA1 (17.7 g, 0.05 mol) synthesized in <Synthesis Example MA1>, and 8 g of n-octyl-3 mercaptopropionate was added dropwise thereto over one hour under a temperature condition of 82° C. After completion of the dropwise addition, the mixture was heated and stirred for two hours to perform polymerization and then cooled to 28° C. to obtain a styrene acrylic resin particle dispersion 1 (1C) containing styrene acrylic resin 1. This solution was heated to 60° C., and photoisomerization compound 1 (synthesized in <Synthesis Example 1>) (30.6 g, 0.05 mol) dissolved in a minimal amount of acetone was slowly added thereto. After the addition, the mixture was stirred for 90 minutes to remove acetone, thus preparing a styrene acrylic resin particle dispersion (1C-C) crosslinked with photoisomerization compound 1.
(Preparation of Cyan Colorant Particle Dispersion)

11.5 g of sodium n-dodecyl sulfate was dissolved in 1600 g of pure water, and 25 g of copper phthalocyanine (C. I. Pigment Blue 15:3) was gradually added thereto. Subsequently, a cyan colorant particle dispersion was prepared using "CLEARMIX (registered trademark) W-Motion CLM-0.8 (manufactured by M Technique Co., Ltd.)". The number-based median size of the cyan colorant particles in the dispersion measured using an electrophoretic light scattering photometer "ELS-800" (manufactured by Otsuka Electronics Co., Ltd.) was 151 nm.

(Aggregation and Fusion)

Into a reactor equipped with a stirrer, a temperature sensor, and a cooling tube, 504 g of the styrene acrylic resin particle dispersion (1C-C) prepared above in terms of solid content, 900 g of deionized water, and 70 g of the cyan colorant particle dispersion in terms of solid content were put. A 5 mol/liter sodium hydroxide aqueous solution was added thereto while the temperature in the container was maintained at 30° C. to adjust the pH to 10.

Next, an aqueous solution obtained by dissolving 2 g of magnesium chloride hexahydrate in 1000 g of deionized water was added dropwise thereto over 10 minutes while being stirred. Thereafter, the temperature of this system started to be raised, and this system was heated to 70° C. over 60 minutes. A particle growth reaction was continued while the temperature was maintained at 70° C. In this state, the particle size of an associated particle was measured with "Multisizer 3" (manufactured by Beckman Coulter, Inc.). When the volume-based median size (D50) reached 6.5 μm, an aqueous solution obtained by dissolving 190 g of sodium chloride in 760 g of deionized water was added thereto to stop the particle growth. The resulting solution was stirred at 70° C. for one hour. Thereafter, the temperature was further raised. The solution was heated and stirred at 75° C. to promote fusion of the particles. Thereafter, the solution was cooled to 30° C. to obtain a dispersion of toner particles.

The dispersion of toner particles obtained above was subjected to solid-liquid separation with a centrifuge to form a wet cake of the toner particles. The wet cake was washed with deionized water at 35° C. using the centrifuge until the electric conductivity of a filtrate reached 5 μS/cm, then transferred to a "flash jet dryer" (manufactured by Seishin Enterprise Co., Ltd.), and dried until the water content reached 0.5% by mass to prepare toner 2-1.

<Manufacture of toner 2-10>
<Preparation of Polyester Resin Particle Dispersion 1D-D>

Into a 10 liter four-neck flask equipped with a nitrogen introducing tube, a dehydration tube, a stirrer, and a thermocouple, a bisphenol A propylene oxide 2 mol adduct (518.8 g, 1.51 mol), terephthalic acid (104.0 g, 0.63 mol), fumaric acid (68.3 g, 0.59 mol), 5-(2-propen-1-yloxy)-1,3-benzenedicarboxylic acid (manufactured by Chemieliva Pharmaceutical) (6.1 g, 0.03 mol), and 2 g of tin octylate (esterification catalyst) were put, and subjected to a polycondensation reaction at a temperature of 230° C. for eight hours. Furthermore, the polycondensation reaction was continued at 8 kPa for 0.5 hours, and then the reaction solution was cooled to 160° C. to obtain polyester resin (1d). Polyester resin (1d) was completely dissolved in tetrahydrofuran. Thereafter, a reaction solution containing 6-amino-9H-purin-9-ethanethiol (manufactured by Aurora Fine Chemicals LLC) in a molar amount 1.5 times the molar amount of allyl groups contained in the polymer was irradiated with UV light (254 nm) under stirring in a similar manner to Green Chemistry, 2013, 15 (4), 1016. Ethyl alcohol in an amount 30 times the amount of the reaction solution was put into a flask. A mechanical stirrer and Teflon (registered trademark) blade were installed therein. The obtained reaction solution was added dropwise into the flask over one hour while ethyl alcohol was vigorously stirred. The mixture was stirred for two hours, and then filtered under reduced pressure with Nutsche and filter paper. The obtained solid was dried under reduced pressure at 60° C. to obtain polyester resin (1D). Disappearance of a double bond of the allyl group was confirmed from an integral ratio of $^1$H-NMR.

100 g of polyester resin (1D) was crushed with "Lander mill type: RM" (manufactured by Tokuju Corporation) and mixed with 638 g of a 0.26% by mass of a sodium lauryl sulfate aqueous solution prepared in advance. The resulting mixture was ultrasonically dispersed at V-LEVEL at 300 μA for 30 minutes using an ultrasonic homogenizer "US-150T" (manufactured by Nihonseiki Kaisha Ltd.) while being stirred to obtain polyester resin particle dispersion (1D-D).

(Aggregation and Fusion)

Toner 2-10 was prepared in a similar manner to (Aggregation and fusion) of [Manufacture of toner 2-1] except that styrene acrylic resin particle dispersion (1C-C) used in (Aggregation and fusion) of [Manufacture of toner 2-1] was replaced with polyester resin particle dispersion (1D-D) prepared above. [0374][Preparation of toners of Examples 2-2 to 2-68 and Comparative Examples 2-A to 2-F] Toner Examples 2-2 to 2-9, 2-12, 2-13, and 2-16 to 1-50 and Comparative Examples 2-A to 2-F were prepared in a similar manner to preparation of toner 2-1 of Example 2-1 by appropriately changing the contents described in Tables 3 and 4. Toners 2-10, 2-11, 2-14, and 2-15 were prepared by appropriately changing the contents described in Table 2 with reference to [Manufacture of toner 2-10].

Among units constituting the resins used in Examples 2-1 to 2-50 and Comparative Examples 2-A to 2-F, the unit (T) having a complementary multiple hydrogen bonding group is represented by the following structures BU-1 to BU-9. Note that in Tables 3 and 4, among units constituting the resins, compounds MA-1 to MA-8 and DC-1 used as monomers of units having complementary multiple hydrogen bonding groups are MA-1 to MA-8 and DC-1 having the structures described above, respectively.

[Chemical formula 29]

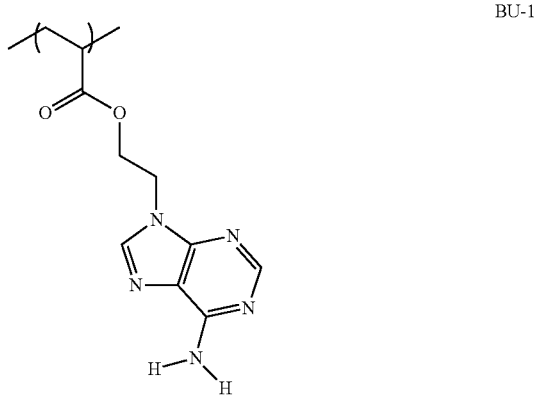

BU-1

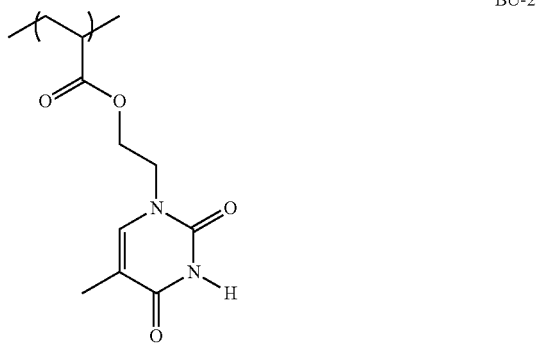

BU-2

-continued

BU-3
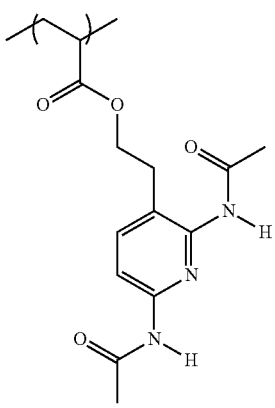

BU-4
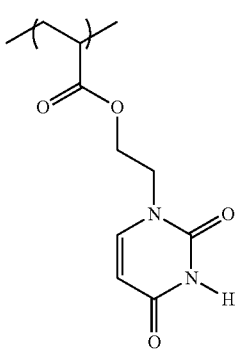

BU-5
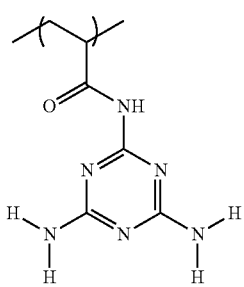

BU-6
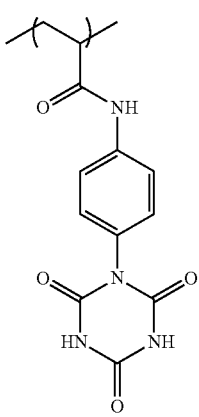

-continued

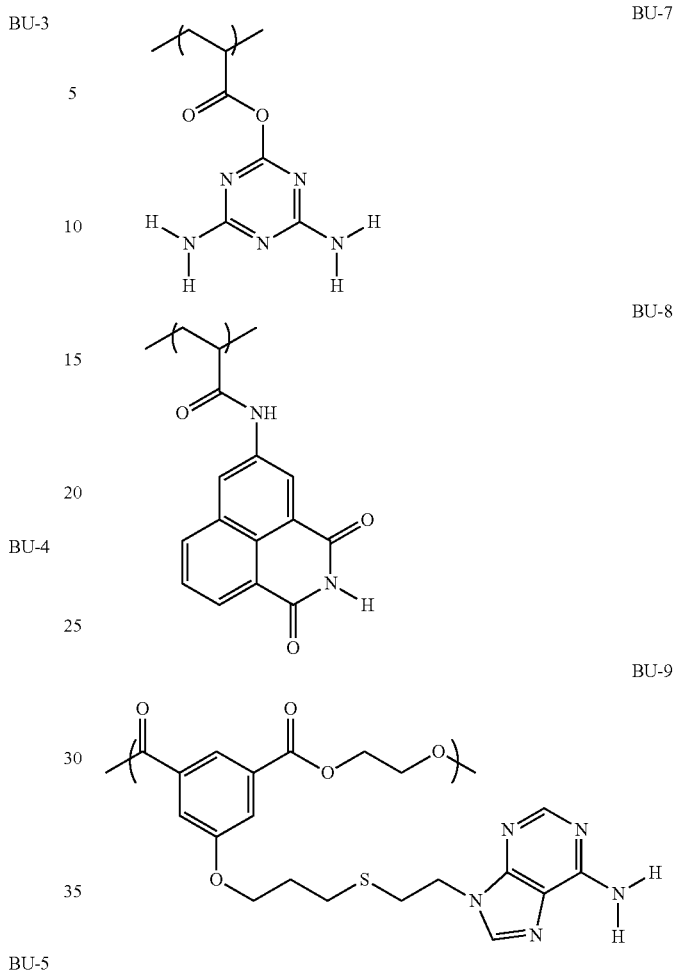

[Preparation of Developer]

Ferrite carrier particles coated with a copolymer resin of cyclohexane methacrylate and methyl methacrylate (monomer mass ratio 1:1) and having a volume average particle size of 30 μm were mixed with each of the toners prepared above such that a toner particle concentration was 6% by mass to obtain each of developers 2-1 to 2-50 and 2-A to 2-F. Mixing was performed for 30 minutes using a V-type mixer.

[Fixability Test]

Using each of the obtained developers, a toner image was formed on plain paper as a recording medium to obtain a printed matter. Specifically, each of the developers was disposed between a pair of parallel flat plate (aluminum) electrodes with the developer on one side and gloss coated paper (basis weight: 128 g/m$^2$) on the other side while being slid by a magnetic force. A toner was developed under a condition that a gap between the electrodes was 0.5 mm and the toner attachment amount in each of a DC bias and an AC bias was 4 g/m$^2$. A toner layer was formed on a surface of the plain paper and fixed with a fixing device to obtain a printed matter.

<Evaluation>

A 1 cm square image of the printed matter was rubbed ten times with "JK Wiper (registered trademark)" (manufactured by Nippon Paper Crecia Co., Ltd.) while a pressure of 50 kPa was applied thereto, and a fixing ratio of the image was evaluated. A fixing ratio of 80% or higher was regarded to be acceptable. The obtained evaluation results (fixing ratios) of the fixability test are illustrated in the following Table 3. Note that the fixing ratio of an image is a numerical value obtained by measuring the densities of an image after printing and an image after rubbing with a reflection densitometer "RD-918" (manufactured by SAKATA INX ENGINEERING CORPORATION), dividing the reflection density of a solid image after rubbing by the reflection density of a solid image after printing, and expressing the obtained value as a percentage.

As the fixing device, the following three types of devices obtained by appropriately modifying the device illustrated in FIG. 2 were used.

Fixing device No. 1: Fixing device No. 1 does not include the pressure bonding unit 9 illustrated in FIG. 2, includes the irradiation unit 40 that emits ultraviolet light having a wavelength of 365 nm (light source: LED light source with an emission wavelength of 365 nm±10 nm), and has an irradiation amount of 10 J/cm$^2$. The toner softened by irradiation with ultraviolet light was solidified (the compound was non-fluidized) and fixed in a state of being left in a natural environment, that is, at room temperature (20° C.) until reaching the sheet discharger 14 (see FIG. 1).

Fixing device No. 2: Fixing device No. 2 includes the pressure bonding unit 9 illustrated in FIG. 2, includes the pressurizing member 91 having a temperature of 20° C., and applies a pressure of 0.2 MPa at the time of pressurization. The light source and the irradiation amount of the irradiation unit are similar to those in No. 1. The toner softened by irradiation with ultraviolet light was fixed by pressurization by the pressurizing member 91, and then solidified (the compound was non-fluidized) in a state of being left at room temperature (20° C.) until reaching the sheet discharger 14 (see FIG. 1).

Fixing device No. 3: Fixing device No. 3 includes the pressure bonding unit 9 illustrated in FIG. 2, and includes the pressurizing member 91 having a temperature of 80° C. The light source and the irradiation amount of the irradiation unit are similar to those in No. 1. Pressure at the time of pressurization by the pressurizing member 91 is similar to that in No. 2. The toner softened by irradiation with ultraviolet light was further softened and fixed by pressurization by the pressurizing member 91 and heating. Thereafter, the toner was solidified (the compound was non-fluidized) in a state of being left at room temperature (20° C.) until reaching the sheet discharger 14 (see FIG. 1).

[Thin Line Reproducibility Test]
<Image Forming Method>

Using each of the obtained developers, a toner image was formed on plain paper as a recording medium to obtain a printed matter. Specifically, each of the developers was disposed between a pair of parallel flat plate (aluminum) electrodes with the developer on one side and gloss coated paper (basis weight: 128 g/m$^2$) on the other side while being slid by a magnetic force. A toner was developed under a condition that a gap between the electrodes was 0.5 mm and the toner attachment amount in each of a DC bias and an AC bias was 4 g/m$^2$. A toner layer having thin lines formed at six thin lines/mm was formed on the plain paper and fixed with a fixing device to obtain a printed matter. A thin line reproducibility test was performed using the printed matter.

<Evaluation>

From a monitor image obtained by enlarging a thin line image portion in the printed matter with a digital microscope "VHX-600" (manufactured by KEYENCE CORPORATION), a line width of thin lines formed at six thin lines/mm was measured by an indicator (W1), and a thin line reproduction ratio of W1 to a line width (W2) before fixing was calculated by {(W1/W2)×100}. In the measurement of the line width, the line width of the thin lines of the toner varies depending on a measurement position, and both end portions of the thin lines in a line width direction have irregularities in the line width direction. Therefore, straight lines obtained by averaging the irregularities were drawn for both the end portions, and a distance between the straight lines was defined as the line width.

TABLE 3

| | | Resin | | S/T [molar ratio] | Photoisomerization compound | B in photoisomerization compound/B in resin [molar ratio] | Fixing device No. | Evaluation Fixing ratio [%] | Thin line reproduction ratio [%] |
|---|---|---|---|---|---|---|---|---|---|
| | Toner No. | Monomer | T | | | | | | |
| Comparative Example 2-A | 2-A | — | — | 100/0 | 1 | 1.0 | 1 | 75 | 109 |
| Example 2-1 | 2-1 | MA1 | BU-1 | 99/1 | 1 | 1.0 | 1 | 82 | 112 |
| Example 2-2 | 2-2 | MA1 | BU-1 | 97/3 | 1 | 1.0 | 1 | 86 | 113 |
| Example 2-3 | 2-3 | MA1 | BU-1 | 90/10 | 1 | 1.0 | 1 | 92 | 115 |
| Example 2-4 | 2-4 | MA1 | BU-1 | 70/30 | 1 | 1.0 | 1 | 89 | 118 |
| Comparative Example 2-B | 2-B | MA1 | BU-1 | 90/10 | — | — | 1 | 73 | 107 |
| Example 2-6 | 2-6 | MA1 | BU-1 | 90/10 | 1 | 0.1 | 1 | 80 | 110 |
| Example 2-7 | 2-7 | MA1 | BU-1 | 90/10 | 1 | 0.5 | 1 | 84 | 113 |
| Example 2-8 | 2-8 | MA1 | BU-1 | 90/10 | 1 | 3.0 | 1 | 91 | 117 |
| Example 2-9 | 2-9 | MA1 | BU-1 | 90/10 | 1 | 1.0 | 1 | 94 | 119 |
| Comparative Example 2-C | 2-C | MA1 | BU-1 | 90/10 | A | 1.0 | 1 | 76 | 107 |
| Comparative Example 2-D | 2-D | MA1 | BU-1 | 90/10 | B | 1.0 | 1 | 74 | 104 |
| Comparative Example 2-E | 2-E | MA1 | BU-1 | 90/10 | C | 1.0 | 1 | 71 | 105 |
| Comparative Example 2-F | 2-F | MA1 | BU-1 | 90/10 | D | 1.0 | 1 | 73 | 109 |
| Example 2-10 | 2-10 | DC1 | BU-9 | 97/3 | 1 | 1.0 | 1 | 83 | 122 |
| Example 2-11 | 2-11 | DC1 | BU-9 | 90/10 | 1 | 1.0 | 1 | 88 | 125 |
| Example 2-12 | 2-12 | MA1 | BU-1 | 90/10 | 1 | 1.0 | 2 | 95 | 118 |
| Example 2-13 | 2-13 | MA1 | BU-1 | 90/10 | 1 | 1.0 | 3 | 97 | 120 |

TABLE 3-continued

| | Toner No. | Resin Monomer | T | S/T [molar ratio] | Photoisomerization compound | B in photoisomerization compound/B in resin [molar ratio] | Fixing device No. | Evaluation Fixing ratio [%] | Thin line reproduction ratio [%] |
|---|---|---|---|---|---|---|---|---|---|
| Example 2-14 | 2-14 | DC1 | BU-9 | 90/10 | 1 | 1.0 | 2 | 91 | 127 |
| Example 2-15 | 2-15 | DC1 | BU-9 | 90/10 | 1 | 1.0 | 3 | 92 | 126 |
| Example 2-16 | 2-16 | MA1 | BU-1 | 90/10 | 4 | 1.0 | 1 | 90 | 117 |
| Example 2-17 | 2-17 | MA1 | BU-1 | 90/10 | 16 | 1.0 | 1 | 87 | 117 |
| Example 2-18 | 2-18 | MA1 | BU-1 | 90/10 | 18 | 1.0 | 1 | 88 | 116 |
| Example 2-19 | 2-19 | MA1 | BU-1 | 90/10 | 22 | 1.0 | 1 | 85 | 119 |
| Example 2-20 | 2-20 | MA1 | BU-1 | 90/10 | 23 | 1.0 | 1 | 84 | 117 |
| Example 2-21 | 2-21 | MA1 | BU-1 | 90/10 | 26 | 1.0 | 1 | 86 | 120 |
| Example 2-22 | 2-22 | MA1 | BU-1 | 90/10 | 29 | 1.0 | 1 | 86 | 119 |
| Example 2-23 | 2-23 | MA2 | BU-2 | 90/10 | 36 | 1.0 | 1 | 88 | 118 |
| Example 2-24 | 2-24 | MA2 | BU-2 | 90/10 | 39 | 1.0 | 1 | 89 | 116 |
| Example 2-25 | 2-25 | MA2 | BU-2 | 90/10 | 49 | 1.0 | 1 | 83 | 119 |
| Example 2-26 | 2-26 | MA2 | BU-2 | 90/10 | 57 | 1.0 | 1 | 84 | 121 |

TABLE 4

| | Toner No. | Resin Monomer | T | S/T [molar ratio] | Photoisomerization compound | B in photoisomerization compound/B in resin [molar ratio] | Fixing device No. | Evaluation Fixing ratio [%] | Thin line reproduction ratio [%] |
|---|---|---|---|---|---|---|---|---|---|
| Example 2-27 | 2-27 | MA3 | BU-3 | 90/10 | 62 | 1.0 | 1 | 87 | 117 |
| Example 2-28 | 2-28 | MA3 | BU-3 | 90/10 | 63 | 1.0 | 1 | 90 | 119 |
| Example 2-29 | 2-29 | MA3 | BU-3 | 90/10 | 70 | 1.0 | 1 | 85 | 120 |
| Example 2-30 | 2-30 | MA3 | BU-3 | 90/10 | 75 | 1.0 | 1 | 84 | 123 |
| Example 2-31 | 2-31 | MA4 | BU-4 | 90/10 | 79 | 1.0 | 1 | 89 | 117 |
| Example 2-32 | 2-32 | MA4 | BU-4 | 90/10 | 87 | 1.0 | 1 | 86 | 116 |
| Example 2-33 | 2-33 | MA4 | BU-4 | 90/10 | 88 | 1.0 | 1 | 84 | 119 |
| Example 2-34 | 2-34 | MA4 | BU-4 | 90/10 | 91 | 1.0 | 1 | 86 | 119 |
| Example 2-35 | 2-35 | MA5 | BU-5 | 90/10 | 101 | 1.0 | 1 | 87 | 118 |
| Example 2-36 | 2-36 | MA5 | BU-5 | 90/10 | 102 | 1.0 | 1 | 90 | 117 |
| Example 2-37 | 2-37 | MA5 | BU-5 | 90/10 | 105 | 1.0 | 1 | 84 | 119 |
| Example 2-38 | 2-38 | MA5 | BU-5 | 90/10 | 106 | 1.0 | 1 | 84 | 121 |
| Example 2-39 | 2-39 | MA6 | BU-6 | 90/10 | 113 | 1.0 | 1 | 90 | 117 |
| Example 2-40 | 2-40 | MA6 | BU-6 | 90/10 | 115 | 1.0 | 1 | 90 | 116 |
| Example 2-41 | 2-41 | MA6 | BU-6 | 90/10 | 117 | 1.0 | 1 | 83 | 120 |
| Example 2-42 | 2-42 | MA6 | BU-6 | 90/10 | 124 | 1.0 | 1 | 84 | 119 |
| Example 2-43 | 2-43 | MA7 | BU-7 | 90/10 | 129 | 1.0 | 1 | 88 | 114 |
| Example 2-44 | 2-44 | MA7 | BU-7 | 90/10 | 132 | 1.0 | 1 | 89 | 115 |
| Example 2-45 | 2-45 | MA7 | BU-7 | 90/10 | 135 | 1.0 | 1 | 84 | 118 |
| Example 2-46 | 2-46 | MA7 | BU-7 | 90/10 | 137 | 1.0 | 1 | 85 | 118 |
| Example 2-47 | 2-47 | MA8 | BU-8 | 90/10 | 140 | 1.0 | 1 | 87 | 116 |
| Example 2-48 | 2-48 | MA8 | BU-8 | 90/10 | 145 | 1.0 | 1 | 90 | 117 |
| Example 2-49 | 2-49 | MA8 | BU-8 | 90/10 | 149 | 1.0 | 1 | 86 | 119 |
| Example 2-50 | 2-50 | MA8 | BU-8 | 90/10 | 153 | 1.0 | 1 | 84 | 120 |

As is clear from Tables 3 and 4, it has been confirmed that the toners prepared in Examples had favorable fixability and excellent thin line reproducibility. On the other hand, it has been found that the toners prepared in Comparative Examples 2-A to 2-F are inferior in fixability and thin line reproducibility. Since the light source of ultraviolet light and the irradiation conditions of ultraviolet light used for evaluation of fixability and thin line reproducibility were constant throughout Examples 2-1 to 2-9 and Comparative Examples 2-A to 2-F, it can be said that the toners of Examples were quickly and reversibly fluidized and non-fluidized by light irradiation as compared with the toners of Comparative Examples, thereby exhibiting the effect of being excellent in fixability and thin line reproducibility.

As indicated in Examples, it has been found that when a toner contains a resin composition containing a resin having a complementary multiple hydrogen bonding group and a photoisomerization compound having a complementary multiple hydrogen bonding group, an excellent fixing ratio of 80% or more is exhibited in a fixability test of a toner image, and an excellent thin line reproduction ratio of 110 or more is exhibited in thin line reproducibility.

Although embodiments of the present invention have been described and illustrated in detail, the disclosed embodiments are made for purposes of illustration and example only and not limitation. The scope of the present invention should be interpreted by terms of the appended claims.

What is claimed is:

1. A resin composition comprising:
   a resin having a first group capable of forming at least two hydrogen bonds; and
   a photoisomerization compound having a second group capable of forming at least two hydrogen bonds complementarily with the first group and having a moiety that is reversibly isomerized by light,
   wherein the first group and the second group are each independently a residue of any one compound selected from the group consisting of adenine, guanine, cytosine, thymine, uracil, urea, thiourea, melamine, cyanuric acid, barbituric acid, a 2,6-diacylaminopyridine, 2,6-diacetylaminopyridine, 4,6-diamino-2 pyrimidinone, 2-amino-4,6-pyrimidinedinone, 2,4,6-triaminopyrimidine, phthalimide, 2,6-diamino-1,3,5-triazine, 2-ureido-4-amino-1,3,5-triazine, and 2-ureido-4 pyrimidinone,
   the resin contains a structure represented by general formula (1):

-M-$B_1$ wherein
   M represents a linking group, and
   $B_1$ represents the first group capable of forming at least two hydrogen bonds, and
   the photoisomerization compound is a compound represented by general formula (2):

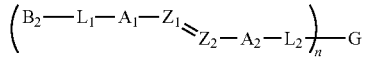

wherein
   $L_1$ and $L_2$ each independently represent a linking group,
   $A_1$ and $A_2$ each independently represent a substituted or unsubstituted aromatic hydrocarbon group or a substituted or unsubstituted aromatic heterocyclic group,
   $Z_1$ and $Z_2$ each independently represent N or CH,
   $B_2$ represents the second group capable of forming at least two hydrogen bonds complementarily with the first group,
   n is an integer of 1 to 10, and
   G represents the second group capable of forming at least two hydrogen bonds complementarily with the first group when n is 1, and represents an n-valent substituent or an n-valent third group capable of forming at least two hydrogen bonds complementarily with the first group when n is 2 to 10.

2. The resin composition according to claim 1, wherein the resin has at least one main chain selected from the group consisting of an acrylic resin, a styrene acrylic resin, and a polyester resin.

3. The resin composition according to claim 1, wherein in the general formula (2), $Z_1$ and $Z_2$ each independently represent N or CH and $Z_1 \neq Z_2$.

4. The resin composition according to claim 1, wherein the first group and the second group are each independently a residue of any one compound selected from the group consisting of adenine, thymine, the 2,6-diacylaminopyridine, uracil, melamine, cyanuric acid, phthalimide, and 2,6-diamino-1,3,5-triazine.

5. The resin composition according to claim 1, wherein the first group and the second group form a pair of residues selected from adenine/thymine, 2,6-diacylaminopyridine/uracil, melamine/cyanuric acid, and 2,6-diamino-1,3,5-triazine/phthalimide.

6. The resin composition according to claim 1, which is fluidized and then non-fluidized by light irradiation.

7. The resin composition according to claim 6, wherein the light for irradiation has a wavelength of 250 nm to 480 nm.

8. A toner comprising the resin composition according to claim 1.

9. The toner according to claim 8, further comprising a binder resin.

10. The toner according to claim 9, wherein the binder resin contains at least one selected from the group consisting of a styrene acrylic resin and a polyester resin.

11. The toner according to claim 8, further comprising a colorant.

12. The toner according to claim 8, further comprising a release agent.

13. An image forming method comprising:
    forming a toner image formed of the toner according to claim 8 on a recording medium; and
    irradiating the toner image with light to soften the toner image.

14. The image forming method according to claim 13, wherein the light has a wavelength of 280 nm or more and 480 nm or less.

15. The image forming method according to claim 13, further comprising pressurizing the toner image.

16. The image forming method according to claim 15, wherein the toner image is further heated in pressurizing the toner image.

17. A photosensitive adhesive comprising the resin composition according to claim 1.

18. An optical switching material comprising the resin composition according to claim 1.

* * * * *